US010688620B2

(12) United States Patent
Shinozaki et al.

(10) Patent No.: US 10,688,620 B2
(45) Date of Patent: Jun. 23, 2020

(54) POLISHING APPARATUS

(71) Applicant: EBARA CORPORATION, Tokyo (JP)

(72) Inventors: Hiroyuki Shinozaki, Tokyo (JP); Yuta Suzuki, Tokyo (JP); Taro Takahashi, Tokyo (JP); Seiji Katsuoka, Tokyo (JP); Masahiro Hatakeyama, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 198 days.

(21) Appl. No.: 15/714,938

(22) Filed: Sep. 25, 2017

(65) Prior Publication Data

US 2018/0093360 A1    Apr. 5, 2018

(30) Foreign Application Priority Data

Sep. 30, 2016  (JP) ................................. 2016-193641
Apr. 4, 2017   (JP) ................................. 2017-074167
May 1, 2017    (JP) ................................. 2017-091152

(51) Int. Cl.
*B24B 37/013*    (2012.01)
*B24B 37/10*     (2012.01)
*B24B 49/10*     (2006.01)
*B24B 49/16*     (2006.01)
*B24B 37/04*     (2012.01)
*B24B 37/32*     (2012.01)

(52) U.S. Cl.
CPC .......... *B24B 37/013* (2013.01); *B24B 37/042* (2013.01); *B24B 37/10* (2013.01); *B24B 37/32* (2013.01); *B24B 49/10* (2013.01); *B24B 49/16* (2013.01)

(58) Field of Classification Search
CPC . B24B 25/00; B24B 27/0023; B24B 27/0069; B24B 27/0076; B24B 37/005; B24B 37/013; B24B 37/10; B24B 37/16; B24B 37/205; B24B 37/32; B24B 49/10; B24B 49/12; B24B 49/16; B24B 37/042
USPC ................. 451/5, 8, 10, 11, 41, 285, 287
See application file for complete search history.

(56) References Cited

U.S. PATENT DOCUMENTS

| 6,293,845 | B1 | 9/2001 | Clark-Phelps |
| 6,494,765 | B2 * | 12/2002 | Gitis .................... B24B 37/013 451/287 |
| 8,096,852 | B2 * | 1/2012 | Deshpande .......... B24B 37/005 451/5 |

(Continued)

FOREIGN PATENT DOCUMENTS

| JP | 2001-252866 A | 9/2001 |
| JP | 2004-249458 A | 9/2004 |
| JP | 2015-149438 A | 8/2015 |

*Primary Examiner* — Eileen P Morgan
(74) *Attorney, Agent, or Firm* — BakerHostetler

(57) ABSTRACT

In a scheme in which a top ring is held to an end portion of a swing arm, the present invention improves accuracy of polishing end point detection. A polishing apparatus for polishing between a polishing pad 10 and a semiconductor wafer 16 disposed opposed to the polishing pad 10 includes a polishing table 30A for holding the polishing pad 10 and a top ring 31A for holding the semiconductor wafer 16. A swing shaft motor 14 swings a swing arm 110 for holding the top ring 31A. The arm torque detection section 26 detects arm torque applied to the swing arm 110. An end point detection section 28 detects a polishing end point indicating an end of polishing based on the detected arm torque.

34 Claims, 34 Drawing Sheets

(56) References Cited

U.S. PATENT DOCUMENTS

| | | | |
|---|---|---|---|
| 8,388,409 B2* | 3/2013 | Nakao | B24B 37/013 |
| | | | 156/345.12 |
| 8,758,085 B2* | 6/2014 | Dhandapani | B24B 53/007 |
| | | | 451/10 |
| 8,821,746 B2* | 9/2014 | Kojima | B24B 37/005 |
| | | | 216/37 |
| 9,272,389 B2* | 3/2016 | Takahashi | B24B 37/013 |
| 9,579,767 B2* | 2/2017 | Qian | B24B 37/013 |
| 10,058,974 B1* | 8/2018 | Chen | B24B 37/107 |
| 2008/0242196 A1* | 10/2008 | Marxsen | B24B 37/013 |
| | | | 451/8 |
| 2014/0020830 A1 | 1/2014 | Rangarajan et al. | |
| 2015/0065019 A1* | 3/2015 | Shinozaki | B24B 53/017 |
| | | | 451/443 |
| 2018/0093360 A1* | 4/2018 | Shinozaki | B24B 37/013 |
| 2019/0118332 A1* | 4/2019 | Sugiyama | B24B 27/0023 |
| 2019/0126427 A1* | 5/2019 | Kato | B24B 37/013 |
| 2019/0131150 A1* | 5/2019 | Suzuki | H01L 21/67219 |
| 2019/0168355 A1* | 6/2019 | Suzuki | B24B 49/16 |
| 2019/0193242 A1* | 6/2019 | Takahashi | B24B 49/16 |

* cited by examiner

↓ CMP

↓ CMP

↓ CMP

POLISHING APPARATUS

CROSS-REFERENCE TO RELATED APPLICATION

This application is based upon and claims benefit of priority from Japanese Patent Applications No. 2016-193641 filed Sep. 30, 2016, 2017-074167 filed Apr. 4, 2017 and 2017-091152 filed May 1, 2017, the entire contents of which are incorporated herein by reference.

TECHNICAL FIELD

The present invention relates to a polishing apparatus and a polishing method.

BACKGROUND ART

The trend of a semiconductor device in recent years has been a highly integrated structure, which entails finer interconnects of a circuit and a smaller distance between the interconnects. In fabrication of the semiconductor device, many types of materials are deposited in a shape of film on a silicon wafer repeatedly to form a multilayer structure. It is important for forming the multilayer structure to planarize a surface of a wafer. A polishing apparatus for performing chemical mechanical polishing (CMP) is typically used as one technique of planarizing the surface of the wafer (also called a chemical mechanical polishing apparatus).

This chemical mechanical polishing (CMP) apparatus typically includes a polishing table supporting a polishing pad thereon for polishing a polishing target (such as a wafer) and a top ring for holding a wafer for holding and pressing the polishing target against the polishing pad. The polishing table and the top ring are respectively driven to rotate by a drive section (e.g., motor). The polishing apparatus is further provided with a nozzle for supplying a polishing liquid onto the polishing pad. When polishing a wafer, the top ring presses the wafer against the polishing pad, while the polishing liquid is supplied onto the polishing pad from the nozzle. In this state, the top ring and the polishing table are moved relative to each other, whereby the wafer is polished to have a planarized surface. Examples of a scheme for holding the top ring and the drive section of the top ring include a scheme of holding the top ring and the drive section of the top ring at an end of a swing arm (cantilever arm) and a scheme of holding the top ring and the drive section of the top ring to a carousel.

If the polishing of the polishing target is not sufficient, insulation between circuits may not be secured and a short-circuit may result. On the other hand, excessive polishing may result in problems such as an increase of resistance values due to a decrease in the cross-sectional area of interconnects or the interconnects themselves being completely removed and circuits themselves being not formed. Therefore, the polishing apparatus is required to detect an optimum polishing end point.

A method of detecting a change in a polishing frictional force when polishing reaches a point where there is a change from a substance to another substance of a different material is known as one of polishing end point detection means. A semiconductor wafer which is a polishing target has a multilayer structure made of different materials such as a semiconductor, conductor and insulator, and a frictional coefficient varies among layers of different materials. For this reason, this method detects a change in the polishing frictional force when the polishing reaches a point where there is a change from a substance to another substance of a different material. According to this method, a time point at which polishing reaches the different material layer is an end point of polishing.

The polishing apparatus can also detect a polishing end point by detecting a change in the polishing frictional force when the polishing surface of the polishing target is changed from a non-flat state to a flat state.

Here, the polishing frictional force generated when the polishing target is polished appears as a drive load of the drive section that drives the polishing table or the top ring to rotate. For example, in a case where the drive section is an electric motor, the drive load (torque) can be measured as a current that flows through the motor. For this reason, it is possible to detect a motor current (torque current) using a current sensor and detect an end point of polishing based on a change in the detected motor current.

Japanese Patent Application Laid-Open No. 2004-249458 discloses a method of measuring a polishing frictional force using a motor current of a motor that drives a polishing table and detecting an end point of polishing in a scheme in which a top ring is held to an end of a swing arm. In a scheme in which a plurality of top rings are held to a carousel, an end point detection method is available which detects a torque current (motor current) of a carousel rotation motor (Japanese Patent Application Laid-Open No. 2001-252866, U.S. Pat. No. 6,293,845). A scheme is also available in which a top ring is driven in a lateral direction by a linear motor attached to a carousel. According to this scheme, an end point detection method through detection of a torque current (motor current) of a linear motor is disclosed (U.S. Patent Application Publication No. 2014/0020830).

CITATION LIST

Patent Literature

PTL 1: Japanese Patent Application Laid-Open No. 2004-249458
PTL 2: Japanese Patent Application Laid-Open No. 2001-252866
PTL 3: U.S. Pat. No. 6,293,845
PTL 4: U.S. Patent Application Publication No. 2014/0020830

SUMMARY OF INVENTION

Technical Problem

A polishing process is executed by a polishing apparatus under a plurality of polishing conditions depending on a combination of types of polishing targets, types of polishing pads, types of polishing liquids (slurry) or the like. Under some of the plurality of polishing conditions, no significant change (characteristic point) may appear in the torque current even when a change occurs in the drive load of the drive section. When the change in the torque current is small, under influences of noise produced in the torque current or waviness produced in the waveform of the torque current, the polishing end point may not be detected appropriately, causing a problem with excessive polishing or the like.

Note that appropriately detecting the polishing end point is important also in dressing of the polishing pad. Dressing is performed by pushing a pad dresser with grinding stone such as diamond placed on a surface thereof against the polishing pad. By shaving or roughening the surface of the polishing pad using the pad dresser, retentivity of slurry of the polishing pad is improved before starting polishing or retentivity of slurry of the polishing pad in use is recovered to maintain polishing capability.

It is therefore an object of an aspect of the present invention to improve accuracy of detecting a polishing end point in a scheme in which a top ring is held to an end of a swing arm.

Solution to Problem

In order to solve the above-described problems, a first aspect adopts a configuration of a polishing apparatus for polishing between a polishing pad and a polishing object disposed opposed to the polishing pad, the polishing apparatus including a polishing table for holding the polishing pad, a holding section for holding the polishing object, a swing arm for holding the holding section, an arm drive section for swinging the swing arm, an arm torque detection section that directly or indirectly detects arm torque applied to the swing arm, and an end point detection section that detects a polishing end point that indicates the end of polishing based on the arm torque detected by the arm torque detection section.

Here, the polishing object is a substrate when the surface of the substrate which is a polishing target is planarized or a pad dresser when the polishing pad is dressed. Therefore, an end of polishing means an end of polishing of the surface of the substrate in the case of the substrate or means an end of polishing of the surface of the polishing pad in the case of dressing the polishing pad.

The present aspect is a scheme in which the top ring is held to an end of the swing arm and a polishing frictional force produced when a polishing target is polished appears as a drive load of the arm drive section as well. For example, when the arm drive section is an electric motor, the drive load (torque) can be measured as a current flowing through the motor. For this reason, it is possible to detect the motor current (torque current) using a current sensor or the like and detect an end point of polishing based on a change in the detected motor current.

According to the scheme in which the top ring is held to an end of the swing arm, polishing can also be performed without causing the swing arm to swing, that is, by causing the swing arm to stop (in a stationary state) at a predetermined position. While the swing arm is in a stationary state, it is possible to detect arm torque applied to the swing arm. Therefore, when compared to a scheme in which an end point is detected by detecting table torque applied to the rotating polishing table, noise associated with rotation is reduced. Since noise is reduced, the accuracy of polishing end point detection improves compared to the scheme in which table torque is detected.

Note that when polishing is performed while causing the swing arm to swing, it is possible to temporarily stop swinging the swing arm when detecting arm torque applied to the swing arm and detect the arm torque applied to swing arm. Furthermore, although noise may increase, the arm torque applied to the swing arm may be detected while causing the swing arm to swing.

A second aspect adopts the configuration of the polishing apparatus according to the first aspect, in which the holding section, the swing arm, the arm drive section and the torque detection section form a set, and the set is provided in plurality.

A third aspect adopts the configuration of the polishing apparatus according to the first or second aspect of the polishing apparatus, further including a table drive section that drives to rotate the polishing table and a table torque detection section that detects table torque applied to the polishing table, in which the end point detection section detects a polishing end point indicating the end of polishing based on the arm torque detected by the arm torque detection section and the table torque detected by the table torque detection section.

A fourth aspect adopts the configuration of the polishing apparatus according to any one of the first to third aspects, in which a ratio of a weight of the holding section to a weight of the swing arm is 0.3 to 1.5.

A fifth aspect adopts the configuration of the polishing apparatus according to any one of the first to fourth aspects, in which at a connection part to the arm drive section of the swing arm, the arm torque detection section detects the arm torque applied to the swing arm. An example of means for detecting torque is a method of detecting a current value of the rotation motor that causes the swing arm to rotate. Another example of the means for detecting torque is a method using a distortion gauge, a piezoelectric element, a magnetostriction torque sensor or the like disposed at the connection part to the arm drive section.

A sixth aspect adopts the configuration of the polishing apparatus according to any one of first to fifth aspects, in which the arm drive section is a rotation motor that causes the swing arm to rotate and the arm torque detection section detects the arm torque applied to the swing arm from a current value of the rotation motor. A polishing frictional force produced when polishing a polishing target affects a drive load of the arm drive section even when the swing arm is in a stationary state, because the polishing table or the top ring is rotating. Therefore, it is possible to detect arm torque applied to the swing arm from a current value of the rotation motor that causes the swing arm to rotate.

A seventh aspect adopts the configuration of the polishing apparatus according to any one of the first to fifth aspects, in which the arm drive section is a rotation motor that causes the swing arm to rotate, the arm torque detection section detects a current value of the rotation motor and the end point detection section detects a polishing end point indicating the end of polishing based on a differential value of the current value of the rotation motor.

An eighth aspect adopts the configuration of the polishing apparatus according to any one of the first to fourth aspects, in which the swing arm includes a plurality of arms and the arm torque detection section detects the arm torque applied to the swing arm at the connection part between the plurality of arms.

A ninth aspect adopts the configuration of the polishing apparatus according to any one of the first to eighth aspects, the polishing apparatus further including a carousel rotatable around a rotation shaft, in which the arm drive section is attached to the carousel.

A tenth aspect adopts the configuration of the polishing apparatus according to any one of the first to eighth aspects, the polishing apparatus further including a support frame, a track attached to the support frame for defining a transfer path of the arm drive section and a carriage for conveying the arm drive section along the path defined by the track, the carriage being coupled with the track and movable along the track.

An eleventh aspect adopts the configuration of the polishing apparatus according to any one of the first to ninth aspects, the polishing apparatus further including a polishing section that polishes the polishing object, a cleaning section that cleans and dries the polishing object, a barrier that separates the polishing section from the cleaning section, a transfer mechanism that conveys the polishing target after polishing from the polishing section to the cleaning section via an opening of the barrier and a housing including a side wall and incorporating the polishing section, the cleaning section and the transfer mechanism, in which the cleaning section includes cleaning means for cleaning the polishing object after polishing using a cleaning liquid, drying means for drying the polishing target after cleaning, and transfer means capable of transferring the polishing object between the cleaning means and the drying means horizontally and in a freely ascendable and descendable manner, and the polishing section includes the polishing table, the holding section, the swing arm and the arm drive section.

A twelfth aspect adopts the configuration of the polishing apparatus according to any one of the first to eleventh aspects, in which the end point detection section includes an optical sensor that exposes the polishing object to light and measures intensity of reflected light from the polishing object, and the end point detection section detects a polishing end point indicating the end of polishing based on the arm torque detected by the arm torque detection section and the intensity of the reflected light from the polishing object measured by the optical sensor.

A thirteenth aspect adopts the configuration of the polishing apparatus according to the twelfth aspect, in which the end point detection section includes a window assembled at a position in the polishing table opposable to the polishing object during polishing and the optical sensor is disposed below the window.

A fourteenth aspect adopts the configuration of the polishing apparatus according to the twelfth aspect, in which the polishing table includes an opening at a position in the polishing table opposable to the polishing object during polishing, the optical sensor is disposed below the window and the optical sensor includes a fluid supply section that supplies a cleaning fluid into the opening.

A fifteenth aspect adopts the configuration of the polishing apparatus according to any one of the first to fourteenth aspects, in which the end point detection section includes an eddy current type sensor that generates a magnetic field in the polishing object and detects intensity of the generated magnetic field, and the end point detection section detects a polishing end point indicating the end of polishing based on the arm torque detected by the arm torque detection section and the intensity of the magnetic field measured by the eddy current type sensor.

A sixteenth aspect adopts a configuration of a polishing method for polishing between a polishing pad and a polishing object disposed opposed to the polishing pad, the polishing method including holding the polishing pad in a polishing table, holding the polishing object by a swing arm, swinging the swing arm by an arm drive section, directly or indirectly detecting arm torque applied to the swing arm, and detecting a polishing end point that indicates the end of polishing based on the detected arm torque.

A seventeenth aspect adopts the configuration of the polishing method according to the sixteenth aspect, in which the swing arm includes a plurality of arms and the arm torque applied to the swing arm is detected at the connection part between the plurality of arms.

An eighteenth aspect adopts a configuration of a program for causing a computer for controlling a polishing apparatus including a holding section for holding a polishing object, a swing arm for holding the holding section and an arm torque detection section for directly or indirectly detecting arm torque applied to the swing arm for polishing the polishing object, to function as end point detection means for detecting a polishing end point indicating the end of polishing based on the arm torque detected by the arm torque detection section and control means for controlling polishing by the polishing apparatus.

A nineteenth aspect adopts the configuration of the program according to the eighteenth aspect, in which the program is updatable.

A twentieth aspect adopts a configuration of a polishing apparatus including a substrate processing apparatus that polishes a substrate and acquires a polishing-related signal and a data processing apparatus connected to the substrate processing apparatus by communication means, in which the data processing apparatus updates parameters relating to polishing processing based on a signal acquired by the substrate processing apparatus. Here, the signal is an analog signal and/or a digital signal.

Here, examples of the polishing parameters include (1) a pressing force on four regions of a semiconductor wafer, that is, a center part, an inside intermediate part, an outside intermediate part and a peripheral edge, (2) a polishing time, (3) the number of revolutions of a polishing table and a top ring and (4) a threshold for determination of a polishing end point. Parameter updating means updating these parameters.

A twenty-first aspect adopts the configuration of the polishing apparatus according to the twentieth aspect, in which the signal is acquired by one type of sensor or a plurality of different types of sensors. Examples of the different types of sensors used in the present aspect include the following sensors. That is, (1) a sensor for acquiring a measured signal relating to a torque fluctuation in a swing shaft motor, (2) an SOPM (optical sensor), (3) an eddy current sensor and (4) a sensor for acquiring a measured signal relating to a motor current fluctuation in a polishing table rotation motor.

A twenty-second aspect adopts a configuration of a polishing method including a step of connecting a substrate processing apparatus and a data processing apparatus via communication means, a step of polishing a substrate using the substrate processing apparatus and acquiring a polishing-related signal, and a step of updating parameters relating to polishing processing by the data processing apparatus based on the signal acquired by the substrate processing apparatus.

A twenty-third aspect adopts a configuration of a polishing apparatus including a substrate processing apparatus that polishes a substrate and acquires a polishing-related signal, an intermediate processing apparatus and a data processing apparatus, in which the substrate processing apparatus and the intermediate processing apparatus are connected via first communication means, the intermediate processing apparatus and the data processing apparatus are connected via second communication means, the intermediate processing apparatus creates a data set relating to polishing processing based on the signal acquired by the substrate processing apparatus, the data processing apparatus monitors a state of polishing processing of the substrate processing apparatus based on the data set, and the intermediate processing apparatus or the data processing apparatus detects a polishing end point indicating the end of polishing based on the data set.

A twenty-fourth aspect adopts the configuration of the polishing apparatus according to the twenty-third aspect, in which the signal is acquired by one type of sensor or a plurality of different types of sensors. Examples of the different types of sensors used in the present aspect include the following sensors. That is, (1) a sensor for acquiring a measured signal relating to a torque fluctuation in a swing shaft motor, (2) an SOPM (optical sensor), (3) an eddy current sensor and (4) a sensor for acquiring a measured signal relating to a motor current fluctuation in a polishing table rotation motor.

In a twenty-fifth aspect, examples of the data set according to the twenty-third aspect include the following. The sensor signal outputted by the sensor and necessary control parameters can be combined as a data set. That is, the data set can include a pressure of the top ring on the semiconductor wafer, a current of the swing shaft motor, a motor current of the polishing table, a measured signal of the optical sensor, a measured signal of the eddy current sensor, the position of the top ring on the polishing pad, a flow rate/type of slurry and a chemical liquid and their correlation calculation data or the like.

In a twenty-sixth aspect, examples of the data set transmission method according to the twenty-third aspect include the following. The data set can be transmitted using a transmission system that transmits one-dimensional data in parallel or a transmission system that sequentially transmits one-dimensional data. The one-dimensional data can be processed into two-dimensional data to form a data set.

In a twenty-seventh aspect, a signal whose signal value fluctuates greatly according to the twenty-third aspect can be extracted to update polishing parameters. Examples of the method of updating polishing parameters include the following. Priority ratio coefficients (weighting factors) are provided for both target values of a master sensor and a slave sensor to thereby define an influence ratio between the master sensor and the slave sensor. A signal whose signal value fluctuates greater is extracted to thereby change the priority ratio coefficient. Regarding signal value fluctuations, there are signal values that fluctuate only for a short period of time and signal values that fluctuate for a long period of time. Furthermore, a signal value fluctuation is a differential value of a signal value with respect to time or a difference value with respect to time or the like.

A twenty-eighth aspect adopts a configuration of a polishing method including a step of connecting a substrate processing apparatus that polishes a substrate and acquires a polishing-related signal and an intermediate processing apparatus via first communication means, a step of connecting the intermediate processing apparatus and a data processing apparatus via second communication means, a step by the intermediate processing apparatus of creating a data set relating to polishing processing based on the signal acquired by the substrate processing apparatus, a step by the data processing apparatus of monitoring a state of polishing processing of the substrate processing apparatus and a step by the intermediate processing apparatus or the data processing apparatus of detecting a polishing end point indicating the end of polishing based on the data set.

A twenty-ninth aspect adopts a configuration of a polishing apparatus including a substrate processing apparatus that polishes a substrate and acquires a polishing-related signal, an intermediate processing apparatus, a first data processing apparatus and a second data processing apparatus, in which the substrate processing apparatus and the intermediate processing apparatus are connected via first communication means, the intermediate processing apparatus and the first data processing apparatus are connected via second communication means, the first data processing apparatus and the second data processing apparatus are connected via third communication means, the first communication means can perform faster communication than the second and third communication means, the intermediate processing apparatus creates a data set relating to polishing processing based on the signal acquired by the substrate processing apparatus, the first or second data processing apparatus monitors a state of polishing processing of the substrate processing apparatus based on the data set, and the intermediate processing apparatus detects a polishing end point indicating the end of polishing based on the data set.

The twenty-ninth aspect can be combined with at least one of the above-described twenty-third to twenty-seventh aspects. Furthermore, the twenty-ninth aspect can be combined with the above-described second to sixteenth aspects.

A thirtieth aspect adopts a configuration of a polishing method including a step of connecting a substrate processing apparatus that polishes a substrate and acquires a polishing-related signal and an intermediate processing apparatus via first communication means, a step of connecting the intermediate processing apparatus and a first data processing apparatus via second communication means, a step of connecting the first data processing apparatus and a second data processing apparatus via third communication means, a step by the first communication means of performing faster communication than the second and third communication means, a step by the intermediate processing apparatus of creating a data set relating to polishing processing based on the signal acquired by the substrate processing apparatus, a step by the first or second data processing apparatus of monitoring a state of polishing processing of the substrate processing apparatus based on the data set, and a step by the intermediate processing apparatus of detecting a polishing end point indicating the end of polishing based on the data set.

A thirty-first aspect adopts a configuration of a polishing apparatus including a substrate processing apparatus that polishes a substrate and acquires a polishing-related signal, an intermediate processing apparatus and a data processing apparatus, in which the substrate processing apparatus and the intermediate processing apparatus are connected via first communication means, the substrate processing apparatus and the data processing apparatus are connected via second communication means, the first communication means can perform faster communication than the second communication means, the intermediate processing apparatus creates a data set relating to polishing processing based on the signal acquired by the substrate processing apparatus, the data processing apparatus monitors a state of the substrate processing apparatus, and the intermediate processing apparatus detects a polishing end point indicating the end of polishing based on the data set.

A thirty-second aspect adopts the configuration of the polishing apparatus according to the thirty-first aspect, in which the data processing apparatus monitors the detection of the polishing end point by the intermediate processing apparatus.

A thirty-third aspect adopts the configuration of the polishing apparatus according to the thirty-first aspect further including a plurality of types of end point detection sensors for detecting a polishing end point indicating the end of polishing, in which the intermediate processing apparatus updates polishing parameters by extracting signal values whose fluctuations are greater than other signal values among the plurality of signal values outputted from the plurality of types of end point detection sensors.

A thirty-fourth aspect adopts the configuration of the polishing apparatus according to the thirty-first aspect, in which the substrate processing apparatus includes a holding section for holding the polishing object, a swing arm for holding the holding section, an arm drive section for causing the swing arm to swing and an arm torque detection section for directly or indirectly detecting arm torque applied to the swing arm, and a polishing end point indicating the end of polishing is detected based on the arm torque detected by the arm torque detection section.

Note that the thirty-first aspect can be combined with at least one aspect of the above-described twenty-third to twenty-seventh aspects. Moreover, the thirty-first aspect can be combined with the above-described second to sixteenth aspects.

A thirty-fifth aspect adopts a configuration of a polishing method including a step of connecting a substrate processing apparatus that polishes a substrate and acquires a polishing-related signal and an intermediate processing apparatus via first communication means, a step of connecting the substrate processing apparatus and the data processing apparatus via second communication means, a step by the first communication means of performing faster communication than the second communication means, a step by the intermediate processing apparatus of creating a data set relating to polishing processing based on the signal acquired by the substrate processing apparatus, a step by the data processing apparatus of monitoring a state of the substrate processing apparatus, and a step by the intermediate processing apparatus of detecting a polishing end point indicating the end of polishing based on the data set.

DESCRIPTION OF EMBODIMENTS

Figure 1:
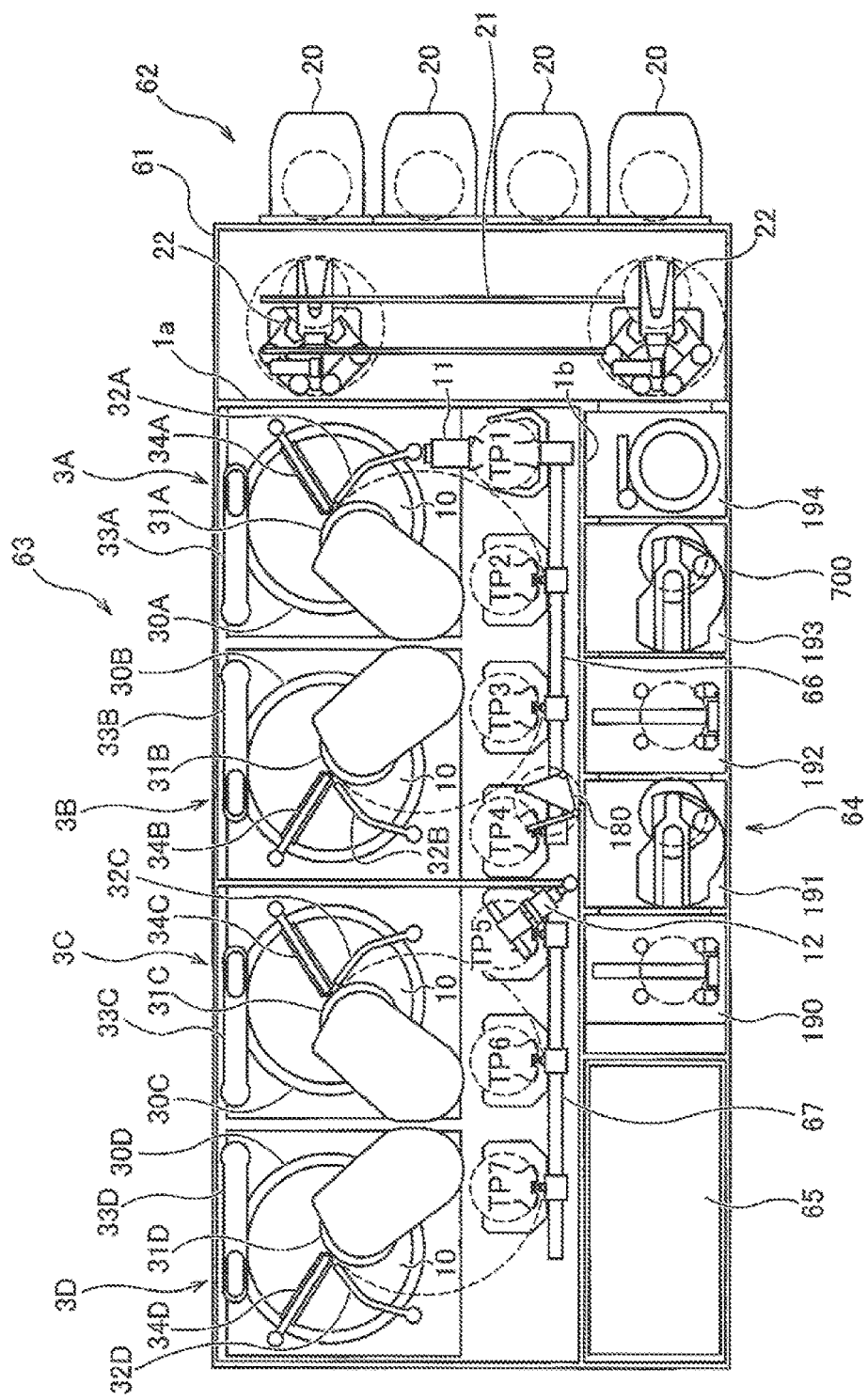
FIG. 1 is a plan view illustrating a whole arrangement of a substrate processing apparatus according to an embodiment of the present invention.

Hereinafter, embodiments of the present invention will be described with reference to the accompanying drawings. Note that identical or corresponding members among the following embodiments are assigned identical reference numerals and duplicate description will be omitted.

FIG. 1 is a plan view illustrating a whole arrangement of a substrate processing apparatus according to an embodiment of the present invention. As shown in FIG. 1, the substrate processing apparatus is provided with a substantially rectangular housing 61. The housing 61 includes a side wall 700. An interior of the housing 61 is partitioned into a load/unload section 62, a polishing section 63 and a cleaning section 64 by barriers 1a and 1b. These load/unload section 62, polishing section 63 and cleaning section 64 are assembled independently and a gas therein is exhausted independently. Furthermore, the substrate processing apparatus includes a control section 65 that controls substrate processing operation.

The load/unload section 62 is provided with two or more (four in the present embodiment) front load sections 20 on which wafer cassettes for stocking many wafers (substrates) are placed. The front load sections 20 are arranged adjacent to the housing 61 and arrayed along a width direction of the substrate processing apparatus (direction perpendicular to a longitudinal direction). The front load section 20 can mount an open cassette, a SMIF (standard manufacturing interface) pod or a FOUP (front opening unified pod). Here, the SMIF and the FOUP are airtight containers that house a wafer cassette, cover it with a barrier and can thereby maintain an environment independent of an external space.

A traveling mechanism 21 is laid on the load/unload section 62 along a direction in which the front load sections 20 are arranged side by side. Two transfer robots (loaders) 22 which are movable along a wafer cassette array direction are laid on the traveling mechanism 21. The transfer robots 22 can access the wafer cassettes mounted on the front load sections 20 by moving on the traveling mechanism 21. Each transfer robot 22 is provided with two bands, upper and lower. The upper hand is used to return a processed wafer to the wafer cassette. The lower hand is used to unload a wafer before processing from the wafer cassette. In this way, the upper and lower hands are used for different purposes. The wafer can be turned over by causing the lower hand of the robot 22 to turn around its shaft center.

The load/unload section 62 is a region that must be kept most clean. Therefore, the interior of the load/unload section 62 is always kept to a higher pressure than the outside of the substrate processing apparatus, the polishing section 63 and the cleaning section 64. The polishing section 63 uses slurry as a polishing liquid, and is therefore the dirtiest region. Therefore, a negative pressure is formed inside the polishing section 63 and the pressure thereof is kept lower than the inner pressure of the cleaning section 64. The load/unload section 62 is provided with a filter fan unit (not shown) including a clean air filter such as a HEPA filter, ULPA filter or chemical filter. Clean air stripped of particles, poisonous vapor or poisonous gas is always blown from the filter fan unit.

The polishing section 63 is a region where a wafer is polished (planarized) and is provided with a first polishing unit 3A, a second polishing unit 3B, a third polishing unit 3C and a fourth polishing unit 3D. The first polishing unit 3A, second polishing unit 3B, third polishing unit 3C and fourth polishing unit 3D are arrayed along the longitudinal direction of the substrate processing apparatus as shown in FIG. 1.

As shown in FIG. 1, the first polishing unit 3A is provided with a polishing table 30A, a top ring 31A, a polishing liquid supply nozzle 32A, a dresser 33A, and an atomizer 34A. A polishing pad 10 having a polishing surface is attached to the polishing table 30A. The top ring (holding section) 31A holds the wafer and polishes the wafer while pressing the wafer against the polishing pad 10 on the polishing table 30A. The polishing liquid supply nozzle 32A supplies a polishing liquid or a dressing liquid (e.g., pure water) to the polishing pad 10. The dresser 33A performs dressing on the polishing surface of the polishing pad 10. The atomizer 34A atomizes a fluid in which a liquid (e.g., pure water) and a gas (e.g., nitrogen gas) are mixed or a liquid (e.g., pure water) and jets the fluid or liquid onto the polishing surface.

Similarly, the second polishing unit 3B is provided with a polishing table 30B to which the polishing pad 10 is attached, a top ring 31B, a polishing liquid supply nozzle 32B, a dresser 33B and an atomizer 34B. The third polishing unit 3C is provided with a polishing table 30C to which the polishing pad 10 is attached, a top ring 31C, a polishing liquid supply nozzle 32C, a dresser 33C and an atomizer 34C. The fourth polishing unit 3D is provided with a polishing table 30D to which the polishing pad 10 is attached, a top ring 31D, a polishing liquid supply nozzle 32D, a dresser 33D and an atomizer 34D.

The first polishing unit 3A, the second polishing unit 3B, the third polishing unit 3C and the fourth polishing unit 3D have identical configurations, and so the details of the polishing units will be described using the first polishing unit 3A as a target.

Figure 19:
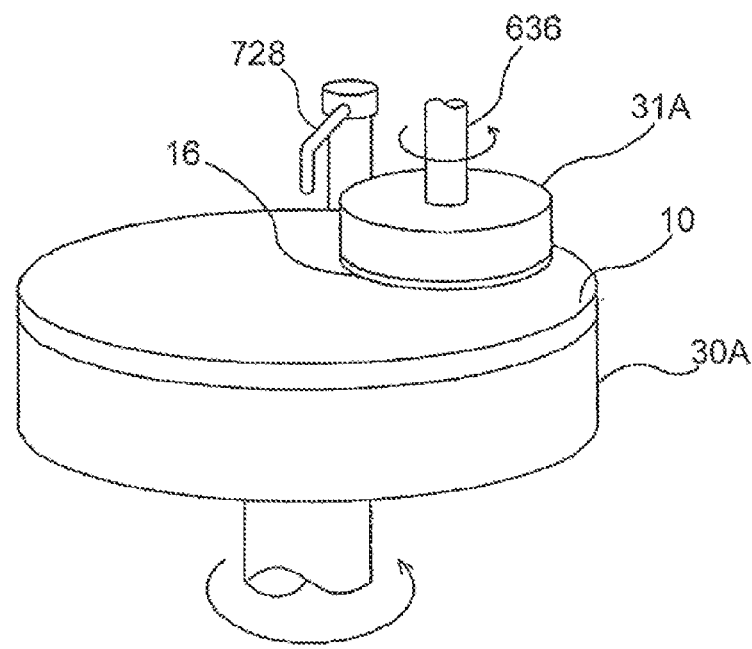
FIG. 19 is a perspective view schematically illustrating a first polishing unit.

FIG. 19 is a perspective view schematically illustrating the first polishing unit 3A. The top ring 31A is supported by a top ring shaft 636. The polishing pad 10 is pasted to the top surface of the polishing table 30A and the top surface of the polishing pad 10 constitutes a polishing surface for polishing a semiconductor wafer 16. Note that fixed abrasive grains may also be used instead of the polishing pad 10. The top ring 31A and the polishing table 30A are configured to rotate around the shaft center as shown by an arrow. The semiconductor wafer 16 is held to the undersurface of the top ring 31A by vacuum suction. During polishing, a polishing liquid is supplied from the polishing liquid supply nozzle 32A to the polishing surface of the polishing pad 10, and the semiconductor wafer 16 which is the polishing target is pressed against the polishing surface by the top ring 31A and is polished.

Figure 20:
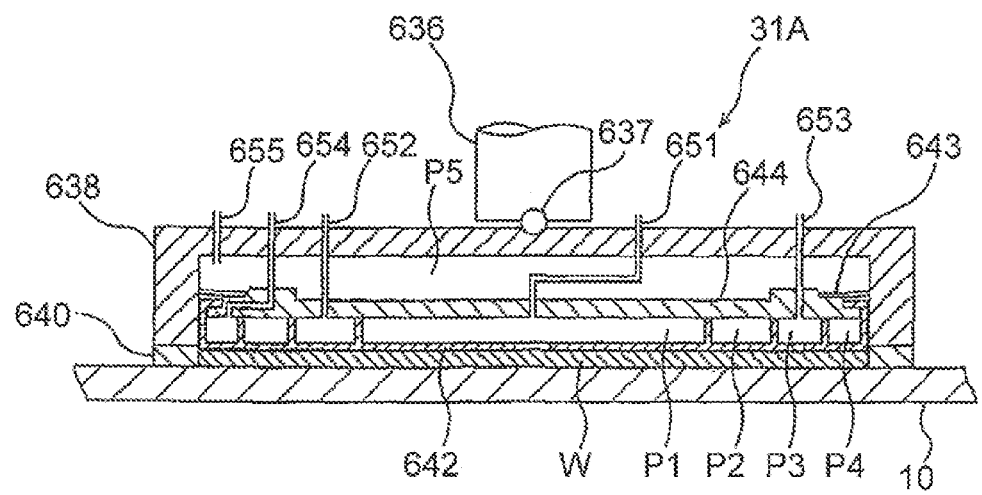
FIG. 20 is a cross-sectional view schematically illustrating a structure of a top ring.

FIG. 20 is a cross-sectional view schematically illustrating a structure of the top ring 31A. The top ring 31A is connected to a bottom end of the top ring shaft 636 via a universal joint 637. The universal joint 637 is a ball joint that transmits the rotation of the top ring shaft 636 to the top ring 31A while allowing mutual tilting of the top ring 31A and the top ring shaft 636. The top ring 31A is provided with a substantially disk-shaped top ring body 638 and a retainer ring 640 disposed below the top ring body 638. The top ring body 638 is formed of a material with high strength and rigidity such as metal or ceramics. The retainer ring 640 is formed of a resin material or ceramics with high rigidity. Note that the retainer ring 640 may be formed integrally with the top ring body 638.

A circular elastic pad 642 in contact with the semiconductor wafer 16, a ring-shaped pressuring sheet 643 made of an elastic film and a substantially disk-shaped chucking plate 644 for holding the elastic pad 642 are housed in a space formed inside the top ring body 638 and the retainer ring 640. An upper circumferential edge of the elastic pad 642 is held to the chucking plate 644, and four pressure chambers (airbags) P1, P2, P3 and P4 are provided between the elastic pad 642 and the chucking plate 644. The pressure chambers P1, P2, P3 and P4 are formed of the elastic pad 642 and the chucking plate 644. The pressure chambers P1, P2, P3 and P4 are respectively supplied with a pressurized fluid such as pressurized air or evacuated via fluid channels 651, 652, 653 and 654. The pressure chamber P1 in the center is circular and the pressure chambers P2, P3 and P4 are annular. The pressure chambers P1, P2, P3 and P4 are concentrically arranged.

Inner pressures of the pressure chambers P1, P2, P3 and P4 can be changed independently by a pressure adjusting section, which will be described later, and it is possible to thereby adjust pressing forces on four regions of the semiconductor wafer 16, that is, a central part, an inside intermediate part, an outside intermediate part and a peripheral edge independently. The retainer ring 640 can be pressed against the polishing pad 10 with a predetermined pressing force by causing the entire top ring 31A to ascend or descend. A pressure chamber P5 is formed between the chucking plate 644 and the top ring body 638, a pressurized fluid is supplied to the pressure chamber P5 or evacuated via a fluid channel 655. This allows the chucking plate 644 and the elastic pad 642 as a whole to move in the vertical direction.

The peripheral edge of the semiconductor wafer 16 is surrounded by the retainer ring 640 so that the semiconductor wafer 16 does not slip out of the top ring 31A during polishing. An opening (not shown) is formed in the region of the elastic pad 642 making up the pressure chamber P3, and by forming vacuum in the pressure chamber P3, the semiconductor wafer 16 is suctioned and held to the top ring 31A. Furthermore, by supplying a nitrogen gas, dry air, compressed air or the like to the pressure chamber P3, the semiconductor wafer 16 can be released from the top ring 31A.

Figure 21:
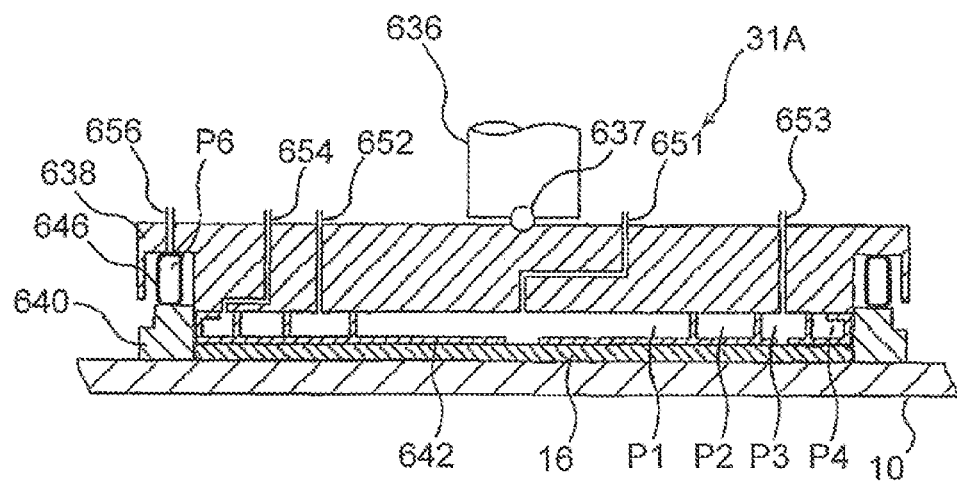
FIG. 21 is a cross-sectional view schematically illustrating another structure example of the top ring.

FIG. 21 is a cross-sectional view schematically illustrating another structure example of the top ring 31A. In this example, no chucking plate is provided and the elastic pad 642 is attached to an undersurface of the top ring body 638. No pressure chamber P5 is provided between the chucking plate and the top ring body 638, either. Instead, an elastic bag 646 is disposed between the retainer ring 640 and the top ring body 638, and a pressure chamber P6 is formed inside the elastic bag 646. The retainer ring 640 is designed to be movable relative to the top ring body 638 in the vertical direction. A fluid channel 656 communicates with the pressure chamber P6 and a pressurized fluid such as pressurized air is supplied to the pressure chamber P6 via the fluid channel 656. An inner pressure of the pressure chamber P6 can be adjusted by a pressure adjusting section, which will be described later. Therefore, it is possible to adjust the pressing force of the retainer ring 640 on the polishing pad 10 independently of the pressing force on the semiconductor wafer 16. Other components and operations are the same as the components of the top ring shown in FIG. 20. Either type of top ring in FIG. 20 or FIG. 21 can be used in the present embodiment.

Figure 22:
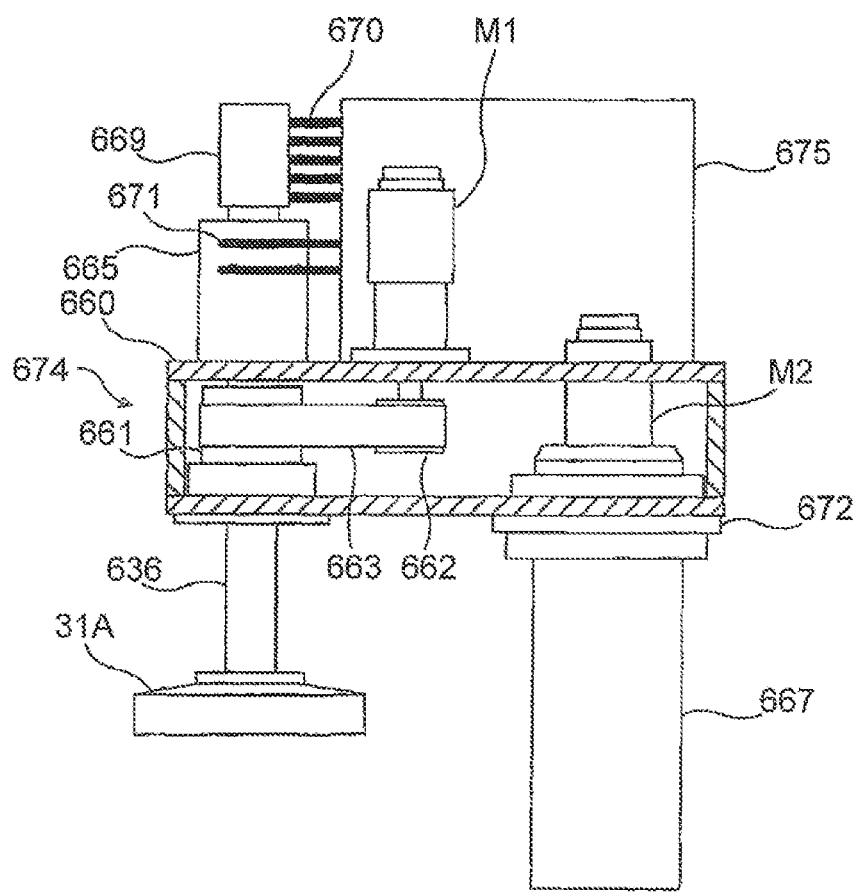
FIG. 22 is a cross-sectional view for describing a mechanism for causing the top ring to rotate and swing.

FIG. 22 is a cross-sectional view for describing a mechanism for causing the top ring 31A to rotate and swing. The top ring shaft (e.g., spline shaft) 636 is rotatably supported by a top ring head 660. Furthermore, the top ring shaft 636 is connected to a rotation shaft of a motor M1 via pulleys 661 and 662, and a belt 663, and the motor M1 causes the top ring shaft 636 and the top ring 31A to rotate around a shaft center thereof. The motor M1 is attached above the top ring head 660. The top ring head 660 and the top ring shaft 636 are connected via an air cylinder 665 as a vertical drive source. Air (compressed gas) supplied to the air cylinder 665 causes the top ring shaft 636 and the top ring 31A to integrally move in the vertical direction. Note that a mechanism including a ball screw and a servo motor may also be used as the vertical drive source instead of the air cylinder 665.

The top ring head 660 is rotatably supported by a support shaft 667 via a bearing 672. The support shaft 667 is a fixed shaft and has a non-rotating structure. A motor M2 is installed in the top ring head 660, and relative positions of the top ring head 660 and the motor M2 are fixed. The rotation shaft of the motor M2 is connected to the support shaft 667 via a rotation transmission mechanism (gear or the like) which is not shown, and by causing the motor M2 to rotate, the top ring head 660 swings around the support shaft 667. Therefore, through swing motion of the top ring head 660, the top ring 31A supported at a distal end thereof moves between a polishing position above the polishing table 30A and a transfer position on a side of the polishing table 30A. Note that the swing mechanism for causing the top ring 31A to swing is constructed of the motor M2 in the present embodiment.

A through hole (not shown) extending in a longitudinal direction is formed inside the top ring shaft 636. The fluid channels 651, 652, 653, 654, 655 and 656 of the aforementioned top ring 31A pass through the through hole and are connected to a rotary joint 669 provided at a top end of the top ring shaft 636. A fluid such as a pressurized gas (clean air) or nitrogen gas is supplied to the top ring 31A via the rotary joint 669 and a gas is evacuated from the top ring 31A. A plurality of fluid pipes 670 communicating with the above-described fluid channels 651, 652, 653, 654, 655 and 656 (see FIG. 20 and FIG. 21) are connected to the rotary joint 669 and the fluid pipes 670 are connected to a pressure adjusting section 675. A fluid pipe 671 that supplies pressurized air to the air cylinder 665 is also connected to the pressure adjusting section 675.

The pressure adjusting section 675 includes an electropneumatic regulator that adjusts a pressure of the fluid supplied to the top ring 31A, pipes connected to the fluid pipes 670 and 671, air operation valves provided in these pipes, an electropneumatic regulator that adjusts a pressure of air which becomes an operation source of the air operation valves and an ejector that forms vacuum in the top ring 31A, and these components are congregated together to form one block (unit). The pressure adjusting section 675 is fixed to the upper part of the top ring head 660. The pressures of the pressurized gas supplied to the pressure chambers P1, P2, P3, P4 and P5 (see FIG. 20) of the top ring 31A and pressurized air supplied to the air cylinder 665 are adjusted by the electropneumatic regulator of the pressure adjusting section 675. Similarly, a vacuum is formed by an ejector of the pressure adjusting section 675 in the airbags P1, P2, P3 and P4 of the top ring 31A and the pressure chamber P5 between the chucking plate 44 and the top ring body 38.

Since the electropneumatic regulator which is a pressure adjusting device or a valve is installed near the top ring 31A in this way, controllability of the pressure in the top ring 31A is improved. More specifically, since the distances from the electropneumatic regulator to the pressure chambers P1, P2, P3, P4 and P5 are small, responsivity to a pressure change command from the control section 65 improves. Since the ejector which is a vacuum source is also installed near the top ring 31A, responsivity when a vacuum is formed in the top ring 31A improves likewise. Furthermore, it is possible to use a reverse side of the pressure adjusting section 675 as a pedestal for mounting electrical equipment and thereby eliminate the necessity for a mounting frame which is conventionally required.

The top ring head 660, the top ring 31A, the pressure adjusting section 675, the top ring shaft 636, the motor M1, the motor M2 and the air cylinder 665 are configured as one module (hereinafter referred to as a "top ring assembly"). That is, the top ring shaft 636, the motor M1, the motor M2, the pressure adjusting section 675 and the air cylinder 665 are attached to the top ring head 660. The top ring head 660 is configured to be removable from the support shaft 667. Therefore, by separating the top ring head 660 from the support shaft 667, it is possible to remove the top ring assembly from the substrate processing apparatus. Such a configuration can improve maintainability of the support shaft 667, the top ring head 660 or the like. For example, when an abnormal sound is generated from the bearing 672, the bearing 672 can be easily replaced and when replacing the motor M2 or the rotation transmission mechanism (reduction gear), adjacent devices need not be removed.

Figure 23:
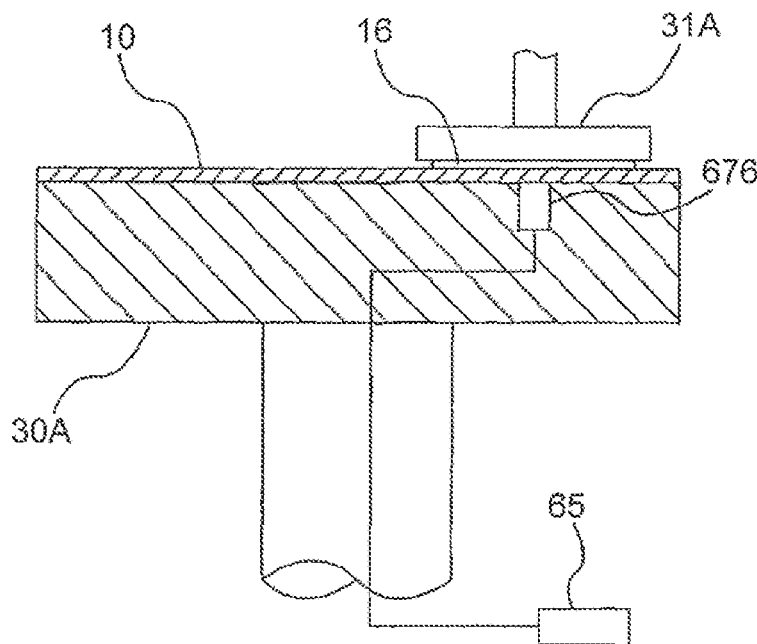
FIG. 23 is a cross-sectional view schematically illustrating an inner structure of the polishing table.

FIG. 23 is a cross-sectional view schematically illustrating an inner structure of the polishing table 30A. As shown in FIG. 23, a sensor 676 for detecting a state of the film of the semiconductor wafer 16 is embedded in the polishing table 30A. In this example, an eddy current sensor is used as the sensor 676. A signal of the sensor 676 is transmitted to the control section 65 and the control section 65 generates a monitoring signal indicating a film thickness. Although the value of the monitoring signal (and the sensor signal) does not indicate the film thickness itself, the value of the monitoring signal varies in accordance with the film thickness. Therefore, the monitoring signal can be said to be a signal indicating a film thickness of the semiconductor wafer 16.

The control section 65 determines inner pressures of the respective pressure chambers P1, P2, P3 and P4 based on the monitoring signal and issues a command to the pressure adjusting section 675 so that the determined inner pressures are formed in the respective pressure chambers P1, P2, P3 and P4. The control section 65 functions as a pressure control section that operates the inner pressures of the respective pressure chambers P1, P2, P3 and P4 and an end point detection section that detects a polishing end point based on the monitoring signal.

As in the case of the first polishing unit 3A, the sensor 676 is also provided in each polishing table of the second polishing unit 3B, the third polishing unit 3C and the fourth polishing unit 3D. The control section 65 generates a monitoring signal from signals sent from each sensor 676 of the respective polishing units 3A to 3D and monitors the progress of polishing of the wafer in the respective polishing units 3A to 3D. When a plurality of wafers are polished in the polishing units 3A to 3D, the control section 5 monitors the monitoring signal indicating the film thickness of the wafer during polishing and controls the pressing forces of the top rings 31A to 31D based on the monitoring signals so that polishing times in the polishing units 3A to 3D become substantially identical. By adjusting the pressing forces of the top rings 31A to 31D during polishing based on the monitoring signals in this way, it is possible to level the polishing times in the polishing units 3A to 3D.

The semiconductor wafer 16 may be polished by any one of the first polishing unit 3A, the second polishing unit 3B, the third polishing unit 3C and the fourth polishing unit 3D or may be polished consecutively by a plurality of polishing units selected in advance from among the polishing units 3A to 3D. For example, the semiconductor wafer 16 may be polished in order of the first polishing unit 3A→the second polishing unit 3B or may be polished in order of the third polishing unit 3C→the fourth polishing unit 3D. Moreover, the semiconductor wafer 16 may be polished in order of the first polishing unit 3A→the second polishing unit 3B→the third polishing unit 3C→the fourth polishing unit 3D. In all cases, it is possible to improve a throughput by leveling polishing times of all the polishing units 3A to 3D.

An eddy current sensor is preferably used when the film of the wafer is a metal film. When the film of the wafer is a film having a light transmissive property such as an oxide film, an optical sensor can be used as the sensor 676. Alternatively, a microwave sensor may be used as the sensor 676. A microwave sensor can also be used for both a metal film and a non-metal film. Hereinafter, examples of an optical sensor and a microwave sensor will be described.

Figure 24:
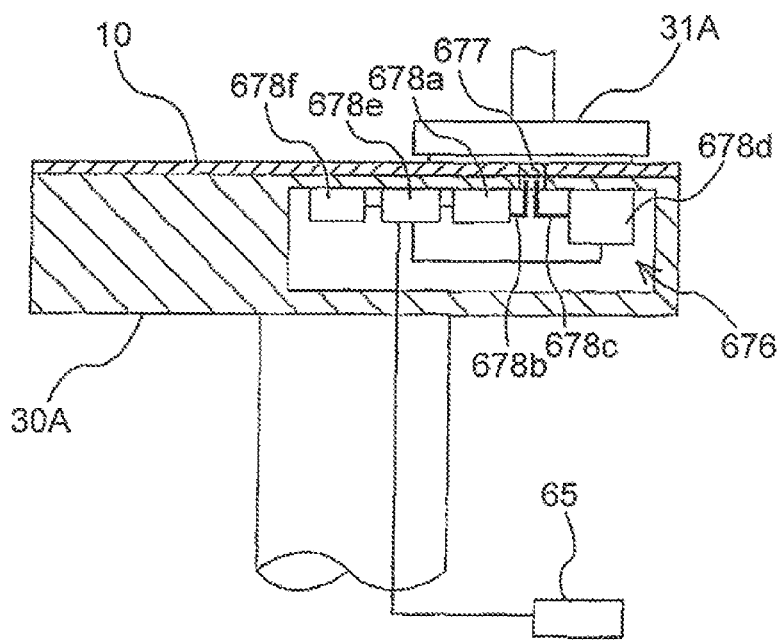
FIG. 24 is a schematic view illustrating a polishing table provided with an optical sensor.

FIG. 24 is a schematic view illustrating a polishing table provided with an optical sensor. As shown in FIG. 24, the optical sensor 676 for detecting a film state of the semiconductor wafer 16 is embedded in the polishing table 30A. The sensor 676 irradiates the semiconductor wafer 16 with light and detects the film state (film thickness or the like) of the semiconductor wafer 16 from the intensity (reflection intensity or reflection factor) of reflected light from the semiconductor wafer 16.

The polishing pad 10 is provided with a light transmitting section 677 for transmitting light from the sensor 676. The light transmitting section 677 is formed of a material with high transmittance such as non-foaming polyurethane. Alternatively, the light transmitting section 677 may also be configured by providing a through hole in the polishing pad 10 and causing a transparent liquid to flow from below while the through hole is closed by the semiconductor wafer 16. The light transmitting section 677 is disposed at a position corresponding to the center of the semiconductor wafer 16 held to the top ring 31A.

As shown in FIG. 24, the sensor 676 is provided with a light source 678a, a light-emitting optical fiber 678b as a light-emitting section that irradiates a surface to be polished of the semiconductor wafer 16 with light from the light source 678a, a light-receiving optical fiber 678c as a light-receiving section that receives light reflected from the surface to be polished, a spectroscope unit 678*d* that incorporates a spectroscope that disperses the light received by the light-receiving optical fiber 678*c* and a plurality of light-receiving devices that store the light dispersed by the spectroscope as electrical information, an operation control section 678*e* that controls lighting on/off of the light source 678*a* and read start timing or the like of the light-receiving device in the spectroscope unit 678*d*, and a power supply 678*f* that supplies power to the operation control section 678*e*. Note that power is supplied to the light source 678*a* and the spectroscope unit 678*d* via the operation control section 678*e*.

A light-emitting end of the light-emitting optical fiber 678*b* and a light-receiving end of the light-receiving optical fiber 678*c* are configured so as to be substantially perpendicular to the surface to be polished of the semiconductor wafer 16. As the light-receiving device in the spectroscope unit 678*d*, for example, a photodiode array of 128 elements can be used. The spectroscope unit 678*d* is connected to the operation control section 678*e*. Information from the light-receiving device in the spectroscope unit 678*d* is sent to the operation control section 678*e* and spectral data of the reflected light is generated based on this information. That is, the operation control section 678*e* reads electrical information stored in the light-receiving device and generates spectral data of the reflected light. The spectral data indicates the intensity of the reflected light decomposed according to the wavelength and varies depending on the film thickness.

The operation control section 678*e* is connected to the aforementioned control section 65. The spectral data generated in the operation control section 678*e* is transmitted to the control section 65. The control section 65 calculates a characteristic value associated with the film thickness of the semiconductor wafer 16 based on the spectral data received from the operation control section 678*e* and uses the characteristic value as a monitoring signal.

Figure 25:
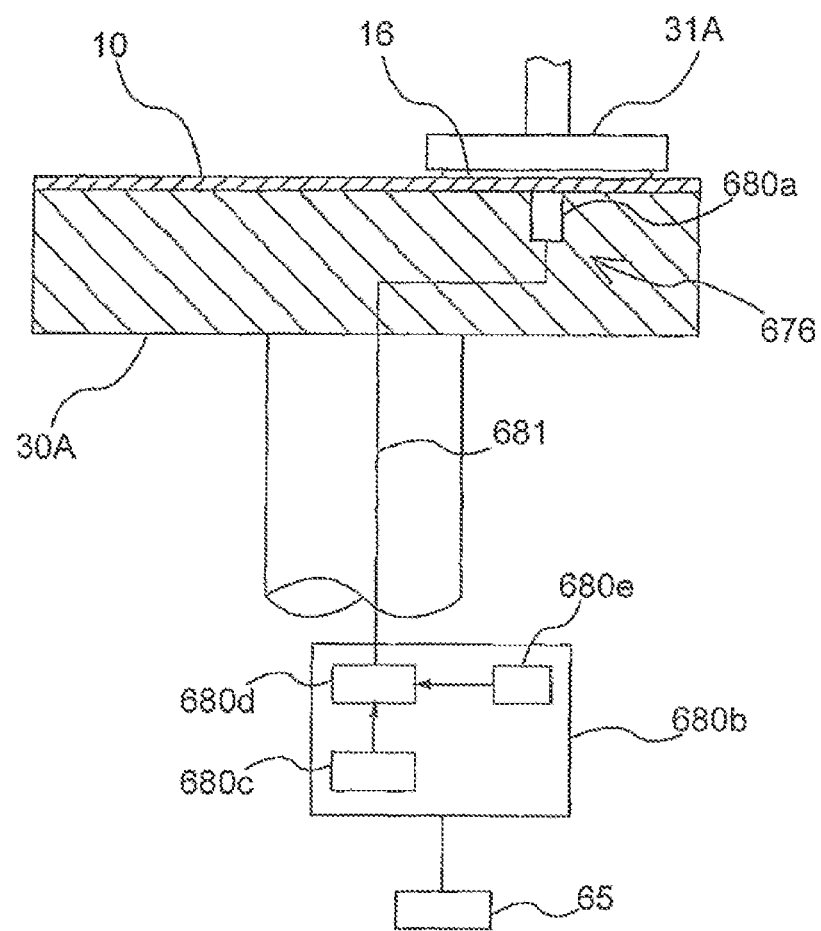
FIG. 25 is a schematic view illustrating a polishing table provided with a microwave sensor.

FIG. 25 is a schematic view illustrating the polishing table provided with a microwave sensor. The sensor 676 is provided with an antenna 680*a* that irradiates the surface to be polished of the semiconductor wafer 16 with a microwave, a sensor body 680*b* that supplies microwave to the antenna 680*a*, and a waveguide 681 that connects the antenna 680*a* and the sensor body 680*b*. The antenna 680*a* is embedded in the polishing table 30A and is disposed opposed to the center position of the semiconductor wafer 16 held to the top ring 31A.

The sensor body 680*b* is provided with a microwave source 680*c* that generates a microwave and supplies the microwave to the antenna 680*a*, a separator 680*d* that separates the microwave (incident wave) generated from the microwave source 680*c* from the microwave (reflected wave) reflected from the surface of the semiconductor wafer 16 and a detection section 680*e* that receives the reflected wave separated by the separator 680*d* and detects the amplitude and the phase of the reflected wave. Note that a directional coupler is preferably used as the separator 680*d*.

The antenna 680*a* is connected to the separator 680*d* via the waveguide 681. The microwave source 680*c* is connected to the separator 680*d*, and a microwave generated by the microwave source 680*c* is supplied to the antenna 680*a* via the separator 680*d* and the waveguide 681. The microwave is radiated from the antenna 680*a* onto the semiconductor wafer 16, passes (penetrates) through the polishing pad 610 and reaches the semiconductor wafer 16. The reflected wave from the semiconductor wafer 16 passes through the polishing pad 10 again and is then received by the antenna 680*a*.

The reflected wave is sent from the antenna 680*a* to the separator 680*d* via the waveguide 681 and separated into an incident wave and a reflected wave by the separator 680*d*. The reflected wave separated by the separator 680*d* is transmitted to the detection section 680*e*. The detection section 680*e* detects the amplitude and the phase of the reflected wave. The amplitude of the reflected wave is detected as power (dbm or W) or a voltage (V) and the phase of the reflected wave is detected by a phase measuring instrument (not shown) incorporated in the detection section 680*e*. The amplitude and the phase of the reflected wave detected by the detection section 680*e* are sent to the control section 65, where the film thickness of a metal film or non-metal film or the like of the semiconductor wafer 16 is analyzed based on the amplitude and the phase of the reflected wave. The analyzed values are monitored by the control section 65 as monitoring signals.

Figure 26:
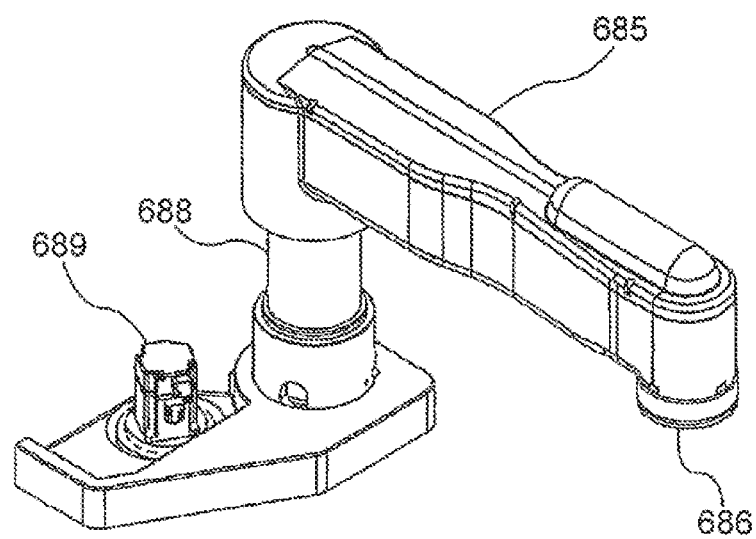
FIG. 26 is a perspective view illustrating a dresser.

FIG. 26 is a perspective view illustrating the dresser 33A usable as an embodiment of the present invention. As shown in FIG. 26, the dresser 33A is provided with a dresser arm 685, a dressing member 686 rotatably attached to a distal end of the dresser arm 685, a swing shaft 688 connected to the other end of the dresser arm 685 and a motor 689 as a drive mechanism that causes the dresser arm 685 to swing around the swing shaft 688. The dressing member 686 has a circular dressing surface and rigid grains are fixed to the dressing surface. Examples of the rigid grains include diamond grains and ceramic grains. The dresser arm 685 incorporates a motor which is not shown and the motor causes the dressing member 686 to rotate. The swing shaft 688 is connected to an ascending/descending mechanism which is not shown and the dresser arm 685 descends through the ascending/descending mechanism, whereby the dressing member 686 presses the polishing surface of the polishing pad 10.

Figure 27A:
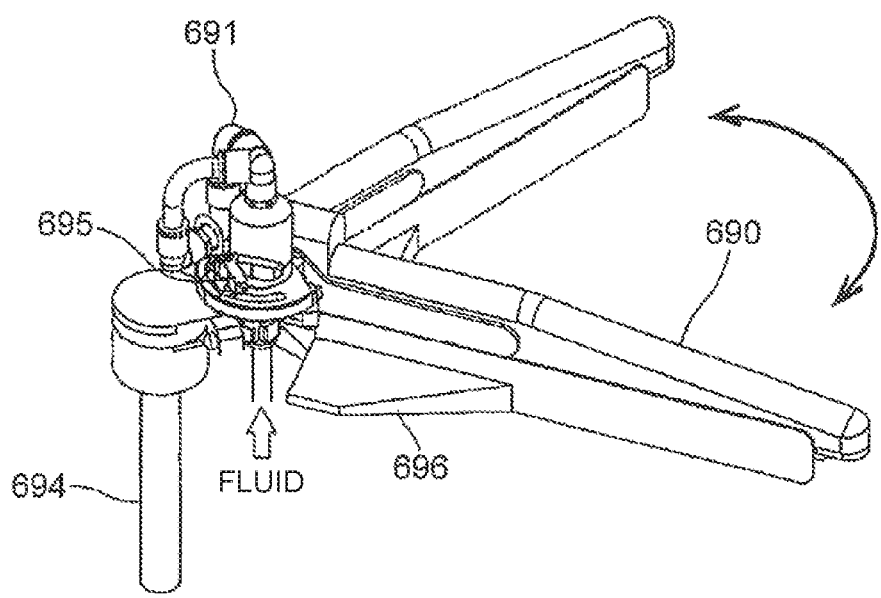
FIG. 27A is a perspective view illustrating an atomizer and FIG. 27B is a schematic view illustrating a lower part of an arm.
Figure 27B:
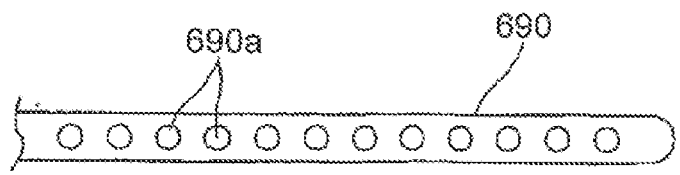

FIG. 27A is a perspective view illustrating the atomizer 34A. The atomizer 34A is provided with an arm 690 provided with one or a plurality of jet holes below, a fluid channel 691 connected to the arm 690 and a swing shaft 694 that supports the arm 690. FIG. 27B is a schematic view illustrating a lower part of the arm 690. In the example shown in FIG. 27B, a plurality of jet holes 690*a* are formed at equal intervals in the lower part of the arm 690. The fluid channel 691 can be made up of a tube or a pipe or a combination thereof.

Figure 28A:
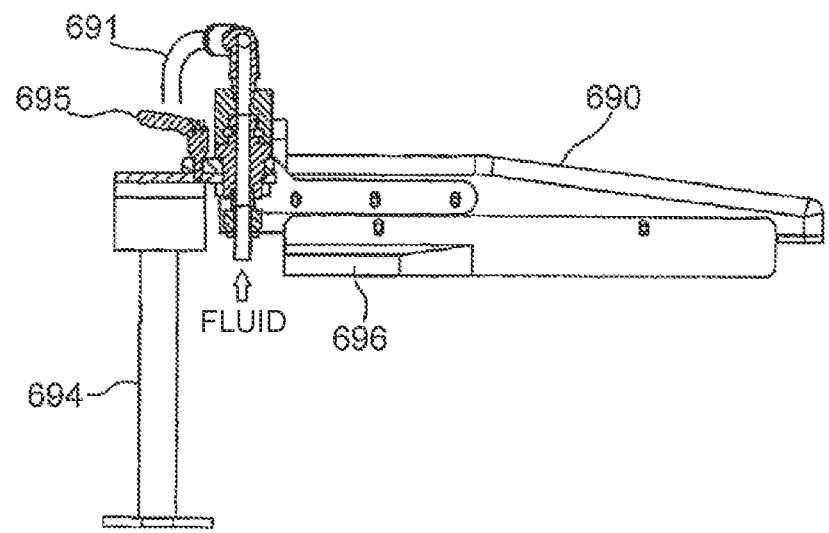
FIG. 28A is a side view illustrating an inner structure of the atomizer and FIG. 28B is a plan view illustrating the atomizer.
Figure 28B:
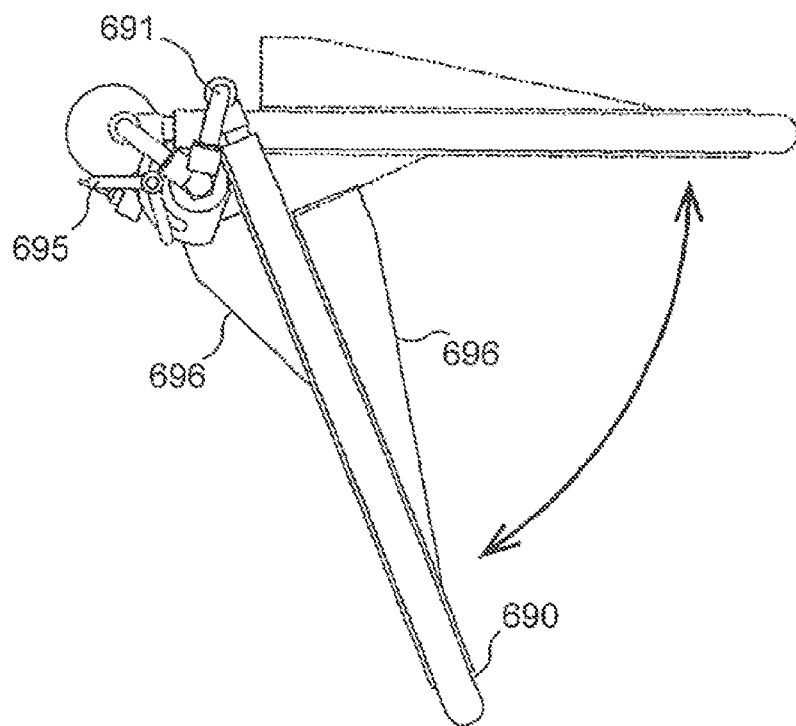

FIG. 28A is a side view illustrating an inner structure of the atomizer 34A and FIG. 28B is a plan view illustrating the atomizer 34A. An opening end portion of the fluid channel 691 is connected to a fluid supply pipe which is not shown and a fluid is supplied from the fluid supply pipe to the fluid channel 691. Examples of the fluid used include a liquid (e.g., pure water), or a fluid as a liquid and gas mixture (e.g., a fluid with a mixture of pure water and nitrogen gas). The fluid channel 691 communicates with the jet holes 690*a* of the arm 690 and the fluid is atomized and jetted out from the jet holes 690*a* onto the polishing surface of the polishing pad 10.

The arm 690 is turnable around the swing shaft 694 between a cleaning position and a retracted position as shown by dotted lines in FIG. 27A and FIG. 28B. A movable angle of the arm 690 is approximately 90°. The arm 690 is normally located at the cleaning position and disposed along the diameter direction of the polishing surface of the polishing pad 10 as shown in FIG. 1. During maintenance such as replacement of the polishing pad 10, the arm 690 is manually moved to the retracted position. Therefore, the arm 690 need not be removed during maintenance, and it is thereby possible to improve maintainability. Note that a rotation mechanism may be connected to the swing shaft 694 so that the rotation mechanism may cause the arm 690 to turn.

As shown in FIG. 28B, two reinforcement members 696, 696 having different shapes are provided on both sides of the arm 690. The reinforcement members 696, 696 provided in this way prevent, when the arm 690 is turned between the cleaning position and the retracted position, the shaft center of the arm 690 from shaking by a large margin and allows an atomizing operation to be effectively performed. The atomizer 34A is provided with a lever 695 for fixing the turning position of the arm 690 (angle range within which the arm 690 can turn). That is, it is possible to adjust the turnable angle of the arm 690 according to conditions by operating the lever 695. When the lever 695 is turned, the arm 690 can turn freely and the arm 690 can be manually moved between the cleaning position and the retracted position. When the lever 695 is tightened, the position of the arm 690 is fixed at either the cleaning position or the retracted position.

The arm 690 of the atomizer can have a foldable structure. More specifically, the arm 690 can be constructed of at least two arm members which are connected via a joint. In this case, an angle formed by the arm members when the arm 690 is folded is set to be equal to or greater than 1° and equal to or less than 45°, or preferably set to be equal to or greater than 5° and equal to or less than 30°. When the angle formed between the arm members is equal to or greater than 45°, the space occupied by the arm 690 increases, and on the other hand, when the angle formed between the arm members is less than 1°, the width of the arm 690 cannot help but be reduced and the mechanical strength is weakened. In this example, the arm 690 may be configured so as not to rotate around the swing shaft 694. By folding the arm 690 during maintenance such as replacement of the polishing pad 10, it is possible to prevent the atomizer from disturbing the maintenance operation. The arm 690 of the atomizer can have an expandable structure as another modification. In this example, if the arm 690 is contracted during maintenance, the atomizer never becomes a hindrance.

An object of providing the atomizer 34A is to wash away polishing waste or abrasive grains or the like remaining on the polishing surface of the polishing pad 10 using a high pressure fluid. It is possible to achieve more preferable dressing, that is, regeneration of the polishing surface through cleaning of the polishing surface using a fluid pressure of the atomizer 34A and dressing of the polishing surface using the dresser 33A which is a mechanical contact. Normally, the polishing surface is often regenerated using the atomizer after performing dressing using a contact type dresser (diamond dresser or the like).

Next, a transfer mechanism for conveying a substrate will be described using FIG. 1. The transfer mechanism is provided with a lifter 11, a first linear transporter 66, a swing transporter 12, a second linear transporter 67 and a temporary placement table 180.

The lifter 11 receives a substrate from the transfer robot 22. The first linear transporter 66 transfers the substrate received from the lifter 11 between a first transfer position TP1, a second transfer position TP2, a third transfer position TP3 and a fourth transfer position TP4. The first polishing unit 3A and the second polishing unit 3B receive the substrate from the first linear transporter 66 and polish it.

The first polishing unit 3A and the second polishing unit 3B hand over the polished substrate to the first linear transporter 66.

The swing transporter 12 transfers the substrate between the first linear transporter 66 and the second linear transporter 67. The second linear transporter 67 transfers the substrate received from the swing transporter 12 among a fifth transfer position TP5, a sixth transfer position TP6 and a seventh transfer position TP7. The third polishing unit 3C and the fourth polishing unit 3D receive the substrate from the second linear transporter 67 and polish it. The third polishing unit 3C and the fourth polishing unit 3D hand over the polished substrate to the second linear transporter 67. The substrate polished by the polishing unit 3 is placed on the temporary placement table 180 by the swing transporter 12.

Figure 29A:
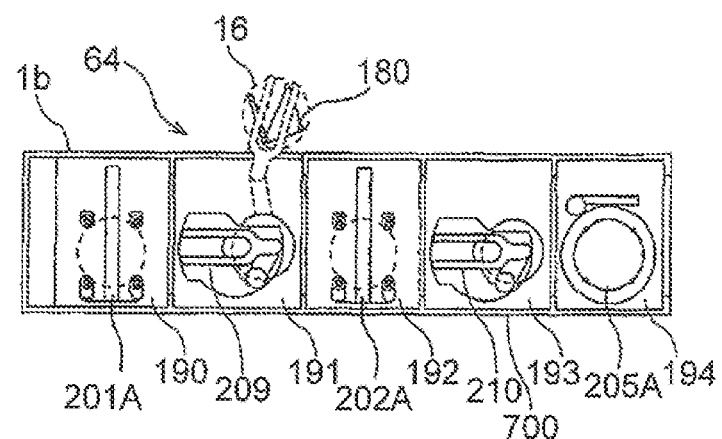
FIG. 29A is a plan view illustrating a cleaning section and FIG. 29B is a side view illustrating a cleaning section.
Figure 29B:
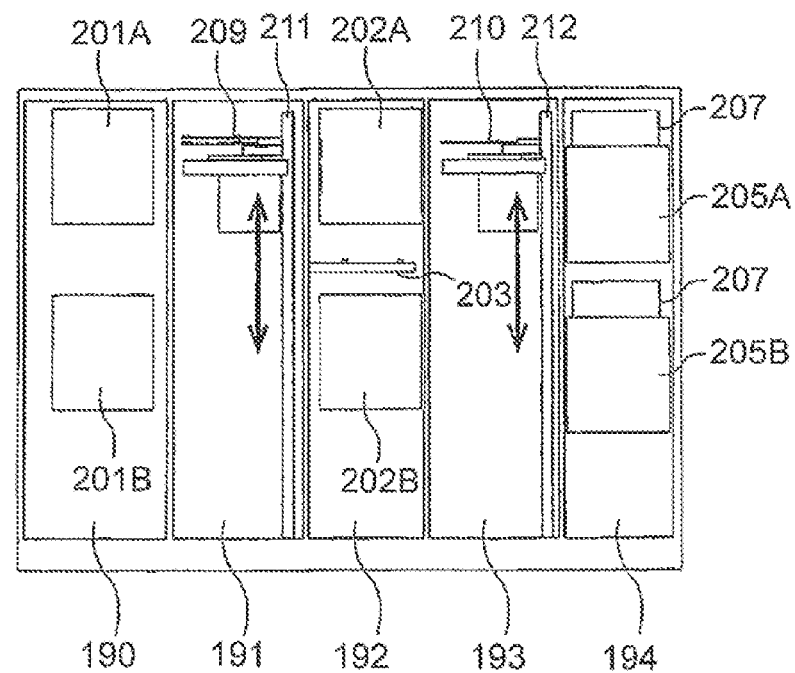

FIG. 29A is a plan view illustrating the cleaning section 64 and FIG. 29B is a side view illustrating the cleaning section 64. As shown in FIG. 29A and FIG. 29B, the cleaning section 64 is partitioned into a first cleaning chamber 190, a first transfer chamber 191, a second cleaning chamber 192, a second transfer chamber 193, and a drying chamber 194. An upper primary cleaning module 201A and a lower primary cleaning module 201B arrayed in a longitudinal direction are arranged in the first cleaning chamber 190. The upper primary cleaning module 201A is disposed above the lower primary cleaning module 201B. Similarly, an upper secondary cleaning module 202A and a lower secondary cleaning module 202B arrayed in the longitudinal direction are arranged in the second cleaning chamber 192. The upper secondary cleaning module 202A is disposed above the lower secondary cleaning module 202B. The primary and secondary cleaning modules 201A, 201B, 202A and 202B are cleaners for cleaning a wafer using a cleaning liquid. Since the primary and secondary cleaning modules 201A, 201B, 202A and 202B are arrayed along the vertical direction, they provide an advantage that a footprint area is small.

A temporary wafer placement table 203 is provided between the upper secondary cleaning module 202A and the lower secondary cleaning module 202B. In the drying chamber 194, an upper drying module 205A and a lower drying module 205B arrayed along the longitudinal direction are arranged. The upper drying module 205A and the lower drying module 205B are separated from each other. Filter fan units 207, 207 for supplying clean air to the drying modules 205A and 205B are provided on the upper drying module 205A and the lower drying module 205B respectively. The upper primary cleaning module 201A, the lower primary cleaning module 201B, the upper secondary cleaning module 202A, the lower secondary cleaning module 202B, the temporary placement table 203, the upper drying module 205A and the lower drying module 205B are fixed to a frame, which is not shown, via bolts or the like.

A vertically movable first transfer robot 209 is disposed in the first transfer chamber 191 and a vertically movable second transfer robot 210 is disposed in the second transfer chamber 193. The first transfer robot 209 and the second transfer robot 210 are movably supported respectively by support shafts 211 and 212 extending in the longitudinal direction. The first transfer robot 209 and the second transfer robot 210 incorporate a drive mechanism such as a motor therein and are vertically movable along the support shafts 211 and 212. As in the case of the transfer robot 22, the first transfer robot 209 includes two hands, upper and lower. The first transfer robot 209 is disposed at a position where the lower hand thereof can access the aforementioned temporary placement table 180 as shown by a dotted line in FIG. 29A. When the lower hand of the first transfer robot 209 accesses the temporary placement table 180, a shutter (not shown) provided in the barrier 1b is designed to be opened.

The first transfer robot 209 operates so as to transfer the semiconductor wafer 16 between the temporary placement table 180, the upper primary cleaning module 201A, the lower primary cleaning module 201B, the temporary placement table 203, the upper secondary cleaning module 202A and the lower secondary cleaning module 202B. The first transfer robot 209 uses the lower hand when transferring a wafer before cleaning (wafer to which slurry is adhered) and uses the upper hand when transferring a wafer after cleaning. The second transfer robot 210 operates so as to transfer the semiconductor wafer 16 between the upper secondary cleaning module 202A, the lower secondary cleaning module 202B, the temporary placement table 203, the upper drying module 205A and the lower drying module 205B. The second transfer robot 210 is provided with only one hand because it transfers only a cleaned wafer. Using the upper hand, the transfer robot 22 shown in FIG. 1 unloads a wafer from the upper drying module 205A or the lower drying module 205B and returns the wafer to the wafer cassette. When the upper hand of the transfer robot 22 accesses the drying modules 205A and 205B, a shutter (not shown) provided in the barrier 1a is designed to be opened.

Figure 30:
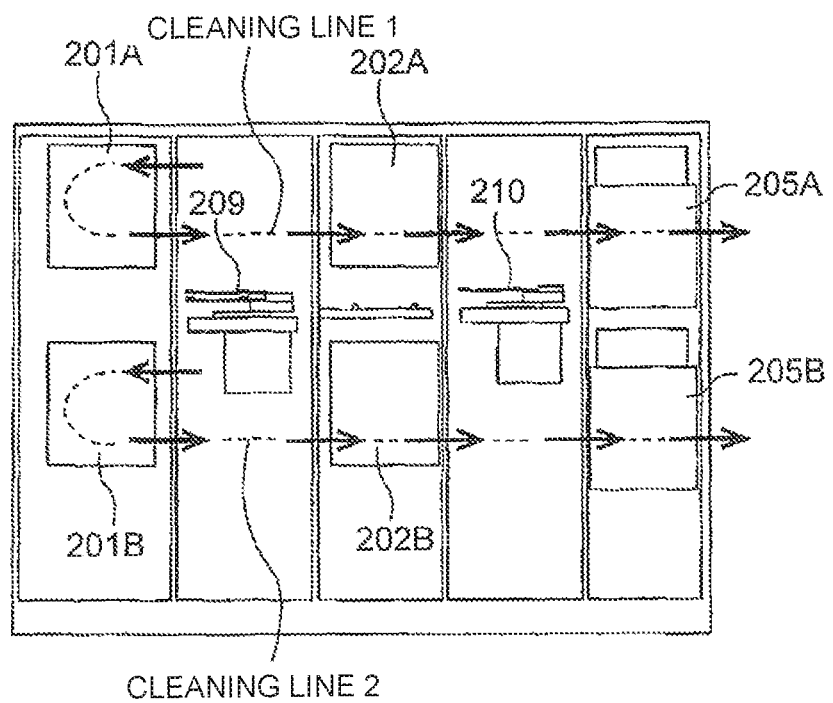
FIG. 30 is a schematic view illustrating an example of cleaning lines.

Since the cleaning section 64 is provided with the two primary cleaning modules and the two secondary cleaning modules, it is possible to form a plurality of cleaning lines whereby a plurality of wafers are cleaned in parallel. The "cleaning line" means a moving path inside the cleaning section 64 when one wafer is cleaned by a plurality of cleaning modules. For example, as shown in FIG. 30, it is possible to convey one wafer in order of the first transfer robot 209, the upper primary cleaning module 201A, the first transfer robot 209, the upper secondary cleaning module 202A, the second transfer robot 210 and the upper drying module 205A (see a cleaning line 1), and convey another wafer in parallel to this, in order of the first transfer robot 209, the lower primary cleaning module 201B, the first transfer robot 209, the lower secondary cleaning module 202B, the second transfer robot 210 and the lower drying module 205B (see a cleaning line 2). Thus, it is possible to substantially simultaneously clean and dry a plurality of (typically two) wafers using the two parallel cleaning lines.

Figure 31:
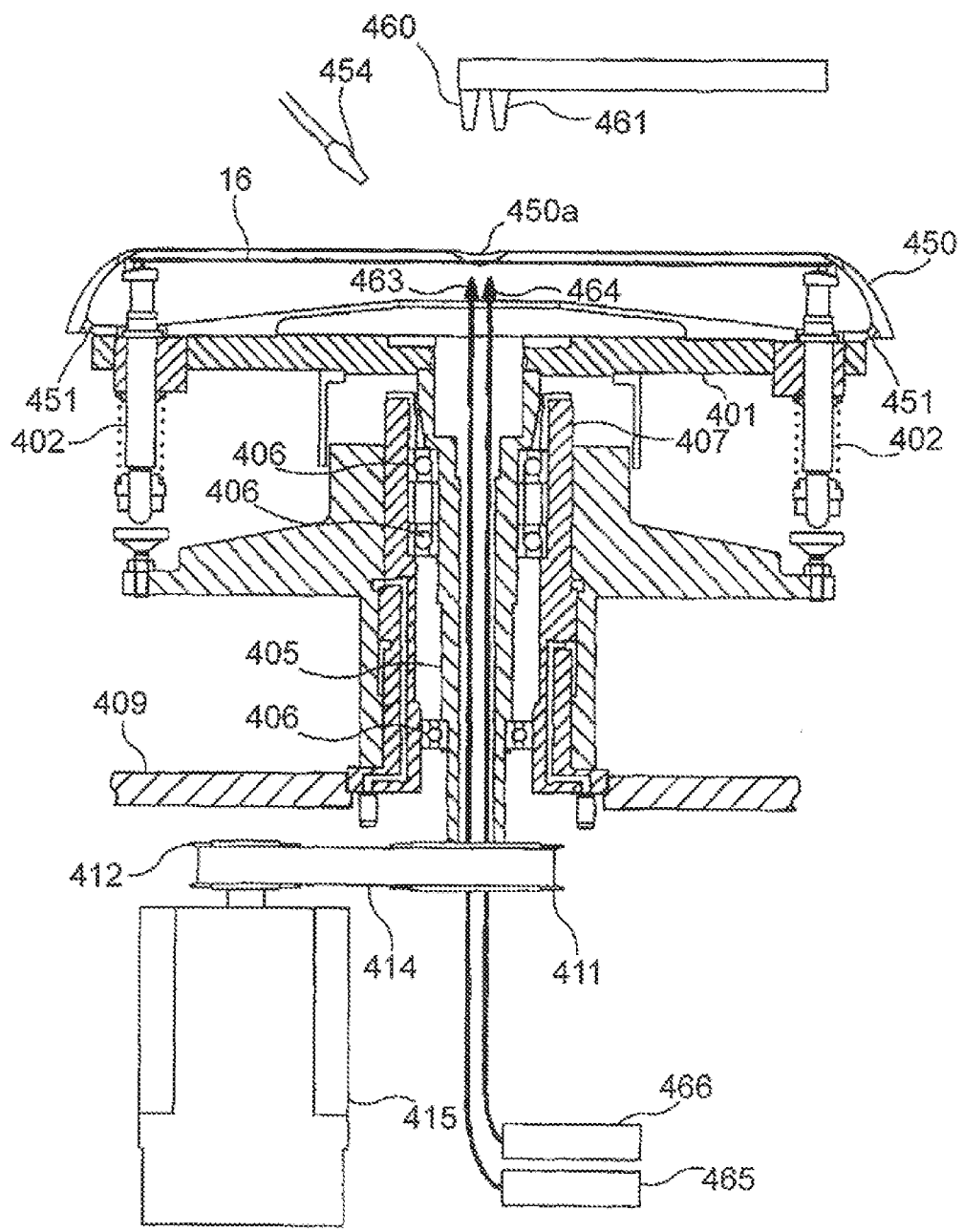
FIG. 31 is a longitudinal cross-sectional view illustrating an upper drying module.
Figure 32:
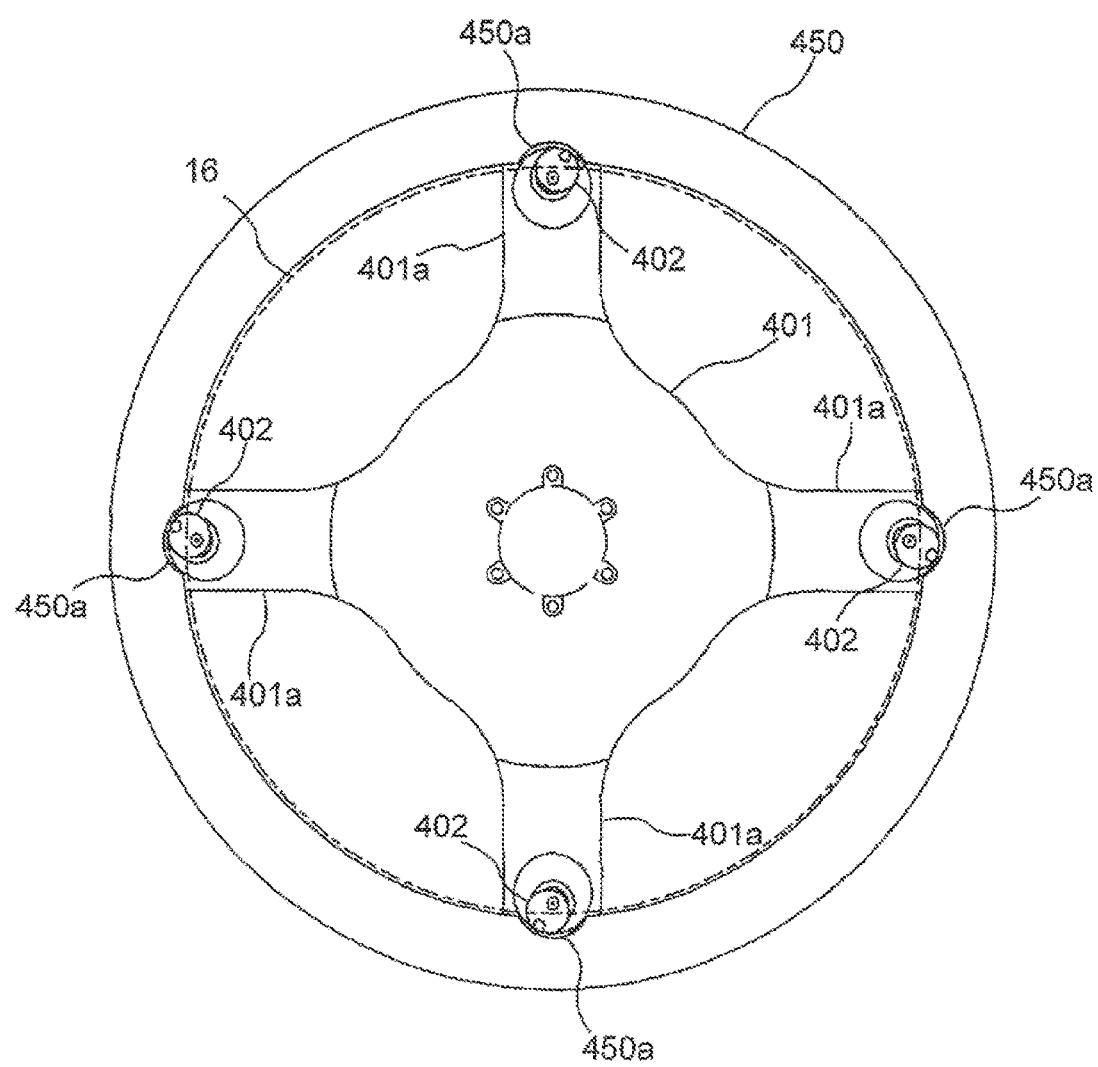
FIG. 32 is a plan view illustrating the upper drying module.

Next, configurations of the upper drying module 205A and the lower drying module 205B will be described. Both the upper drying module 205A and the lower drying module 205B are dryers that perform rotagoni drying. Since the upper drying module 205A and the lower drying module 205B have identical configurations, the upper drying module 205A will be described hereinafter. FIG. 31 is a longitudinal cross-sectional view illustrating the upper drying module 205A and FIG. 32 is a plan view illustrating the upper drying module 205A. The upper drying module 205A is provided with a base 401 and four cylindrical substrate support members 402 supported by the base 401. The base 401 is fixed to a top end of a rotation shaft 406 and the rotation shaft 406 is rotatably supported by a bearing 405. The bearing 405 is fixed to an inner circumferential surface of a cylindrical body 407 that extends parallel to the rotation shaft 406. A bottom end of the cylindrical body 407 is attached to a frame 409 and the position thereof is fixed. The rotation shaft 406 is connected to a motor 415 via pulleys 411 and 412, and a belt 414, and the base 401 is designed to rotate around its shaft center by driving the motor 415.

A rotation cover 450 is fixed to a top surface of the base 401. Note that FIG. 31 illustrates a longitudinal cross section of the rotation cover 450. The rotation cover 450 is disposed so as to surround a whole circumference of the semiconductor wafer 16. The longitudinal cross-sectional shape of the rotation cover 450 is inclined inward in the diameter direction. The longitudinal cross section of the rotation cover 450 is formed of a smooth curve. A top end of the rotation cover 450 is proximate to the semiconductor wafer 16 and an inner diameter of the top end of the rotation cover 450 is set to be slightly greater than the diameter of the semiconductor wafer 16. A notch 450a that follows an outer circumferential surface shape of the substrate support member 402 is formed at the top end of the rotation cover 450 so as to correspond to each substrate support member 402. A liquid discharge hole 451 which extends diagonally is formed in a bottom surface of the rotation cover 450.

A front nozzle 454 that supplies pure water as a cleaning liquid onto a surface (front surface) of the semiconductor wafer 16 is disposed above the semiconductor wafer 16. The front nozzle 454 is disposed oriented toward the center of the semiconductor wafer 16. The front nozzle 454 is connected to a pure water supply source (cleaning liquid supply source), which is not shown, and pure water is supplied to the center of the surface of the semiconductor wafer 16 through the front nozzle 454. As the cleaning liquid, a chemical liquid can also be used in addition to pure water. Two nozzles 460 and 461 are disposed in parallel above the semiconductor wafer 16 to execute rotagoni drying. The nozzle 460 is intended to supply IPA vapor (a mixture of isopropyl alcohol and $N_2$ gas) to the surface of the semiconductor wafer 16 and the nozzle 461 is intended to supply pure water to prevent the surface of the semiconductor wafer 16 from drying. The nozzles 460 and 461 are configured to be movable along the diameter direction of the semiconductor wafer 16.

A back nozzle 463 connected to a cleaning liquid supply source 465 and a gas nozzle 464 connected to a drying gas supply source 466 are disposed inside the rotation shaft 406. Pure water is stored in the cleaning liquid supply source 465 as a cleaning liquid and the pure water is designed to be supplied to the reverse side of the semiconductor wafer 16 through the back nozzle 463. An $NN_2$ gas or dry air or the like is stored in the drying gas supply source 466 as a drying gas and the drying gas is supplied to the reverse side of the semiconductor wafer 16 through the gas nozzle 464.

Next, the supply of pure water from the front nozzle 454 is stopped, the front nozzle 454 is moved to a predetermined standby position away from the semiconductor wafer 16 and the two nozzles 460 and 461 are moved to working positions above the semiconductor wafer 16. The IPA vapor from the nozzle 460 and the pure water from the nozzle 461 are supplied onto the surface of the semiconductor wafer 16 while causing the semiconductor wafer 16 to rotate at a low speed of 30 to 150 $min^{-1}$. At this time, pure water is also supplied to the reverse side of the semiconductor wafer 16 from the back nozzle 463. The two nozzles 460 and 461 are simultaneously moved along the diameter direction of the semiconductor wafer 16. The surface (top surface) of the semiconductor wafer 16 is thereby dried.

After that, the two nozzles 460 and 461 are moved to the predetermined standby position and the supply of pure water from the back nozzle 463 is stopped. The semiconductor wafer 16 is caused to rotate at a high speed of 1000 to 1500 $min^{-1}$ to shake off pure water adhered to the reverse side of the semiconductor wafer 16. At this time, a drying gas from the gas nozzle 464 is sprayed over the reverse side of the semiconductor wafer 16. The reverse side of the semiconductor wafer 16 is dried in this way. The dried semiconductor wafer 16 is unloaded from the drying module 205A by the transfer robot 22 shown in FIG. 1 and returned to the wafer cassette. Thus, the wafer is subjected to a series of processes including polishing, cleaning and drying. The drying module 205A configured as described above can dry both sides of the semiconductor wafer 16 speedily and effectively, and can also accurately control the end time point of drying processing. Therefore, the processing time for drying processing never becomes a rate-determining step of the whole cleaning process. Since processing times on a plurality of aforementioned cleaning lines formed in the cleaning section 4 can be leveled, it is possible to improve the throughput of the entire process.

According to the present embodiment, when the substrate is transferred (before loading) to the polishing apparatus, the substrate is in a dried state, and after completion of polishing and cleaning, the substrate is in a dried state before unloading and unloaded to the substrate cassette. The substrate in a dried state can be unloaded from the polishing apparatus into the cassette. That is, dry in/dry out is possible.

The substrate placed on the temporary placement table 180 is transferred to the first cleaning chamber 190 or the second cleaning chamber 192 via the first transfer chamber 191. The substrate is subjected to cleaning processing in the first cleaning chamber 190 or the second cleaning chamber 192. The substrate subjected to the cleaning processing in the first cleaning chamber 190 or the second cleaning chamber 192 is transferred to the drying chamber 194 via the second transfer chamber 193. The substrate is subjected to drying processing in the drying chamber 194. The substrate subjected to the drying processing is unloaded from the drying chamber 194 and returned to the cassette by the transfer robot 22.

Figure 2:
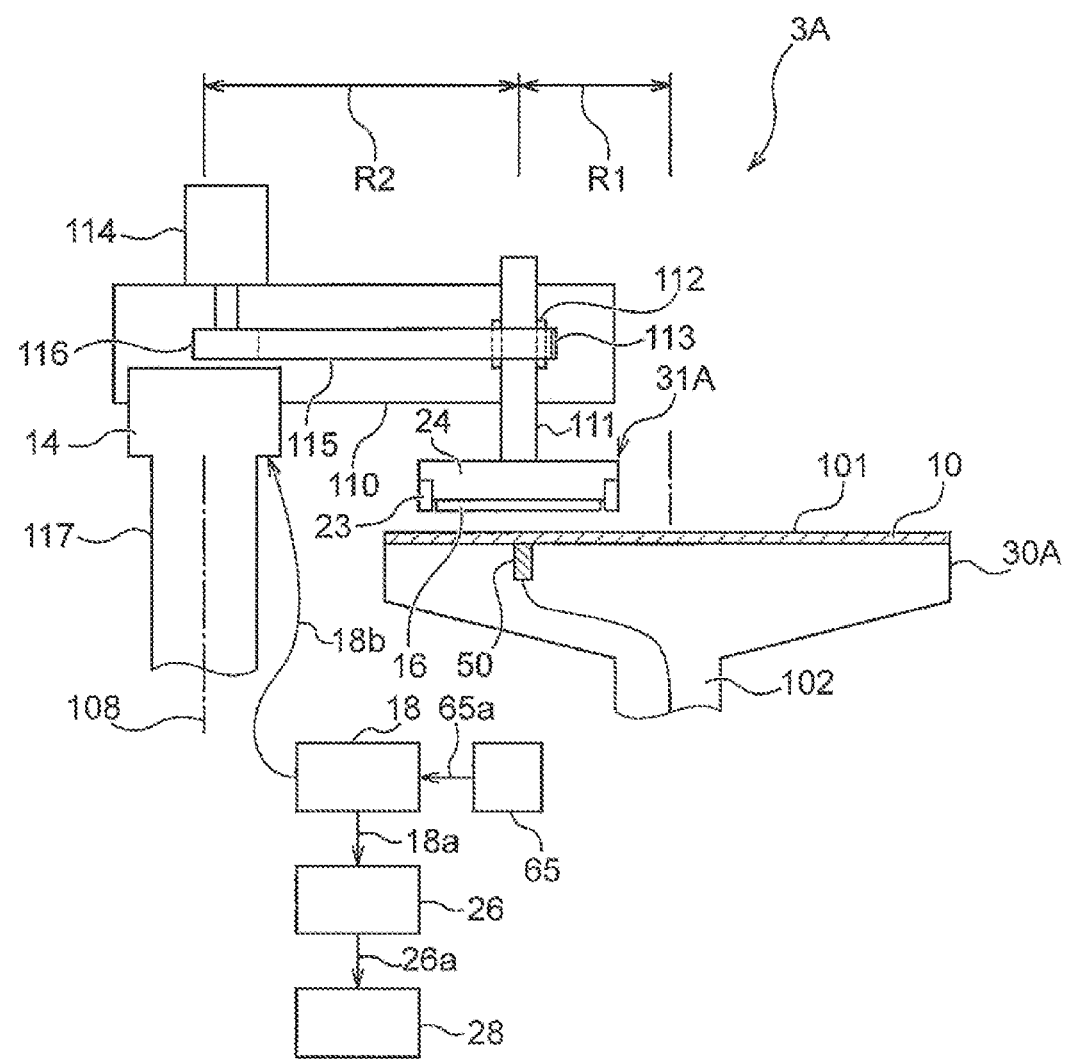
FIG. 2 is a schematic diagram illustrating a whole arrangement of a polishing apparatus according to an embodiment of the present invention.

FIG. 2 is a schematic diagram illustrating a whole arrangement of a polishing apparatus according to an embodiment of the present invention. As shown in FIG. 2, the polishing apparatus is provided with the polishing table 30A and the top ring 31A that holds a substrate such as a semiconductor wafer, which is a polishing target, and presses the substrate against the polishing surface on the polishing table.

The first polishing unit 3A is a polishing unit for polishing between the polishing pad 10 and the semiconductor wafer 16 disposed opposed to the polishing pad 10. The first polishing unit 3A includes the polishing table 30A for holding the polishing pad 10 and the top ring 31A for holding the semiconductor wafer 16. The first polishing unit 3A includes the swing arm 110 for holding the top ring 31A, a swing shaft motor 14 (arm drive section) for causing the swing arm 110 to swing and a driver 18 that supplies drive power to the swing shaft motor 14. Furthermore, the first polishing unit 3A includes an arm torque detection section 26 that detects arm torque applied to the swing arm 110 and an end point detection section 28 that detects a polishing end point indicating an end of polishing based on the arm torque detected by the arm torque detection section 26.

According to the present embodiment described in FIG. 2 to FIG. 18, the following problems can be solved. As one of the polishing end point detection means, there is a method of detecting and using a drive load of the drive section that drives to rotate the polishing table or the top ring in addition to the method based on arm torque. There are a plurality of polishing conditions for the polishing process executed by the polishing apparatus according to a combination of the type of a polishing target, the type of the polishing pad, the type of a polishing abrasive liquid (slurry) or the like. Among the plurality of polishing conditions, there are cases where even when the drive load of the drive section is changed, no significant change (characteristic point) may appear in the torque current of the drive section. When the change in the torque current is small, it may not be possible to detect an end point of polishing appropriately under influences of noise appearing in the torque current and a waviness generated in the waveform of the torque current, and there can be a problem with excessive polishing or the like. The present embodiment described in FIG. 2 to FIG. 18 solves this problem by detecting a polishing end point based on the arm torque in a scheme in which the top ring is held to an end portion of the swing arm.

In FIG. 1, the holding section, the swing arm, the arm drive section and the torque detection section form a set and sets of the same configuration are also provided in the first polishing unit 3A, the second polishing unit 3B, the third polishing unit 3C and the fourth polishing unit 3D respectively.

The polishing table 30A is connected to a motor (not shown), which is a drive section, disposed therebelow via a table shaft 102 and is rotatable around the table shaft 102. The polishing pad 10 is pasted to the top surface of the polishing table 30A and a surface 101 of the polishing pad 10 constitutes a polishing surface for polishing the semiconductor wafer 16. A polishing liquid supply nozzle (not shown) is provided above the polishing table 30A and the polishing liquid supply nozzle supplies a polishing liquid Q to the polishing pad 10 on the polishing table 30A. As shown in FIG. 2, an eddy current sensor 50 that can detect a polishing end point by generating an eddy current in the semiconductor wafer 16 and detecting the eddy current may be embedded in the polishing table 30A.

The top ring 31A is constructed of a top ring body 24 that presses the semiconductor wafer 16 against the polishing surface 101 and a retainer ring 23 that holds an outer circumferential edge of the semiconductor wafer 16 so that the semiconductor wafer 16 does not slip out of the top ring.

The top ring 31A is connected to a top ring shaft 111. The top ring shaft 111 is caused by a vertical motion mechanism, which is not shown, to move in the vertical direction relative to the swing arm 110. The vertical motion of the top ring shaft 111 causes the entire top ring 31A to ascend or descend with respect to the swing arm 110 to be positioned.

The top ring shaft 111 is connected to a rotary cylinder 112 via a key (not shown). The rotary cylinder 112 is provided with a timing pulley 113 on its circumferential portion. A top ring motor 114 is fixed to the swing arm 110. The timing pulley 113 is connected to a timing pulley 116 provided for the top ring motor 114 via a timing belt 115. As the top ring motor 114 rotates, the rotary cylinder 112 and the top ring shaft 111 integrally rotate via the timing pulley 116, the timing belt 115 and the timing pulley 113, and the top ring 31A rotates.

The swing arm 110 is connected to the rotation shaft of the swing shaft motor 14. The swing shaft motor 14 is fixed to a swing arm shaft 117. Therefore, the swing arm 110 is rotatably supported by the swing arm shaft 117.

The top ring 31A can hold a substrate such as the semiconductor wafer 16 to an undersurface thereof. The swing arm 110 can turn around the swing arm shaft 117. The top ring 31A that holds the semiconductor wafer 16 to its undersurface is moved from a position at which it receives the semiconductor wafer 16 to a position above the polishing table 30A as the swing arm 110 turns. The top ring 31A is caused to descend to press the semiconductor wafer 16 against the surface (polishing surface) 101 of the polishing pad 10. At this time, the top ring 31A and the polishing table 30A are caused to rotate respectively. At the same time, a polishing liquid is supplied onto the polishing pad 10 from the polishing liquid supply nozzle provided above the polishing table 30A. In this way, the surface of the semiconductor wafer 16 is polished by causing the semiconductor wafer 16 to slide on the polishing surface 101 of the polishing pad 10.

The first polishing unit 3A includes a table drive section (not shown) that drives to rotate the polishing table 30A. The first polishing unit 3A may include a table torque detection section (not shown) that detects table torque applied to the polishing table 30A. The table torque detection section can detect table torque from the current of the table drive section, which is a rotation motor. The end point detection section 28 may detect a polishing end point indicating an end of polishing only from the arm torque detected by the arm torque detection section 26 or may detect a polishing end point indicating an end of polishing by taking into account the table torque detected by the table torque detection section as well.

The arm torque detection section 26 detects arm torque applied to the swing arm 110 at the connection part of the swing arm 110 to the swing shaft motor 14 in FIG. 2. More specifically, the arm drive section is the swing shaft motor (rotation motor) 14 that causes the swing arm 110 to rotate and the arm torque detection section 26 detects arm torque applied to the swing arm 110 from the current value of the swing shaft motor 14. The current value of the swing shaft motor 14 is an amount that depends on arm torque at the connection part of the swing arm 110 to the swing shaft motor 14. The current value of the swing shaft motor 14 is a current value 18b supplied from the driver 18 to the swing shaft motor 14 or a current command 18a, which will be described later, generated in the driver 18 in the present embodiment.

Figure 3:
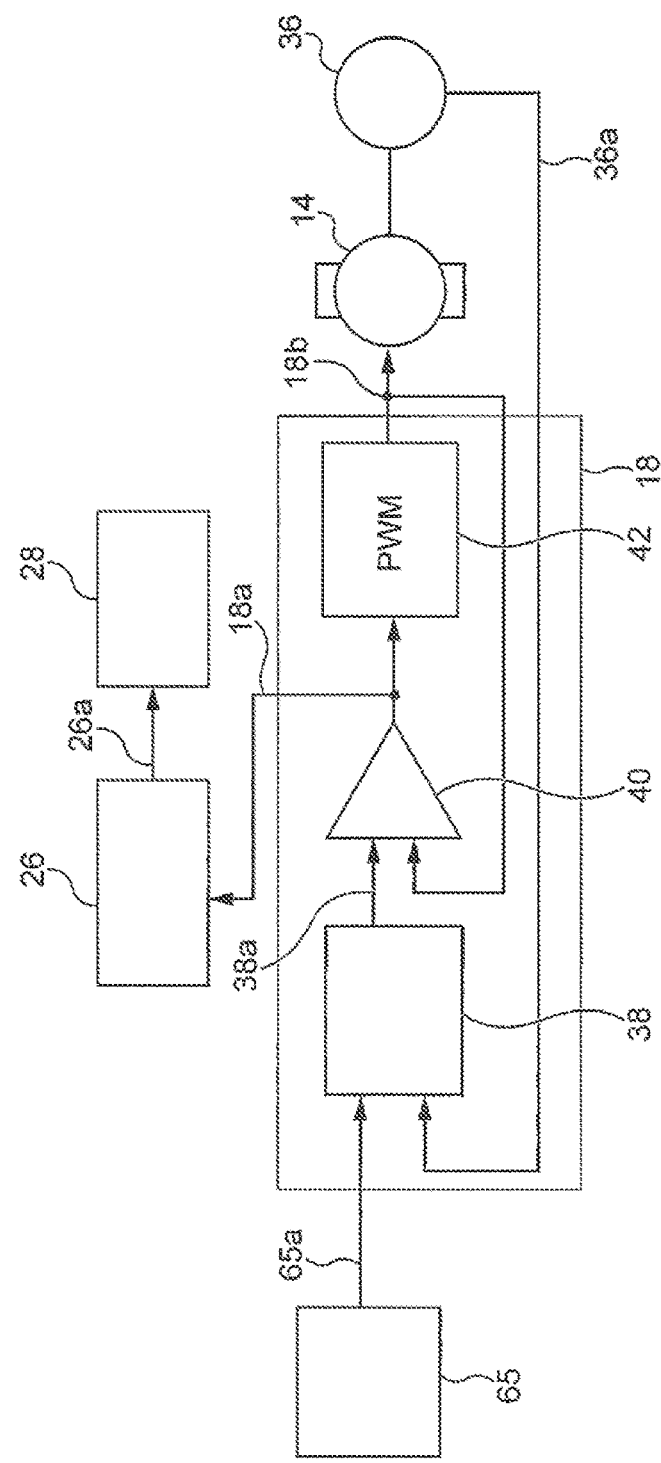
FIG. 3 is a block diagram for describing a method of detecting arm torque by an arm torque detection section 26.

A method of detecting arm torque by the arm torque detection section 26 will be described using FIG. 3. The driver 18 receives a position command 65a relating to the position of the swing arm 110 from the control section 65. The position command 65a is data corresponding to an angle of rotation of the swing arm 110 with respect to the swing arm shaft 117. The driver 18 also receives an angle of rotation 36a of the swing arm shaft 117 from an encoder 36 incorporated in and attached to the swing shaft motor 14.

The encoder 36 can detect the angle of rotation 36a of the rotation shaft of the swing shaft motor 14, that is, the angle of rotation 36a of the swing arm shaft 117. Although the swing shaft motor 14 and the encoder 36 are illustrated independently of each other in FIG. 3, the swing shaft motor 14 and the encoder 36 are integrated together. An example of such an integrated motor is a synchronization type AC servo motor with a feedback encoder.

The driver 18 includes a deviation circuit 38, a current generation circuit 40 and a PWM circuit 42. The deviation circuit 38 calculates a deviation 38a between the position command 65a and the angle of rotation 36a from the position command 65a and the angle of rotation 36a. The deviation 38a and the current value 18b are inputted to the current generation circuit 40. The current generation circuit 40 generates a current command 18a corresponding to the deviation 38a from the deviation 38a and the current value 18b. The PWM circuit 42 receives the current command 18a and generates the current value 18b under PWM (pulse width modulation) control. The current value 18b is a three-phase (U-phase, V-phase, and W-phase) current capable of driving the swing shaft motor 14. The current value 18b is supplied to the swing shaft motor 14.

The current command 18a is an amount that depends on the current value of the swing shaft motor 14 and an amount that depends on arm torque. The arm torque detection section 26 applies processing such as at least one of AD conversion, amplification, rectification and effective value conversion to the current command 18a, and then outputs the processed current command to the end point detection section 28 as arm torque.

The current value 18b is a current value of the swing shaft motor 14 itself and is also a value that depends on arm torque. The arm torque detection section 26 may detect arm torque applied to the swing arm 110 from the current value 18b. The arm torque detection section 26 can use a current sensor such as a hole sensor to detect the current value 18b.

Figure 4:
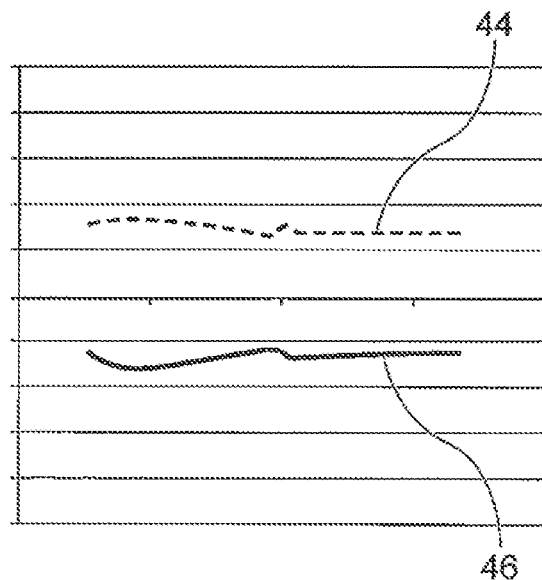
FIG. 4 illustrates rotation torque data 44 of a polishing table 30A and arm torque data 46.

Examples of specific data of the current command 18a (arm torque) detected by the arm torque detection section 26, data of rotation torque of the polishing table 30A and data of rotation torque of the top ring 31A are shown in FIG. 4 and subsequent drawings. The data of rotation torque of the polishing table 30A and data of rotation torque of the top ring 31A are comparative examples for describing effects of the present embodiment. FIG. 4 illustrates data 44 of rotation torque of the polishing table 30A and data 46 of arm torque. The horizontal axis shows time and the vertical axis shows a current value. When the data 44 is compared with the data 46, the data 44 of rotation torque and the data 46 of arm torque show opposite tendencies. That is, the data 46 of arm torque tends to decrease as the data 44 of rotation torque increases, the data 46 of arm torque tends to increase as the data 44 of rotation torque decreases. The data 44 of rotation torque and the data 46 of arm torque have a correlation relation. It is clear from this that it is possible to measure a polishing frictional force using the data 46 of arm torque.

Figure 5:
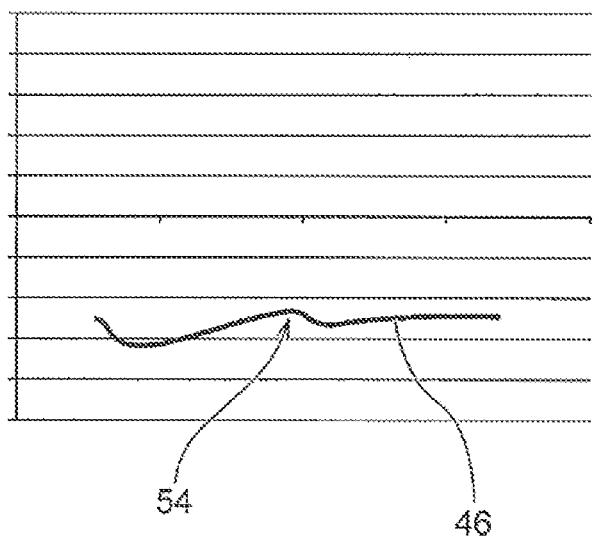
FIG. 5 illustrates only the arm torque data 46 in FIG. 4.
Figure 6:
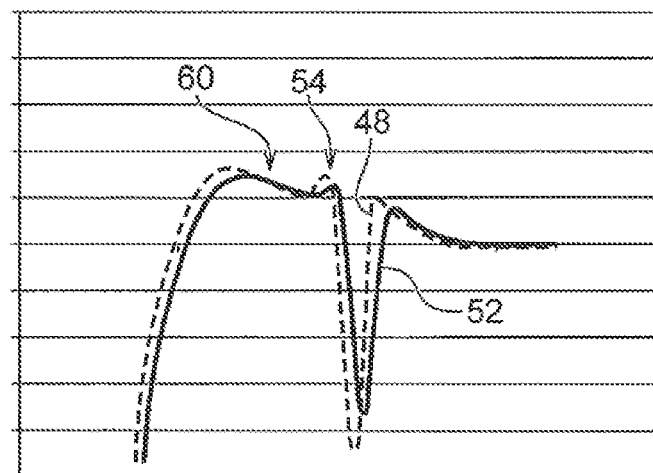
FIG. 6 illustrates data obtained by differentiating the data 46.

FIG. 5 illustrates only the data 46 of arm torque in FIG. 4. FIG. 6 is data obtained by differentiating the data 46 by time. Data 48 is obtained by differentiating the data 46 by time. Data 52 is data obtained by finding a time average of the data 48 for several seconds to reduce noise of the data 48. The horizontal axis in FIG. 6 shows time and the vertical axis shows a current value/time (differential value of a current by time). The data 48 and the data 52 include a peak 54 after a flat part 60. The presence of the flat part 60 makes the presence of the peak 54 clearer. The peak 54 indicates a polishing end point. In the case of the present drawing, regarding the data of arm torque, it is clear that the polishing end point which is not clear with the data 46 is made clear by differentiation.

Figure 7:
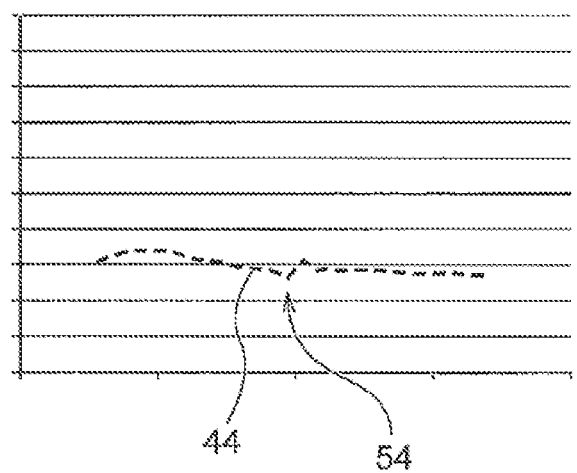
FIG. 7 illustrates only the rotation torque data 44 of the polishing table 30A in FIG. 4.
Figure 8:
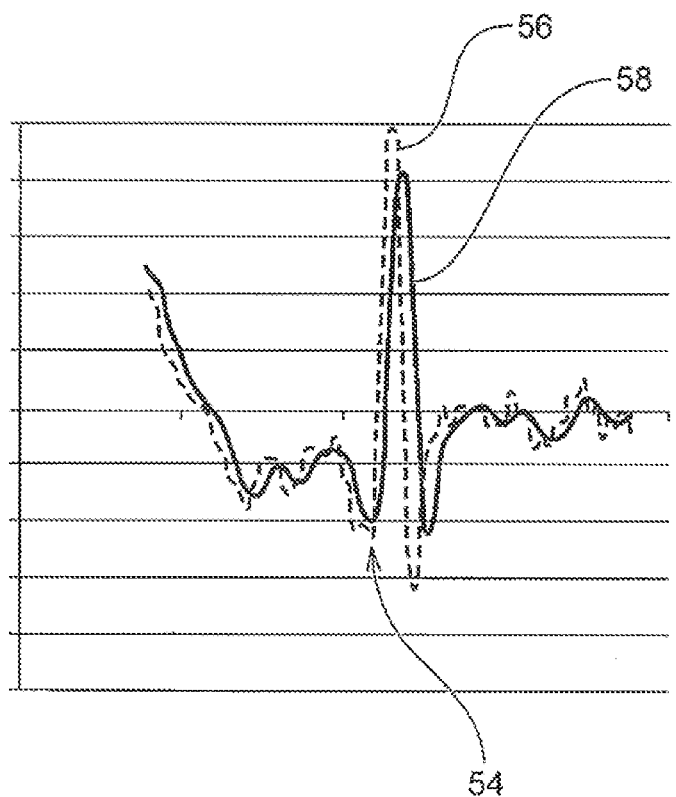
FIG. 8 illustrates data obtained by differentiating the data 44.

FIG. 7 illustrates only the data 44 of rotation torque of the polishing table 30A in FIG. 4. FIG. 8 illustrates data obtained by differentiating the data 44. Data 56 is obtained by differentiating the data 44 by time. Data 58 is data obtained by finding a time average for several seconds to reduce noise of the data 44. The horizontal axis in FIG. 8 shows time and the vertical axis shows a current value/time (differential value of a current by time). The data 56 and the data 58 have no flat part, and it is uncertain whether there is any peak. It can be seen that the polishing end point appears more clearly in the data of arm torque than the data 44 of rotation torque of the polishing table 30A.

Figure 9:
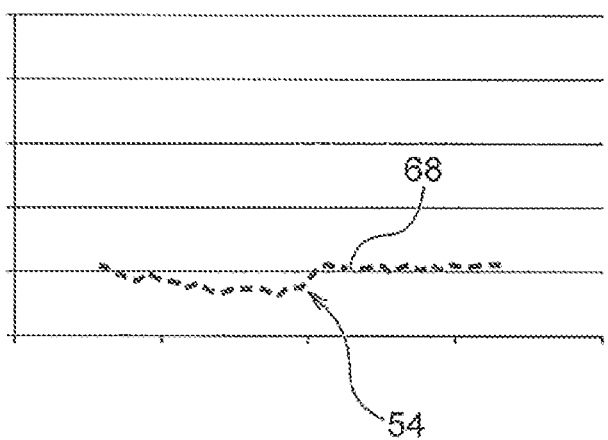
FIG. 9 illustrates rotation torque data 68 of the top ring 31A as a reference.
Figure 10:
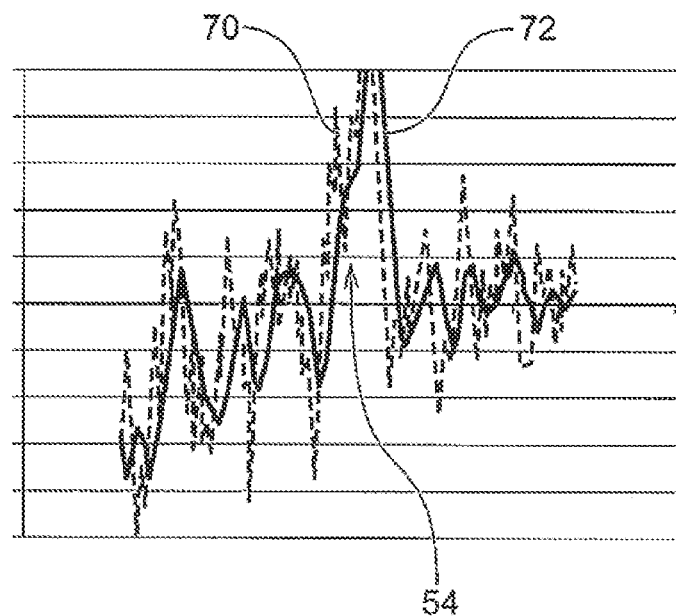
FIG. 10 illustrates data obtained by differentiating the data 68.

FIG. 9 illustrates data 68 of rotation torque of the top ring 31A as a reference. FIG. 10 illustrates data obtained by differentiating the data 68 by time. Data 70 is obtained by differentiating the data 68 and data 72 is data obtained by finding a time average for several seconds to reduce noise of the data 68. The horizontal axis in FIG. 10 shows time and the vertical axis shows a current value/time (differential value of a current by time). The data 70 and the data 72 have no flat part as in the cases of the data 56 and data 58 shown in FIG. 8, and it is uncertain whether there is any peak. It can be seen that the polishing end point appears more clearly in the data of arm torque than the data 68 of rotation torque of the top ring 31A.

The reason that polishing is continued even after a polishing end point is detected in FIG. 4 to FIG. 10 is as follows. The data in these drawings is data to confirm the effectiveness of the embodiments of the present invention and is intended to continue polishing even after detecting the polishing end point and confirm how the data has changed. A film configuration of the substrate for which the data of these drawings is obtained is shown in FIG. 11 as a reference.

Figure 11:
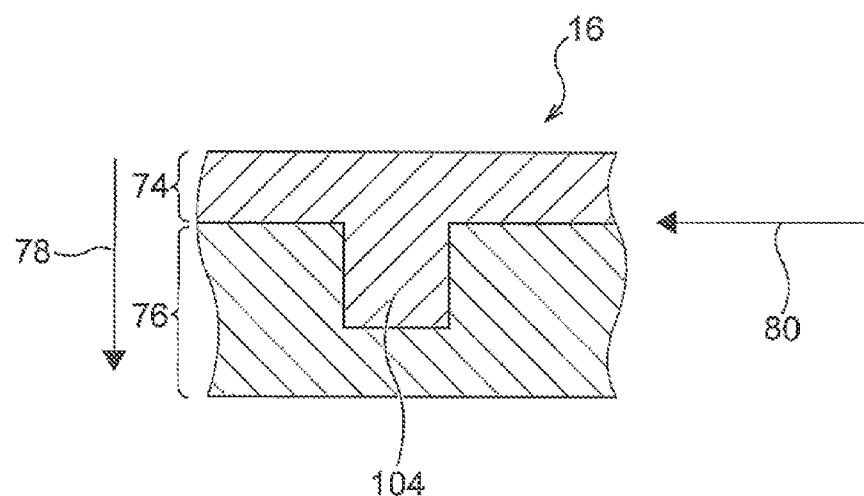
FIG. 11 shows a cross-sectional view of a substrate.

FIG. 11 shows a cross-sectional view of the semiconductor wafer 16, which is a substrate. The semiconductor wafer 16 includes an upper layer 74 and a lower layer 76. The upper layer 74 is a polishing target and polishing is performed from top to bottom in a direction shown by an arrow 78. A position shown by an arrow 80 is a polishing end point. The material or configuration of the film changes at the position shown by the arrow 80. An example of the film is one that has a wiring groove 104 or hole in an insulating film (lower layer 76) in the semiconductor wafer 16 with a metallic film of Cu or the like being formed on the wiring groove 104 or hole. A metallic film of Cu or the like is formed on the upper layer 74. The insulating film is an oxide film such as $SiO_2$. The present invention is also applicable to film materials and structures other than those described here.

Figure 12:
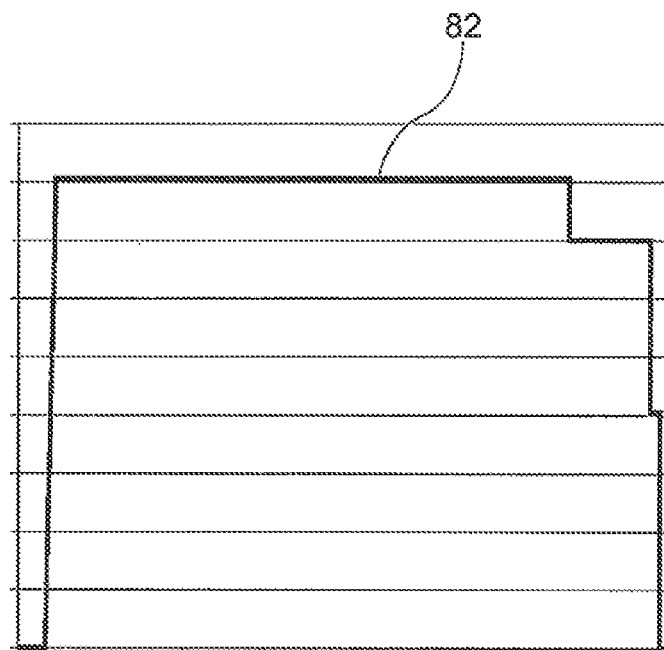
FIG. 12 illustrates the number of revolutions of the polishing table 30A and the top ring 31A.

FIG. 12 illustrates the number of revolutions of the polishing table 30A and the top ring 31A when the data shown in FIG. 4 to FIG. 10 are measured. The horizontal axis in FIG. 12 shows time and the vertical axis shows the number of revolutions. Data 82 shows the number of revolutions, and the number of revolutions of the polishing table 30A and the number of revolutions of the top ring 31A are set to the same value in the present embodiment.

Figure 13:
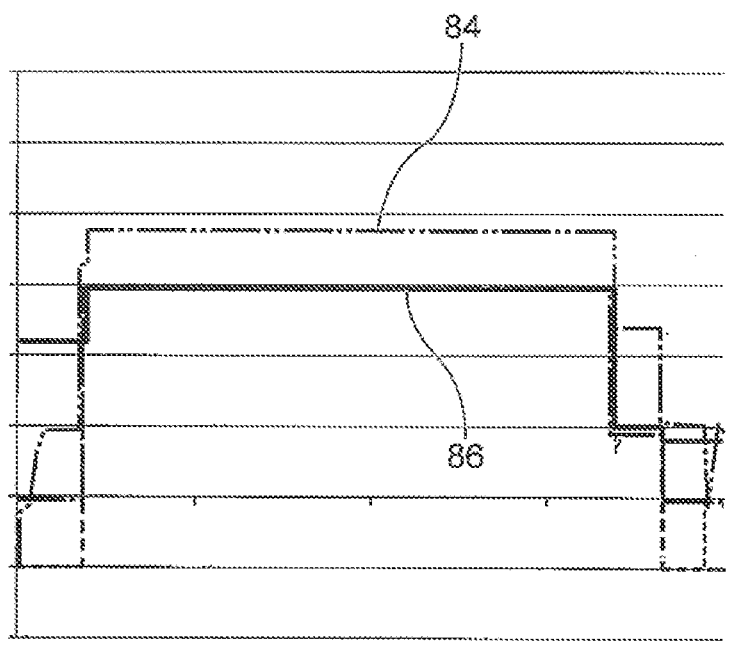
FIG. 13 illustrates data of a pressure applied to the semiconductor wafer 16 by an airbag in the top ring 31A.

FIG. 13 illustrates data of a pressure applied to the semiconductor wafer 16 by an airbag in the top ring 31A when the data shown in FIG. 4 to FIG. 10 is measured. The horizontal axis in FIG. 13 shows time and the vertical axis shows a magnitude of a pressure. Five airbags (not shown) are arranged concentrically from the center of the semiconductor wafer 16 outward. One disk-like airbag is placed in the center and four airbags are placed in a doughnut shape outside thereof. Data 84 is a pressure profile of the outermost airbag and data 86 is a pressure profile of the remaining four airbags. The data 84 is different from the data 86. That is, the outermost pressure is set to be the highest and the other pressures are set to be identical.

Figure 14:
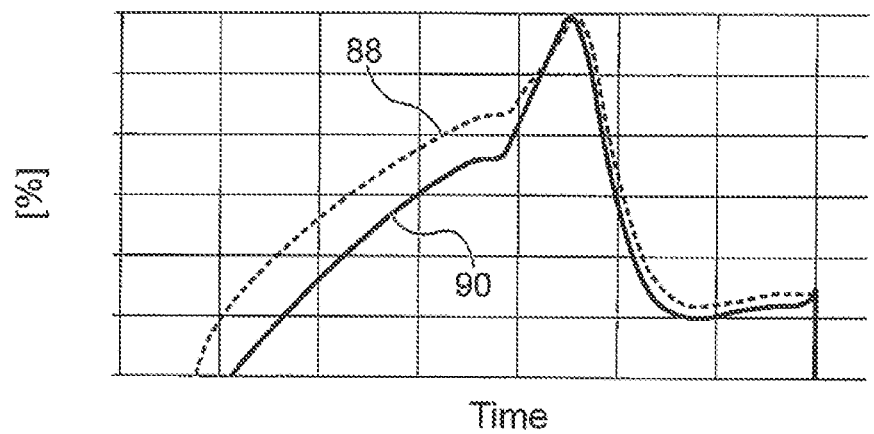
FIG. 14 illustrates rotation torque data 88 of the polishing table 30A and arm torque data 90.
Figure 16:
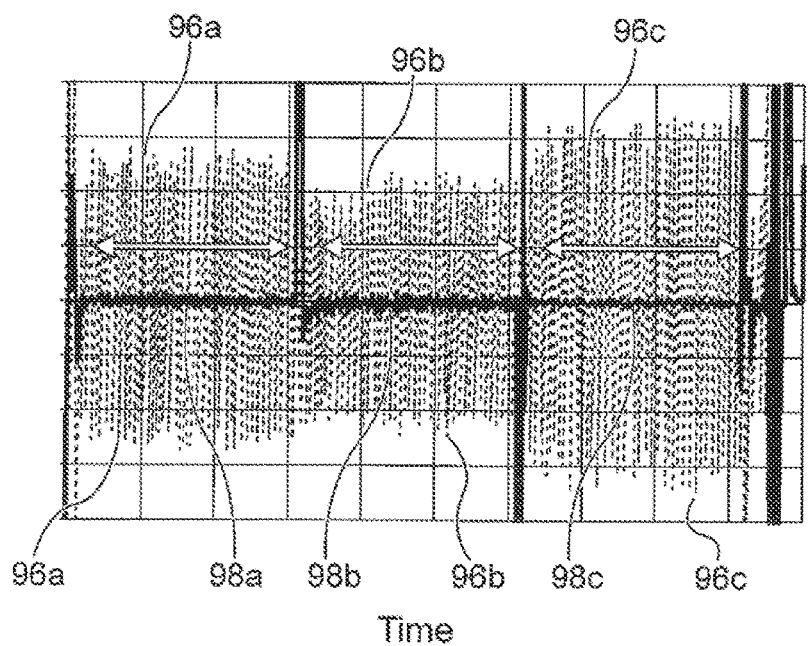
FIG. 16 illustrates an example of comparison between a level of noise contained in the rotation torque data of the polishing table 30A and a level of noise contained in the arm torque data.

FIG. 4 to FIG. 10 have shown a case where the arm torque detection section 26 uses the current command 18a as arm torque. Next, FIG. 14 and subsequent drawings show specific data when the arm torque detection section 26 uses the current value 18b as arm torque. FIG. 14 and subsequent drawings show data of the semiconductor wafer 16 different from FIG. 4 to FIG. 10. The current value 18b corresponds to one of three phases, for example, a V-phase, applied to the swing shaft motor 14 in the present embodiment. The arm torque detection section 26 may use a plurality of phases. FIG. 14 illustrates rotation torque data 88 of the polishing table 30A and arm torque data 90 for a comparison. The horizontal axis shows time and the vertical axis shows a current value. Note that each of the actual data 88 of rotation torque of the polishing table 30A and the actual data 90 of arm torque contains noise as shown in FIG. 16, which will be described later. Details of noise will be described in FIG. 16, and the actual data 88 of rotation torque contains significantly large noise, which is ten times or more than that of the actual data 90 of arm torque. FIG. 14 shows the data 88 and data 90 after noise is removed to detect an end point.

When the data 88 is compared with the data 90, the data 88 of rotation torque and the data 90 of arm torque exhibit identical tendencies. That is, the data 90 of arm torque tends to increase as the data 88 of rotation torque increases and the data 90 tends to decrease as the data 88 decreases. There is no time delay between the data 88 and the data 90. The data 88 of rotation torque and the data 90 of arm torque have a correlation relation. It can be seen from this that it is possible to measure a polishing frictional force using the data 90 of arm torque. Since the data 90 has a greater amount of change than the data 88, it can be seen that it is preferable to measure the polishing frictional force using the data 46 of arm torque.

Figure 15:
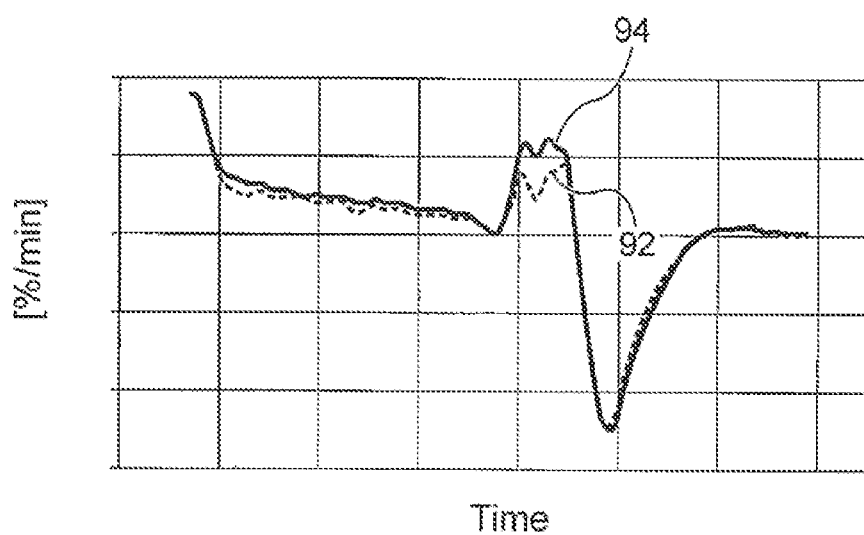
FIG. 15 illustrates data obtained by differentiating the data 88 and the data 92.

FIG. 15 illustrates data obtained by differentiating the data 88 and the data 92. The data 92 is obtained by differentiating the data 88 by time and the data 94 is obtained by differentiating the data 90 by time. The horizontal axis in FIG. 15 shows time and the vertical axis shows a current value/time (differential value of a current by time). When the data 92 is compared with the data 94, the data 92 of rotation torque and the data 94 of arm torque exhibit identical tendencies. That is, the data 94 of arm torque tends to increase as the data 92 of rotation torque increases and the data 94 of arm torque tends to decrease as the data 92 of rotation torque decreases. There is no time delay between the data 92 and the data 94. The data 94 has a greater amount of change than the data 92. It can be seen from this that it is preferable to measure the polishing frictional force using the data 94 of arm torque.

An example will be described next where the level of noise contained in the data of rotation torque of the polishing table 30A is compared to the level of noise contained in the data of arm torque. FIG. 16 illustrates an example of noise in the semiconductor wafer 16 which is different from the above-described example. The horizontal axis shows time and the vertical axis shows a magnitude of noise. Data 96 is noise contained in the data of rotation torque of the polishing table 30A. Data 98 is noise contained in the data of arm torque. Data 96a and data 98a are data when the pressure applied to the semiconductor wafer 16 is small and data 96b and data 98b are data when the pressure applied to the semiconductor wafer 16 is large, and data 96c and data 98c are data when no pressure is applied to the semiconductor wafer 16. When the data 96 is compared with the data 98, the noise level of arm torque is reduced to on the order of 1/17 of rotation torque of the polishing table 30A.

Figure 17:
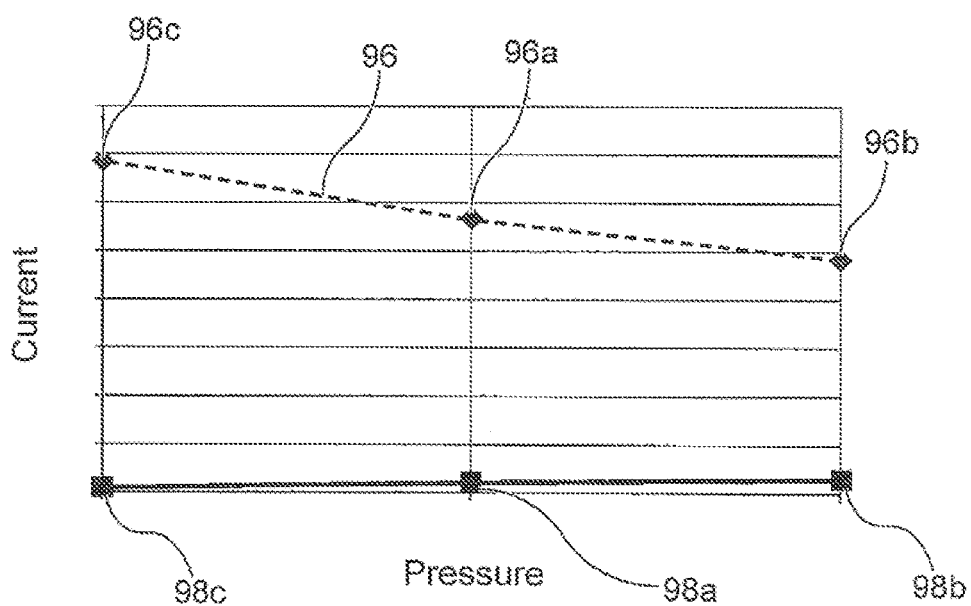
FIG. 17 illustrates the data shown in FIG. 16, with the horizontal axis indicating the pressure applied to the semiconductor wafer 16 and the vertical axis indicating the magnitude of noise.

FIG. 17 illustrates the data shown in FIG. 16, with the horizontal axis showing the pressure applied to the semiconductor wafer 16 and the vertical axis showing the magnitude of noise. The vertical axis shows amplitude (maximum value−minimum value) of the data 96 and the data 98. It can be clearly seen in FIG. 17 that the noise level of arm torque is reduced to on the order of 1/17 of that of rotation torque of the polishing table 30A.

Figure 18:
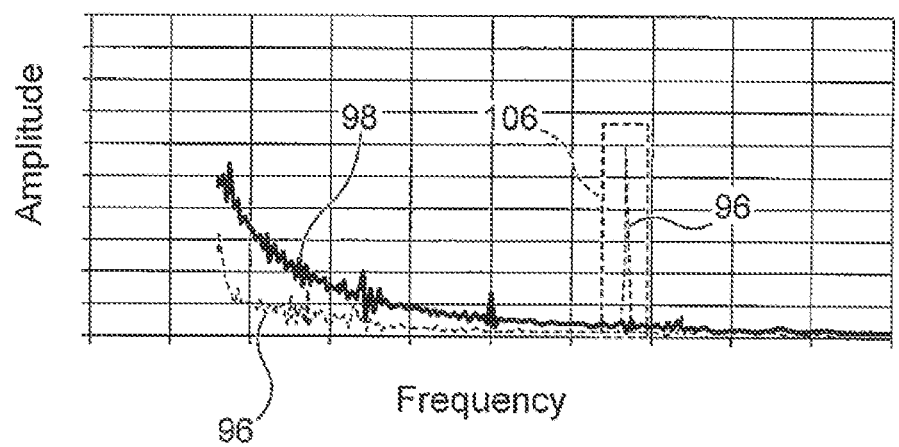
FIG. 18 illustrates a frequency spectrum of noise obtained by applying Fourier transform to noise contained in the rotation torque data of the polishing table 30A and noise contained in the arm torque data.

Next, a frequency distribution of noise will be described. FIG. 18 illustrates a frequency spectrum of noise obtained by applying Fourier transform to noise contained in the data of rotation torque of the polishing table 30A and noise contained in the data of arm torque. A comparison between both frequency spectra shows that large noise is generated in the data 96 of rotation torque of the polishing table 30A in an area enclosed by a dotted line 106.

This large noise is noise that depends on the ratio between the number of revolutions of the polishing table 30A and the number of revolutions of the top ring 31A. No such noise is generated in the data 98 of arm torque. From this point of view, there is an advantage that the torque of the swing arm 110 that swings the top ring 31A is less susceptible to noise caused by the above-described ratio of number of revolutions. In the example in FIG. 18, noise has been reduced to on the order of $1/17$ in the data 98 of arm torque. Thus, it is possible to easily reduce noise of a torque signal (swing motor signal or the like) of the arm with a top ring to $1/10$ or less of noise of a torque signal of the rotation table drive motor. It is possible to easily reduce noise to a range of $1/10$ to $1/100$ although it depends on polishing conditions.

A comparison between the plurality of embodiments of the present invention and prior arts reveals the following. The conventional case using rotation torque of the table motor that rotates the polishing table 30A has the following problems. 1) When controlling the rotation speed of the polishing table 30A to a predetermined value, additional torque (current) needs to be generated to stabilize the speed against an external force/external disturbance other than a net polishing force for a polishing process. Examples of the external force/external disturbance include a rolling frictional force of the bearing of the rotation shaft of the polishing table 30A and a sliding resistance force of a rotary joint connected to the rotation shaft of the table. The torque current for compensating fluctuations of these forces can be said to be noise components of the rotation torque of the table motor. 2) A detection error of a rotation sensor (correction error of the number of revolutions) for making the number of revolutions of the polishing table 30A constant may be generated at a frequency 10 times or more than the rotation speed of the polishing table 30A. At this time, a torque command value after processing a detection error in the compensation circuit according to a signal outputted from the rotation sensor includes frequency components 10 times or greater. This causes unnecessary currents to be generated. If there is an unnecessary current component having a frequency 10 times the rotation speed frequency, the influence on the behavior of the table rotation is 10% and this component influences the polishing process. The remaining 90% unnecessary current component can be said to be a noise component of the rotation torque of the table motor.

In the case of the embodiment of the present invention, that is, when the motor torque of the swing arm 110 is used to detect an end point, if the swing arm 110 is stopped without causing the top ring to swing during polishing, the above-described problems in 1) and 2) are not generated regarding the motor torque of the swing arm 110. Note that polishing is normally performed while keeping the swing arm 110 in a stationary state. According to the embodiment of the present invention, it is possible to implement a measuring system with fewer noise components of motor torque.

When the embodiment of the present invention is applied to one carousel, these effects can be obtained. That is, the carousel can be provided with a holding section for holding a polishing object, a swing arm for holding the holding section, and an arm drive section for swinging the swing arm. The holding section, the swing arm and the arm drive section constitute a set and a plurality of such sets can be provided for one carousel. This makes it possible to hold a plurality of top rings to one carousel. Note that the arm torque detection section that directly or indirectly detects arm torque applied to the swing arm and/or the end point detection section that detects a polishing end point indicating an end of polishing based on the arm torque detected by the arm torque detection section may be provided in the carousel or outside the carousel.

The effects of the embodiment of the present invention will further be described. In the present embodiment of the present invention, as shown in FIG. 2, a turning shaft 108 of the swing arm 110 is disposed outside the polishing table 30A. When a distance R1 from the rotation center of the polishing table 30A to the rotation center of the top ring 31A is compared with a distance R2 from the rotation center of the swing arm 110 to the rotation center of the top ring 31A, R1<R2. As a radius distance from the processing point center (rotation center of the top ring 31A) to the turning shaft 108 that detects torque increases, torque to resist the polishing force needs to be increased. Therefore, the greater the radius R2, the easier it is to detect a small polishing load fluctuation. That is, since R1<R2, it is easier to detect motor torque of the swing arm 110 than motor torque of the polishing table 30A.

As has been already described, since noise components in the motor torque of the polishing table 30A due to a rotation operation are not generated in the motor torque of the swing arm 110, it is possible to provide a polishing end point detection method with improved detection accuracy compared to the motor torque of the polishing table 30A.

Compared with the scheme in which a plurality of top rings are held to one carousel, the embodiment of the present invention has the following effects. In the carousel type, since a plurality of top rings are held to one carousel, the moment of inertia around the rotation shaft of the carousel is greater than the moment of inertia around the turning shaft 108 of the embodiment of the present invention. When the moment of inertia around the rotation shaft is smaller, a response speed for responding to a load fluctuation can be increased, and so it is possible to determine an end point more speedily.

With the carousel type polishing apparatus, R1=R2. In the carousel type polishing apparatus, one of the plurality of top rings receives a torque counterforce to hold positions of the other top rings via the carousel body. Behavior of one of the plurality of top rings affects the behavior of the other top rings. Therefore, if the carousel type polishing apparatus determines the polishing end point using only the motor torque of the turning shaft of the top ring, the possibility of erroneous detection increases compared to the embodiment of the present invention. In order to solve this problem, an apparatus described in U.S. Pat. No. 6,293,845, which is of a carousel type, discloses an end point determination method using the torque of the rotation motor of the polishing table 30A and the torque of the rotation motor of the top ring together.

The ratio of a weight of the top ring 31A to a weight of the swing arm 110 is preferably 0.3 to 1.5. The reason that the weight ratio is preferably 0.3 to 1.5 is as follows. When the ratio is smaller than 0.3, this means that the top ring 31A is light-weighted and the top ring 31A is likely to vibrate. When the ratio is greater than 1.5, the weight of the top ring 31A is greater and a large weight is applied to the root of the swing arm 110. Since a large weight is applied, rigidity of the root of the swing arm 110 is insufficient and behavior of the swing arm 110 becomes unstable.

Operation of the embodiment of the present invention can also be performed using the following software and/or system. For example, the system (substrate processing apparatus) includes a main controller (control section 65) that controls the whole system and a plurality of unit controllers that control operations of the respective units (unloading section 62, polishing section 63 and cleaning section 64) respectively. The main controller and the unit controllers include CPU, memory, recording medium and software stored in a recording medium to operate respective units respectively.

When the unit is the polishing section 63, the unit controller of the polishing section 63 performs control of rotation of the top ring body 24, control of pressing of pressing the semiconductor wafer 16 against the polishing pad 10 on the polishing table 30A and control of rotation of the polishing table 30A. The main controller monitors control of the unit controllers and instructs the unit controllers to operate. Examples of sensors necessary for controlling these unit controllers include a sensor for measuring the pressing force of the top ring body 24, a sensor for measuring torque of the fixing section of the swing arm 110 and a sensor for monitoring a current of the swing shaft motor 14. Regarding the software, updated software can be installed so as to update from initial software.

According to the respective embodiments of the present invention, one or a plurality of the following effects can be achieved. According to the embodiments of the present invention, the accuracy of end point detection improves in comparison with end point detection through torque of the rotation motor of the polishing table. For example, an S/N can be improved 10 times or more. An improvement of the S/N 10 times or more reduces or eliminates the necessity for the time required for data averaging for a noise reduction conventionally deemed necessary due to large noise. This makes it possible to shorten an end point detection delay time in which end point detection due to a time required for data averaging is delayed. A reduction of the detection delay time entails a reduction of dishing, erosion or the like. The "dishing" is a phenomenon that a wiring cross section in mainly a wide wiring pattern is recessed in a dish form and the "erosion" is a phenomenon that an insulating film as well as wiring is shaved in mainly a microwiring section, and excessive polishing takes place in both phenomena. Thus, when the accuracy of end point detection improves, the accuracy of the whole process improves, the accuracy of processing of a CMOS sensor or the accuracy of processing of a microstructure correlation film improves, making it possible to improve performance of chips and devices.

Figure 33:
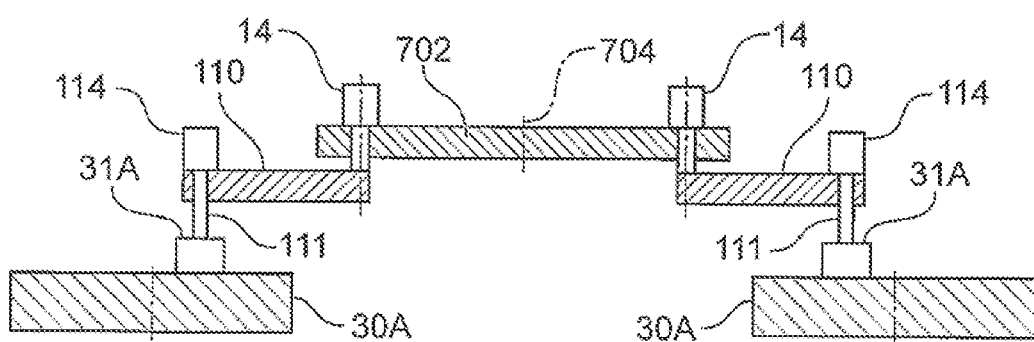
FIG. 33 is a schematic side view illustrating a relationship between a multihead type top ring supported by a carousel and the polishing table.

Next, an embodiment in which the polishing apparatus includes a carousel which is rotatable around a rotation shaft and an arm drive section is attached to a carousel will be described using FIG. 33. FIG. 33 is a schematic side view illustrating a relationship between a multihead type top ring 31A and the swing arm 110 supported by a carousel 702 and the polishing table 30A.

According to an embodiment provided with a top ring attached to a carousel 702 shown in FIG. 33 to FIG. 35 and a track 714 shown in FIG. 36, which will be described later, the following problems can be solved. When a plurality of top rings 31A are provided on a large carousel 702 or a track 714, there is a method of monitoring a torque fluctuation of a rotation drive motor of the polishing table or a top ring rotation drive motor in addition to the method based on arm torque as one of polishing end point detection means. This method detects a change in a rotation resistance force (frictional force) of the top ring 31A. However, an error may occur in a frictional force detection signal due to an error between a fluctuation in rotation of the top ring and a fluctuation in rotation of the table or the like, making it difficult to detect an end point with high accuracy. Furthermore, when there are a plurality of top rings on one rotation table, since rotation of the table fluctuates in a complicated manner under influences of the plurality of top rings 31A, it is difficult to accurately grasp a fluctuation in a frictional force for each top ring 31A. The embodiment shown in FIG. 33 to FIG. 36 reduces errors between a fluctuation in rotation of the top ring and a fluctuation in rotation of the table and also reduces influences of the plurality of top rings 31A, and can thereby solve these problems.

This is a polishing apparatus in which the swing arm 110 is attached to the carousel 702 and the top ring 31A is attached to the swing arm 110. One swing arm 110 and one top ring 31A form a unit (hereinafter referred to as a "TR unit"), and the carousel 702 may be provided with one unit or a plurality of units (multihead type). FIG. 33 shows a case of the carousel 702 provided with a plurality of units.

Figure 34A:
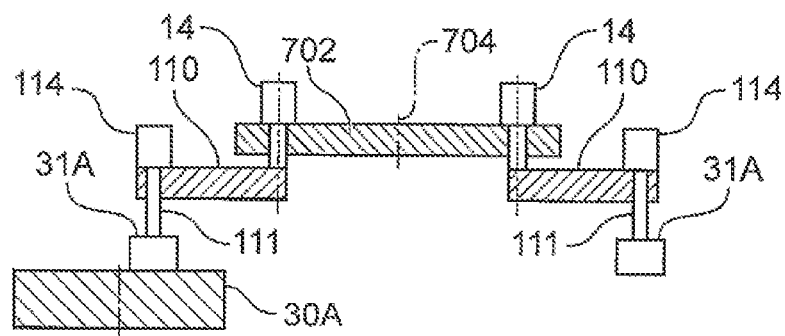
FIG. 34A is a diagram illustrating a case where a plurality of TR units are disposed when there is one polishing table 30A.
Figure 34B:
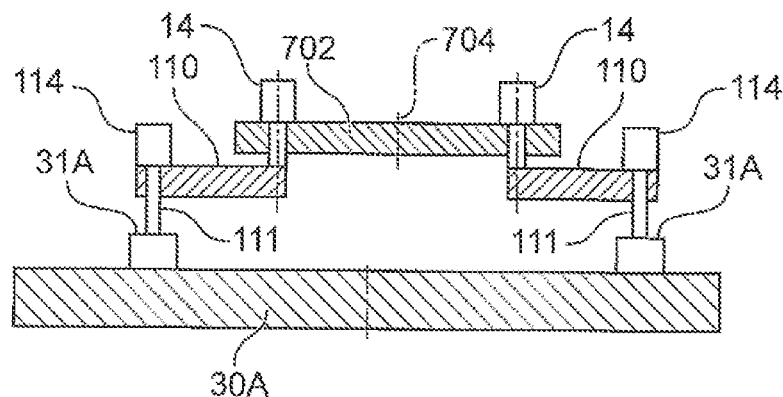
FIG. 34B is a diagram illustrating a case where a plurality of TR units are disposed when there is one polishing table 30A.

As shown in FIG. 33, when the polishing apparatus is provided with a plurality of polishing tables 30A and a plurality of substrates can be polished, a plurality of TR units are provided. When the number of polishing tables 30A is one, a plurality of TR units may be provided or one TR unit may be provided. FIG. 34 is a diagram illustrating a case where a plurality of TR units are provided when there is one polishing table 30A. In this case, there can be a polishing apparatus in which two TR units perform polishing simultaneously on the polishing table 30A and another polishing apparatus in which only one TR unit performs polishing on the polishing table 30A. FIG. 34A illustrates a polishing apparatus in which only one TR unit performs polishing on the polishing table 30A. FIG. 34B illustrates a polishing apparatus in which two TR units perform polishing simultaneously on the polishing table 30A.

In the apparatus in FIG. 34A, while one TR unit is performing polishing, the other TR unit makes preparations for polishing of the next semiconductor wafer 16.

In the examples shown in FIGS. 33 and 34, the carousel 702 can rotate. A rotation mechanism is provided in the vicinity of the center of the carousel 702. The carousel 702 is supported by pillars (not shown). The carousel 702 is supported by a main rotation shaft of a motor (not shown) attached to the pillars. Therefore, the carousel 702 can rotate around a vertical rotation shaft center 704 through rotation of the main rotation shaft. In FIGS. 33 and 34, the swing arm 110 can rotate by the swing shaft motor 14, but the swing arm 110 may also be fixed.

Figure 35:
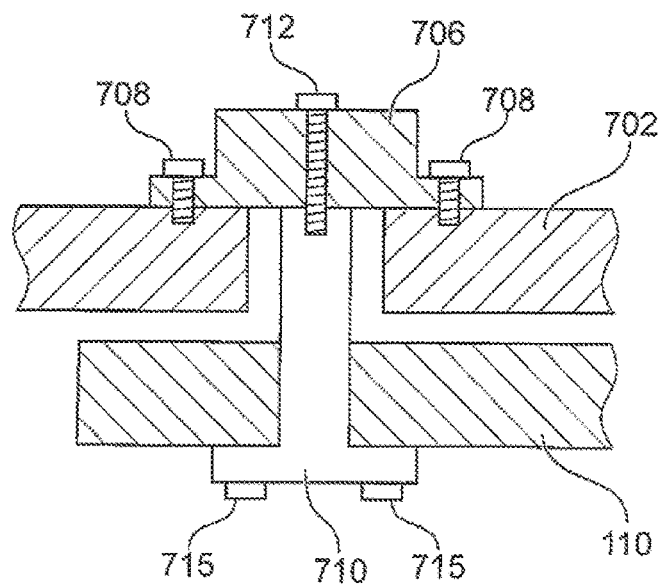
FIG. 35 is a diagram illustrating an example of installation of a load cell 706.
Figure 36:
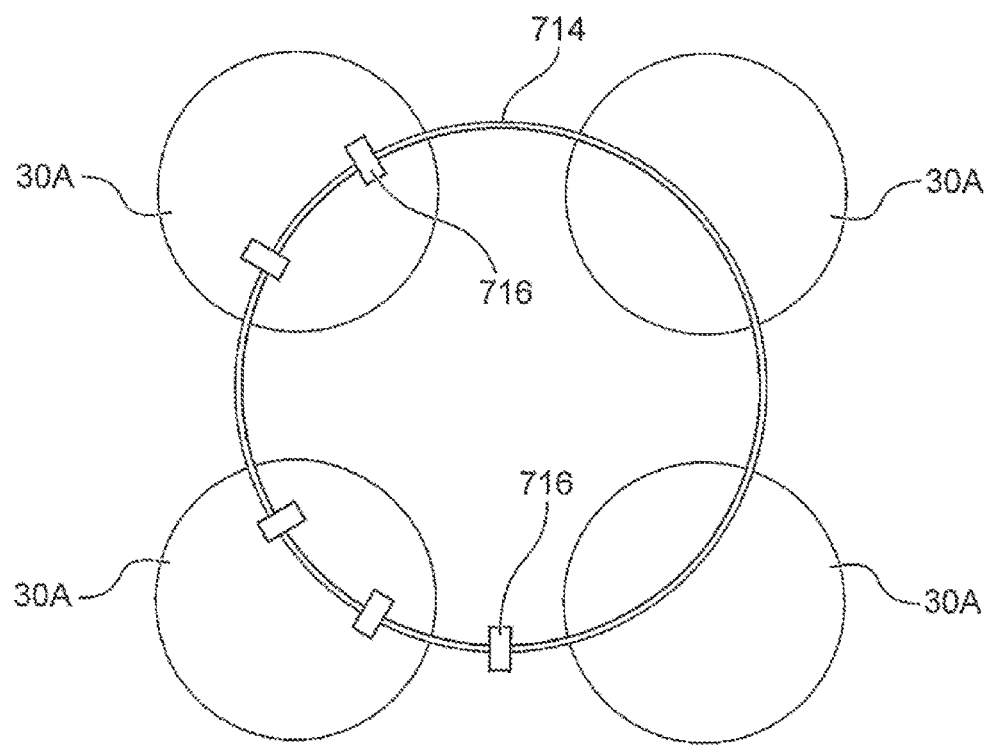
FIG. 36 is a diagram illustrating an embodiment in which a swing arm moves on a track.

FIG. 35 is a diagram illustrating an installation example of a load cell 706 when swing torque is measured using the load cell 706 with the swing arm 110 fixed to the carousel 702. The load cell 706 is fixed to the carousel 702 using a bolt 708. The load cell 706 is attached to a metal fitting 710 using a bolt 712. The swing arm 110 is attached to the metal fitting 710 using bolts 715. This configuration allows the load cell 706 to measure rotation torque applied to the metal fitting 710, that is, swing torque applied to the swing arm 110.

Next, another embodiment in which the swing arm 110 moves on a track will be described using FIG. 36. The polishing apparatus includes a support frame, which is not shown, a track 714 attached to the support frame to define a transfer path of the top ring motor 114 and carriages 716 that convey the top ring motor 114 along a path defined by the track 714, are connected to the track 714 and movable along the track 714. The polishing table 30A is provided in plurality.

It is also possible to use a linear motor drive system for the track 714 and the mechanism (carriages) that moves along the track 714. It is also possible to use a track mechanism using a motor and a bearing. Another aspect of FIG. 36 is one in which the track itself can rotate. According to this aspect, the track itself can rotate and move the top ring to another table part. The carriages make a small amount of movement adjustment then.

Next, another embodiment having an optical sensor will be described using FIG. 37. The present embodiment simultaneously uses detection of a torque fluctuation in the swing shaft motor 14 that swings the polishing table 30A and detection of a reflection factor of the polishing surface of the semiconductor wafer 16 using an optical sensor. A sensor is incorporated in the polishing table 30A to detect an end point. The sensor is an optical sensor 724. A sensor using a fiber or the like is used as the optical sensor 724. Note that an eddy current sensor can also be used instead of the optical sensor 724.

The embodiment in FIG. 37 can solve the following problems. When only one of a torque fluctuation detection scheme and an optical detection scheme is used to detect an end point, if polishing of a polishing target involves a mixture of polishing: polishing of a metal film and polishing of an insulating film, this results in the following problem. The torque fluctuation detection scheme is suitable for detection of a boundary between a metal film and an insulating film, and the optical detection scheme is suitable for detection of a change in a thickness of a film. Thus, when both detection of a boundary of films and detection of a thickness of the remaining film are necessary, use of only one scheme cannot achieve sufficient detection accuracy. This problem can be solved by selectively using either torque fluctuation detection or optical detection depending on which of detection of a boundary of films or detection of a thickness of the remaining film corresponds to the case.

In the case of an optical sensor, the end point detection section of the polishing apparatus exposes the semiconductor wafer 16 to light and measures the intensity of reflected light from the semiconductor wafer 16. The end point detection section detects a polishing end point indicating an end of polishing based on arm torque detected by the arm torque detection section and the intensity of the reflected light from the semiconductor wafer 16 measured by the optical sensor 724. The output of the optical sensor 724 is sent to the control section 65 via a wiring 726.

In the case of the optical sensor, an opening 720 is provided in part of the polishing pad 10. The opening 720 is provided with a view port 722 which is a window. Radiation of light and detection of reflected light are achieved via the view port 722. The view port 722 is incorporated at a position inside the polishing table 30A which can face the semiconductor wafer 16 during polishing. The optical sensor 724 is disposed below the view port 722. When the optical sensor 724 is a fiber sensor, the view port 722 may not be provided.

When there is no view port 722, pure water may be discharged from around the fiber sensor to remove slurry supplied from the nozzle 728 and perform end point detection. The optical sensor includes a fluid supply section (not shown) that supplies pure water (or high purity gas, fluid such as a liquid-gas mixture) to clean slurry into the opening 720.

Figure 37A:
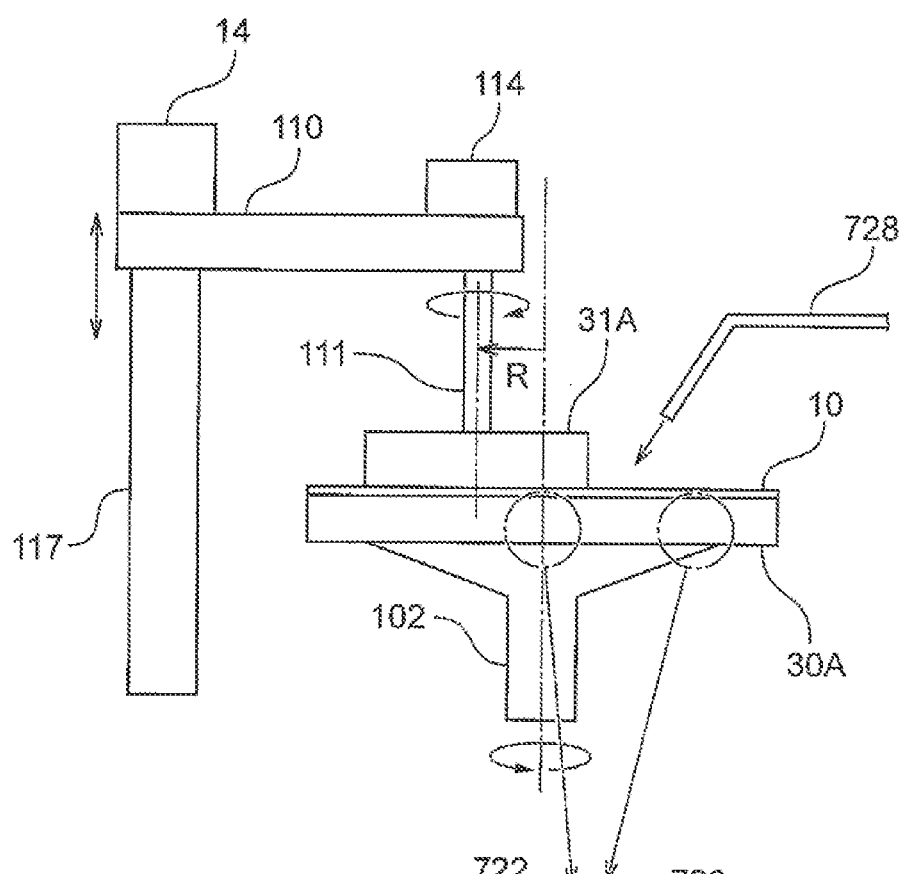
FIG. 37A is a diagram illustrating another embodiment having an optical sensor.
Figure 37B:
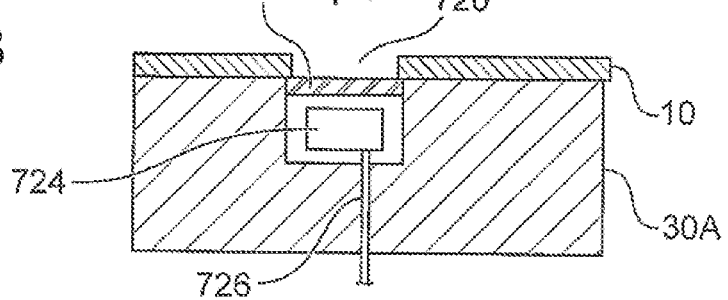
FIG. 37B is a diagram illustrating another embodiment having an optical sensor.

There can be a plurality of sensors. For example, as shown in FIG. 37, sensors are provided at a center and an end portion to monitor detection signals at both the center and end. FIG. 37A illustrates the location of the optical sensor 724 and FIG. 37B is an enlarged view of the optical sensor 724. The end point detection section 28 selects a detection signal unaffected by polishing conditions (or optimum for the polishing conditions) according to a change in the polishing conditions (material, polishing time or the like of the semiconductor wafer 16) from among a plurality of signals, determines an end point and stops polishing.

This point will be described further. A combination of torque fluctuation detection (measurement of motor current fluctuation) by the above-described swing shaft motor 14 and optical detection is effective if it is used to detect a polishing end point of an inter-layer insulating film (ILD) or an element separation film by STI (shallow trench isolation). In optical detection such as SOPM (spectrum optical endpoint monitoring), the thickness of the remaining film is detected and an end point is detected. For example, in a manufacturing process of a multilayer film of LSI, it may be necessary to form the remaining film through polishing of a metal film and polishing of an insulating film. It is necessary to perform polishing of the metal film and polishing of the insulating film, and it is possible to selectively use torque fluctuation detection or optical detection depending on which of polishing of the metal film or polishing of the insulating film is performed.

When the film structure of the end point portion is one in which the metal and the insulating film are present in a mixed state, it is difficult to detect an end point accurately using only one of torque fluctuation detection and optical detection schemes. Therefore, the film thickness is measured through torque fluctuation detection and optical detection, whether or not a certain point is an end point is determined based on both detection results and polishing is completed at an optimum time point. In a mixed state, measurement accuracy deteriorates because a measured signal is weak in both torque fluctuation detection and optical detection. However, it is possible to determine an optimum end point position by making determinations using signals obtained through two or more types of measurement methods. An end point is determined, for example, when all the determinations made using the signals obtained through two or more types of measurement methods have results indicating that an end point is found.

Next, another embodiment having an optical sensor will be described using FIG. 38. The present embodiment simultaneously uses detection of a torque fluctuation (friction fluctuation of the polishing table 30A) in the swing shaft motor 14 that swings the polishing table 30A, detection of a reflection factor of the polishing surface of the semiconductor wafer 16 using an optical sensor and detection of an eddy current in the polishing target of the semiconductor wafer 16 using an eddy current sensor. Three types of detection methods are used simultaneously.

In the case of the embodiment in FIG. 38, the following problems can be solved. The torque fluctuation detection scheme and the optical detection scheme according to the embodiment in FIG. 37 have a problem of having difficulty in detecting a change in the thickness of a metal film. The embodiment in FIG. 38 is intended to solve this problem and further uses detection of an eddy current in addition to the embodiment in FIG. 37. Since an eddy current in the metal film is detected, it is easier to detect a change in the thickness of a metal film.

Figure 38A:
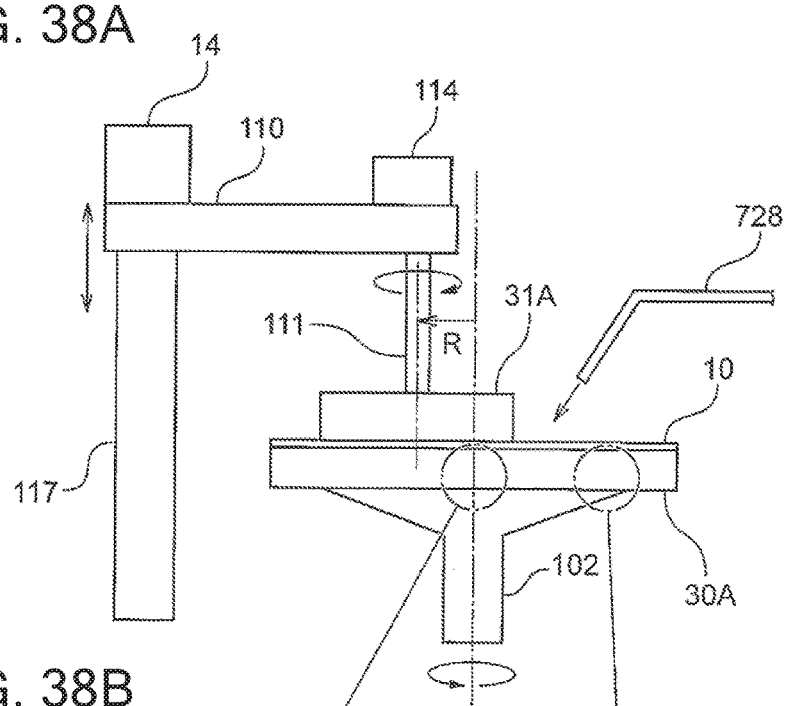
FIG. 38A is a diagram illustrating another embodiment having an optical sensor.
Figure 38B:
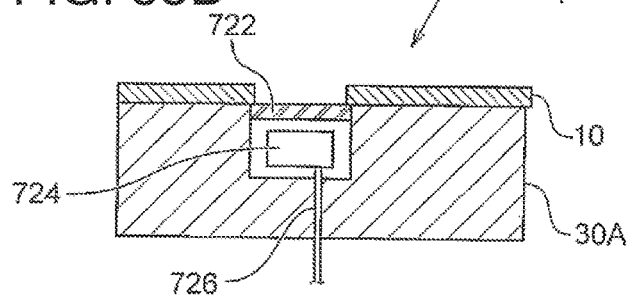
FIG. 38B is a diagram illustrating another embodiment having an optical sensor.
Figure 38C:
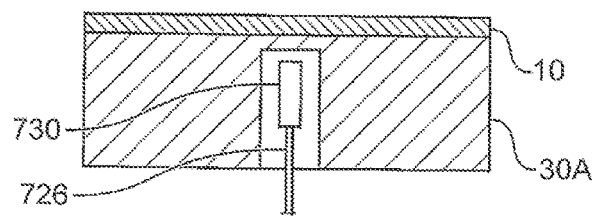
FIG. 38C is a diagram illustrating another embodiment having an optical sensor.

FIG. 38A illustrates arrangements of the optical sensor 724 and an eddy current type sensor 730, FIG. 38B is an enlarged view of the optical sensor 724 and FIG. 38C is an enlarged view of the eddy current type sensor 730. The eddy current type sensor 730 is disposed in the polishing table 30A. The eddy current type sensor 730 generates a magnetic field in the semiconductor wafer 16 and detects the intensity of the generated magnetic field. The end point detection section 28 detects a polishing end point indicating an end of polishing based on arm torque detected by the arm torque detection section 26, the intensity of reflected light from the semiconductor wafer 16 measured by the optical sensor 724 and the intensity of the magnetic field measured by the eddy current type sensor 730.

The present embodiment is an example of combining torque fluctuation detection of the swing shaft motor 14 and detection of physical quantities of the semiconductor wafer 16 by the optical sensor 724 and the eddy current type sensor 730 incorporated in the polishing table 30A to detect an end point. The torque fluctuation detection (measurement of motor current fluctuation) by the swing shaft motor 14 excels in detection of an end point in a region where the film quality of a sample to be polished changes. The optical scheme excels in detection of the amount of remaining film of an insulating film such as ILD and STI and detection of an end point thereby. End point detection by the eddy current sensor excels in end point detection at a time point at which polishing is performed up to the insulating film of the lower layer which is an end point by polishing, for example, a plated metal film.

In manufacturing processes of a semiconductor having multiple layers of LSI or the like, multiple layers made of various materials are polished, and so three types of end point detection methods are used to perform polishing of a variety of films and end point detection with high accuracy. Three or more types of end point detection methods can also be used. For example, torque fluctuation detection (motor current fluctuation measurement (TCM)) of a motor that rotates the polishing table 30A can also be used simultaneously.

It is possible to perform high function control and high accuracy end point detection using a combination of detection of four types of end points. For example, when the top ring 31A moves (swings) on the polishing table 30A to perform polishing, a torque fluctuation of the polishing table 30A due to a change in the position of the top ring 31A is detected using TCM. Thus, it is possible to find a factor whereby a pressure of the top ring 31A on a sample is different due to a torque fluctuation when the top ring 31A is located at the center of the polishing table 30A, when the top ring 31A moves to one end of the polishing table 30A or when the top ring 31A moves to the other end of the polishing table 30A. When the factor is found, it is possible to perform feedback such as adjusting a pressure on the surface of the top ring 31A in order to uniformize the pressure on the sample.

Examples of the factors for a torque fluctuation in the polishing table 30A due to a change in the position of the top ring 31A include a difference in the horizontal level between the top ring 31A and the polishing table 30A, a difference in the horizontal level between the sample face and the surface of the polishing pad 10 or the frictional force being different when the top ring 31A is located at the center and when the top ring 31A is located at a position deviated from the center due to a difference in the abrasion degree of the polishing pad 10.

Note that when the film structure of the polishing end point of the film of the semiconductor wafer 16 is one in which a metal and insulating film are present in a mixed state, it is difficult to perform accurate end point detection using only one detection scheme, and therefore the end point state is determined using a scheme of detecting an arm torque fluctuation and an optical detection method, or a scheme of detecting an arm torque fluctuation and a scheme of detecting an eddy current or from detection of all the three types of signals, and polishing is completed at an optimal time point. In the mixed state, since the measured signal is weak in any of the torque fluctuation detection, the optical scheme and the scheme of detecting a detection eddy current, the measurement accuracy deteriorates. However, by making determinations using signals obtained using three or more types of measurement methods, it is possible to determine an optimum end point position. For example, when all the determinations using signals obtained using the three or more types of measurement methods have results indicating that an end point is found, the end point is determined.

These combinations can be enumerated as follows:
i. Arm torque detection+table torque detection
ii. Arm torque detection+optical detection
iii. Arm torque detection+eddy current detection
iv. Arm torque detection+optical detection by microwave sensor
v. Arm torque detection+optical detection+table torque detection
vi. Arm torque detection+optical detection+eddy current detection
vii. Arm torque detection+optical detection+optical detection by microwave sensor
viii. Arm torque detection+eddy current detection+table torque detection
ix. Arm torque detection+eddy current detection+optical detection by microwave sensor
x. Arm torque detection+table torque detection+optical detection by microwave sensor
xi. In addition, any combination of sensors combined with arm torque detection is included.

Figure 39A:
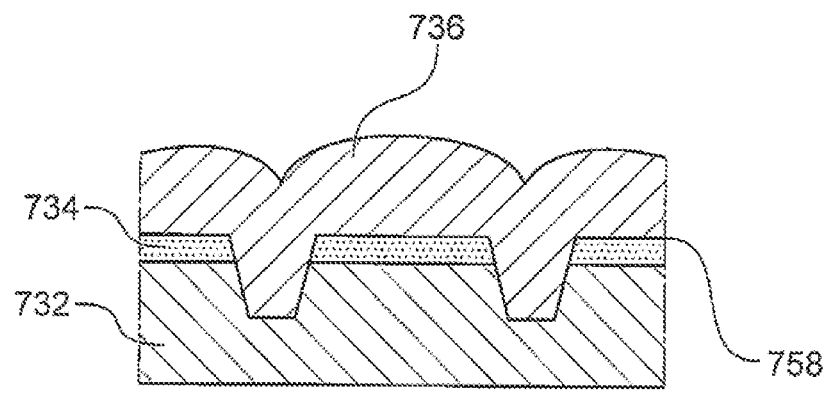
FIG. 39A is a diagram illustrating an example of a case where a metal and an insulating film are mixed in the film structure of the end point portion.
Figure 39B:
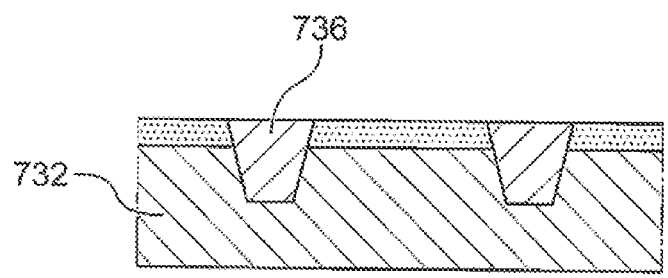
FIG. 39B is a diagram illustrating an example of a case where a metal and an insulating film are mixed in the film structure of the end point portion.

FIGS. 39, 40 and 41 show examples where the film structure of the end point portion is one in which a metal and an insulating film are present in a mixed state. In the following examples, examples of the metal include metals such as Cu, Al, W and Co, and examples of the insulating film include insulating materials such as $SiO_2$, SiN, glass material (SOG (spin-on glass), BPSG (boron phosphorus silicon glass) or the like), Lowk material, resin material and other insulating members. $SiO_2$, SOG, BPSG or the like are manufactured using CVD or coating. FIGS. 39A and 39B are examples where an insulating film is polished. FIG. 39A illustrates a state before polishing and FIG. 39B illustrates a state after polishing. A film 732 is silicon. A film 734 which is an insulating film such as $SiO_2$ (thermal oxide film) and SiN is formed on the film 732. A film 736 which is an insulating film such as an oxide film ($SiO_2$) or glass material (SOG, BPSG) is formed on the film 734 through film formation. The film 736 is polished to a state shown in FIG. 39B.

The film thickness of the film 736 is measured through optical detection. A boundary 758 between the film 736 and the film 734, and a boundary between the film 734 and the film 732 are sensitive to reflection of light. Therefore, optical detection is preferable. When the film 736 and the film 734 are made of different materials, a change in friction may be large during polishing. In this case, optical detection+torque detection is preferable.

Figure 40A:
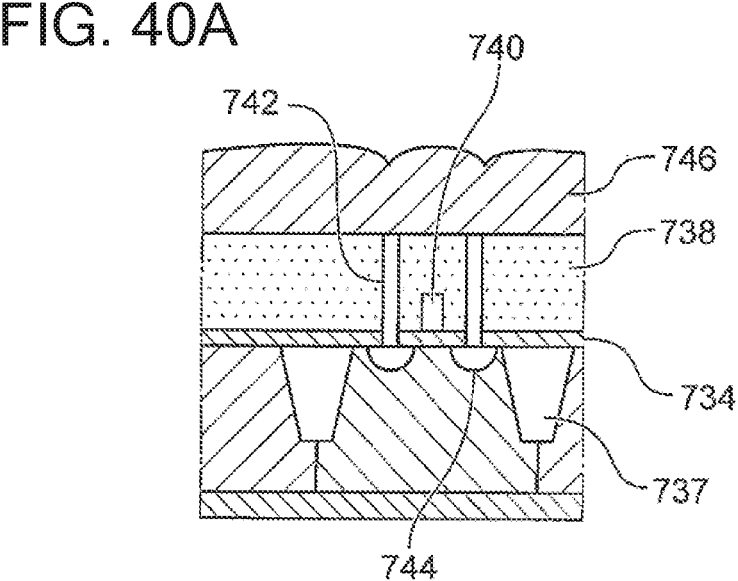
FIG. 40A is a diagram illustrating an example of a case where a metal and an insulating film are mixed in the film structure of the end point portion.
Figure 40B:
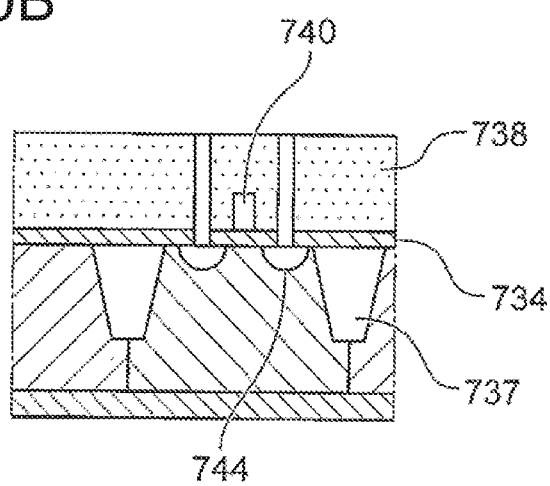
FIG. 40B is a diagram illustrating an example of a case where a metal and an insulating film are mixed in the film structure of the end point portion.

FIGS. 40A and 40B illustrate examples where a metal film is polished. FIG. 40A illustrates a state before polishing and FIG. 40B illustrates a state after polishing. An embedded part 737 is an STI. A film 738 similar to the film 736 is formed on the film 734. A gate electrode 740 is formed on the film 734. A diffusion layer 744 which is a drain or source is formed below the film 734. The diffusion layer 744 is connected to a longitudinal wiring 742 such as a via or plug. The gate electrode 740 is connected to the longitudinal wiring 742, which is not shown. The longitudinal wiring 742 penetrates the film 738. A metal film 746 is formed on the film 738. The longitudinal wiring 742 and the metal film 746 are of the same metal. The metal film 746 is polished to a state shown in FIG. 40B. Note that although the gate electrode 740 and the diffusion layer 744 are formed in FIG. 40, other circuit elements may also be formed.

Being a metal film, the metal film 746 detects an eddy current by taking advantage of the fact that there is a large change in the waveform of an eddy current in the metal film 746 when the metal film is drastically reduced. It is also possible to use optical detection taking advantage of the fact that the metal film is reduced from a state in which the amount of reflection of the metal film is large and the amount of reflection drastically changes, together with eddy current detection. Since the film 738 is an insulating film, the film thickness thereof is measured through optical detection.

Figure 41A:
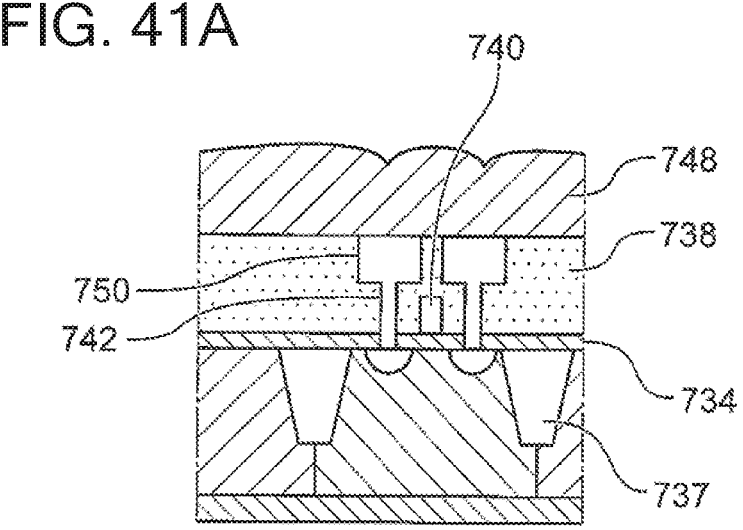
FIG. 41A is a diagram illustrating an example of a case where a metal and an insulating film are mixed in the film structure of the end point portion.
Figure 41B:
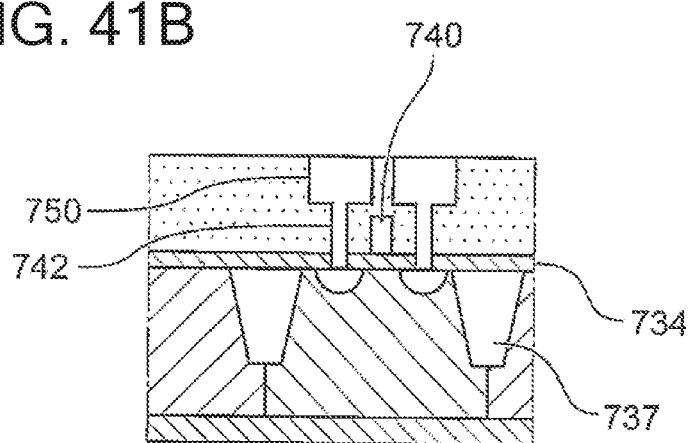
FIG. 41B is a diagram illustrating an example of a case where a metal and an insulating film are mixed in the film structure of the end point portion.

FIGS. 41A and 41B illustrate examples where a metal film is polished. FIG. 41A illustrates a state before polishing and FIG. 41B illustrates a state after polishing. The embedded part 737 is an STI. The film 738 is formed on the film 734. The gate electrode 740 is formed on the film 734. The diffusion layer 744 which is a drain or source is formed below the film 734. The diffusion layer 744 is connected to the longitudinal wiring 742 such as a via or plug. The gate electrode 740 is connected to the longitudinal wiring 742, which is not shown. The longitudinal wiring 742 penetrates the film 738. A metallic lateral wiring 750 is formed on the via 742. The metal film 748 and the lateral wiring 750 are of the same metal. The metal film 748 is polished to a state shown in FIG. 41B.

Being a metal film, the metal film 748 detects an eddy current using an eddy current sensor. Since the film 738 is an insulating film, its film thickness is measured through optical detection. Note that the embodiment shown in FIG. 39 and subsequent drawings is applicable to all the embodiments in FIG. 1 to FIG. 38.

Figure 42:
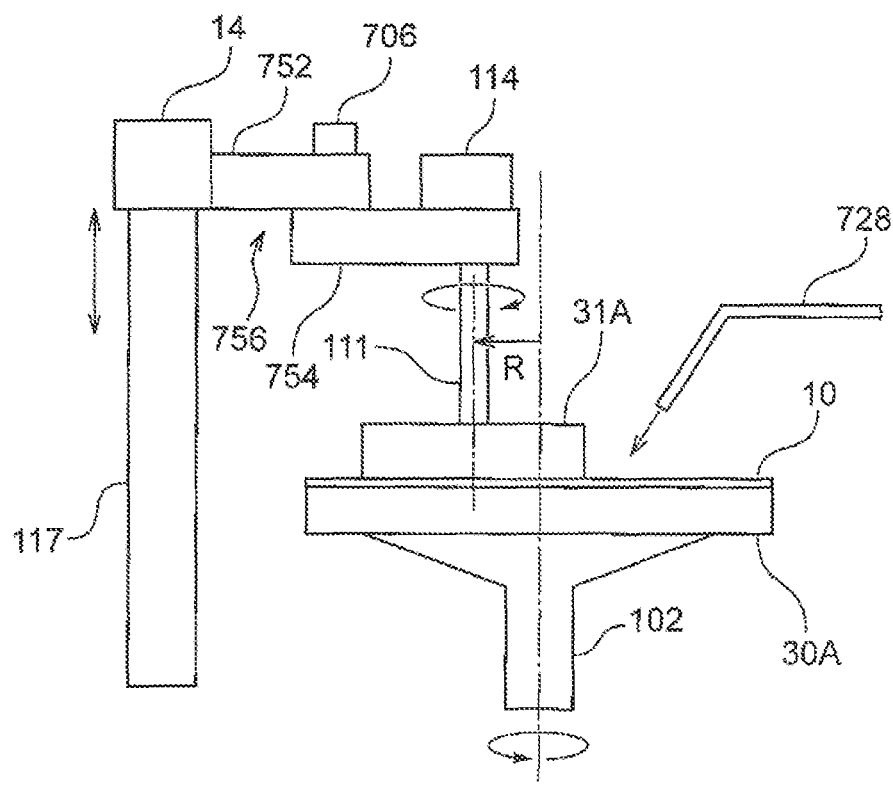
FIG. 42 is a diagram illustrating an embodiment as a modification of FIG. 2.

Next, an embodiment as the modification in FIG. 2 will be described using FIG. 42. In the present embodiment, the swing arm 110 is constructed of a plurality of arms. In FIG. 42, the swing arm 110 is constructed of, for example, an arm 752 and an arm 754. The arm 752 is attached to the swing shaft motor 14 and the top ring 31A is attached to the arm 754. An end point is detected by detecting a torque fluctuation in the swing arm at a joint between the arm 752 and the arm 754.

In the case of the embodiment in FIG. 42, the following problems can be solved. In the case of FIG. 2, regarding end point detection, there is a problem that the accuracy of end point detection deteriorates due to influences of clearance vibration, which will be described later, or the like. In the case of the embodiment in FIG. 42, it is possible to reduce the influences of clearance vibration or the like, and thereby solve this problem.

A torque sensor for detecting a torque fluctuation in the swing arm is disposed at the joint 756 between the arm 752 and the arm 754. The torque sensor includes the load cell 706 and a distortion gauge. The structure of the joint 756 can be the same as the structure in FIG. 35, for example. As shown in FIG. 35, the arm 752 and the arm 754 are mutually fixed by the metal fitting 710. The arm 752 can be caused to swing by the swing shaft motor 14. When a torque change is measured based on a fluctuation in the aforementioned swing motor current, the swing operation may be preferably stopped temporarily and a torque change may be measured. This is because noise in the motor current of the swing motor may increase along with the swing operation.

In the case of the present embodiment, when a fluctuation in polishing torque occurs due to a friction fluctuation in a part where the film quality changes such as the boundary 758 in FIG. 39A, it is possible to detect the boundary 758 using the torque sensor of the joint 756. A fluctuation in polishing torque can also be detected by detecting a current fluctuation in the swing shaft motor 14. Compared to the torque fluctuation detection based on a current fluctuation, torque fluctuation detection by the torque sensor at the joint 756 has the following merits.

The torque fluctuation detection through detection of a current fluctuation is affected by an error in rotation operation (swing) of the swing shaft motor 14 such as clearance vibration of the swing arm 110 by the swing shaft motor 14. The "clearance vibration" is vibration caused by slight backlash generated at the part of the swing arm 110 attached to the swing shaft motor 14 during rotation operation of the swing shaft motor 14. In torque fluctuation detection by the torque sensor at the joint 756, the joint 756 has no clearance vibration and can detect a torque fluctuation corresponding to a friction change of the polishing section. Thus, more accurate end point detection is made possible. It is necessary to stop swinging of the swing arm 110 to reduce clearance vibration. However, in torque fluctuation detection by the torque sensor at the joint 756, accurate end point detection is made possible without stopping swinging of the swing arm 110.

The present embodiment is applicable to a case where there are a plurality of top rings 31A or also applicable to a carousel scheme. As multilayer films of LSI become thinner or functional elements become finer, more accurate polishing end point detection needs to be performed than the prior art in order to make performance more stable and maintain yield. The present embodiment is effective as a technique capable of meeting such requirements.

Figure 43:
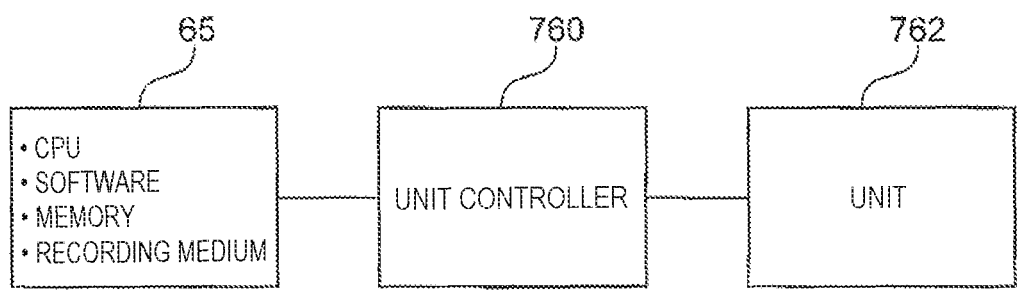
FIG. 43 is a diagram illustrating overall control by a control section 65.

Next, control of the entire substrate processing apparatus by the control section 65 will be described using FIG. 43. The control section 65 which is a main controller includes a CPU, a memory, a recording medium and software recorded in the recording medium or the like. The control section 65 performs monitoring or control of the entire substrate processing apparatus, exchanges signals therefor, records information or carries out calculations. The control section 65 exchanges signals mainly with a unit controller 760. The unit controller 760 also includes a CPU, a memory, a recording medium and software recorded in the recording medium or the like. In the case of FIG. 43, the control section 65 incorporates a program that functions as end point detection means for detecting a polishing end point indicating an end of polishing and control means for controlling polishing by the polishing unit. Note that the unit controller 760 may incorporate a part or a whole of the program. The program is updatable. Note that the program may not be updatable.

The embodiment described in FIG. 43 to FIG. 47 can solve the following problems. The control schemes of the polishing apparatuses described so far have the following typical problems. Regarding end point detection, before polishing a target, a plurality of tests are conducted, polishing conditions or end point determination conditions are determined from the data obtained and a recipe which is the polishing conditions is created. A partial signal analysis may be used but processing of determining end point detection is performed using one sensor signal for the wafer structure. In this way, however, sufficient accuracy cannot be achieved to meet the following requirements. In order to improve yield of devices or chips to be manufactured, it is necessary to detect an end point with higher accuracy and minimize variations among lots and chips in manufacturing the devices or chips. To meet such requirements, by using a system that carries out end point detection to which the embodiments described in FIG. 43 and subsequent drawings are applied, it is possible to perform more accurate end point detection, improve yield and minimize variations in the amount of polishing among chips.

Particularly, it is possible to achieve high-speed data processing, signal processing using many sensors of many types, data normalized from these signals, learning from data using artificial intelligence (AI), creation of a data set used to determine end point detection, learning through storage of determination examples using the created data set, improvement of accuracy using learning effects, polishing parameters determined and updated by the learned determination function, a high-speed communication processing system that reflects the polishing parameters in a high-speed control system, or the like. These are applicable to all the embodiments shown in FIG. 42 and therebefore.

The unit controller 760 controls a unit 762 (one or in plurality) mounted on the substrate processing apparatus. According to the present embodiment, the unit controller 760 is provided for each unit 762. The unloading section 62, the polishing section 63 and the cleaning section 64 or the like are provided as the unit 762. The unit controller 760 controls operation of the unit 762, exchanges signals with the monitoring sensor, exchanges control signals and performs high-speed signal processing or the like. The unit controller 760 is constructed of an FPGA (field-programmable gate array), an ASIC (application specific integrated circuit) or the like.

The unit 762 operates according to a signal from the unit controller 760. The unit 762 receives a sensor signal from the sensor and transmits the sensor signal to the unit controller 760. The sensor signal may be further transmitted from the unit controller 760 to the control section 65. The sensor signal is processed (including calculation processing) by the control section 65 or the unit controller 760 and a signal for the next operation is sent from the unit controller 760. The unit 762 operates according to the signal. For example, the unit controller 760 detects a torque fluctuation of the swing arm 110 from a current change in the swing shaft motor 14. The unit controller 760 sends a detection result to the control section 65. The control section 65 performs end point detection.

Examples of the software include the following. The software determines the type of the polishing pad 10 and the amount of slurry supplied according to the data recorded in the control device (control section 65 or unit controller 760). Next, the software specifies maintenance timing of the polishing pad 10 or the polishing pad 10 usable until the maintenance timing, calculates the amount of slurry supplied and outputs the data. The software may also be software that can be installed in the substrate processing apparatus 764 after shipment of the substrate processing apparatus 764.

Communication between the control section 65, unit controller 760 and unit 762 can be carried out wiredly or wirelessly. Communication via the Internet or communication using other communication means (high-speed communication using a dedicated channel) is available for communication between the substrate processing apparatus 764 and the outside. Regarding data communication, it is possible to use a cloud through cloud cooperation and exchange data via smartphones in the substrate processing apparatus through smartphone cooperation. It is thereby possible to exchange an operation situation of the substrate processing apparatus and setting information of substrate processing with the outside of the substrate processing apparatus. A communication network may be formed between sensors as a communication device and this communication network may be used.

Automated operation of the substrate processing apparatus may be performed using the above-described control function and communication function. It is possible to standardize a control pattern of the substrate processing apparatus and use a threshold in determination of a polishing end point for automated operation.

It is possible to predict/determine/display an abnormality/life of the substrate processing apparatus. It is also possible to perform control to make performance more stable.

It is possible to automatically extract feature values of various types of data and polishing data (film thickness and end point of polishing) during operation of the substrate processing apparatus, automatically learn the operation state and polishing state, automatically standardize a control pattern and predict/determine/display an abnormality/life.

For a communication scheme, device interface or the like, it is possible to standardize, for example, a format, use it for information communication between apparatuses/devices to manage the apparatuses/devices.

Figure 44:
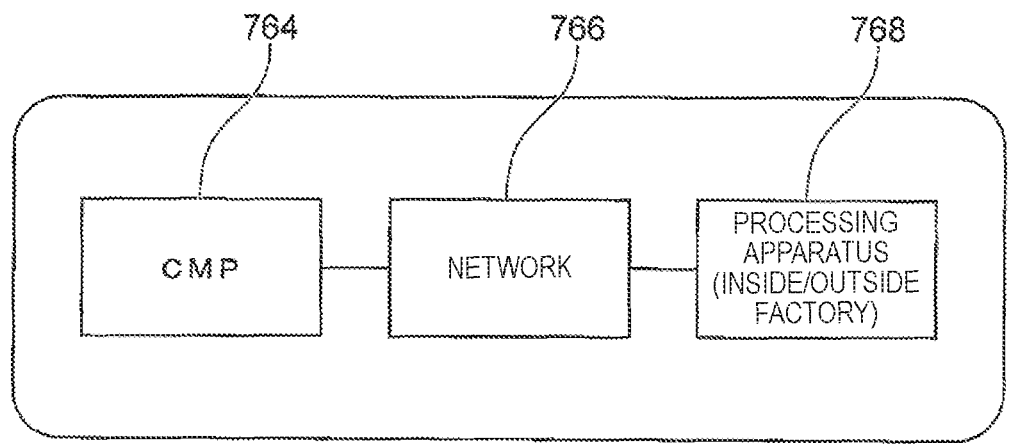
FIG. 44 is a diagram illustrating a configuration of another embodiment.

Next, an embodiment will be described in which the substrate processing apparatus 764 acquires information from the semiconductor wafer 16 via a sensor, data is stored in a data processing apparatus (cloud or the like) installed inside/outside a factory in which the substrate processing apparatus is installed via communication means such as the Internet, the data stored in the cloud or the like is analyzed and the substrate processing apparatus is controlled according to the analysis result. FIG. 44 is a diagram illustrating a configuration of this embodiment.

1. The information acquired from the semiconductor wafer 16 via the sensor can be as follows: Measured signal or measured data relating to a torque fluctuation of the swing shaft motor 14; measured signal or measured data of an SOPM (optical sensor); measured signal or measured data of an eddy current sensor; measured signal or measured data of one or a plurality of combinations.

2. Communication means such as the Internet can have the following functions and configurations: Signals or data including the above-described measured signal or measured data are transmitted to the data processing apparatus 768 connected to the network 766. The network 766 can be communication means such as the Internet or high-speed communication. For example, it is possible to implement the network 766, in which the substrate processing apparatus, gateway, Internet, cloud, Internet, and data processing apparatus are connected in that order. Examples of high-speed communication include high-speed optical communication, high-speed radio communication. As high-speed radio communication, Wi-Fi (registered trademark), Bluetooth (registered trademark), Wi-Max (registered trademark), 3G, LTE or the like are conceivable. Other high-speed radio communications are also applicable. Note that a cloud may be used as the data processing apparatus. When the data processing apparatus 768 is installed in a factory, it is possible to process signals from one or a plurality of substrate processing apparatuses in the factory. When the data processing apparatus 768 is installed outside the factory, it is possible to transmit signals from one or a plurality of substrate processing apparatuses in the factory to the outside of the factory and process the signals. In this case, connections with data processing apparatuses installed in and outside Japan are possible.

3. Regarding the above description that the data processing apparatus 768 analyzes data stored in the cloud or the like and controls the substrate processing apparatus 764 according to the analysis result, the following is possible. After the measured signal or measured data is processed, they can be transmitted to the substrate processing apparatus 764 as a control signal or control data. The substrate processing apparatus 764 that has received the data updates polishing parameters relating to polishing processing based on the data and performs polishing operation. When the data from the data processing apparatus 768 is a signal/data indicating that an end point is detected, polishing is completed by determining that an end point is detected. The polishing parameters include (1) pressing forces on four regions of the semiconductor wafer 16, that is, central part, inside intermediate part, outside intermediate part and peripheral edge, (2) polishing time, (3) the number of revolutions of the polishing table 30A and the top ring 31A, and (4) a threshold for determination of a polishing end point.

Figure 45:
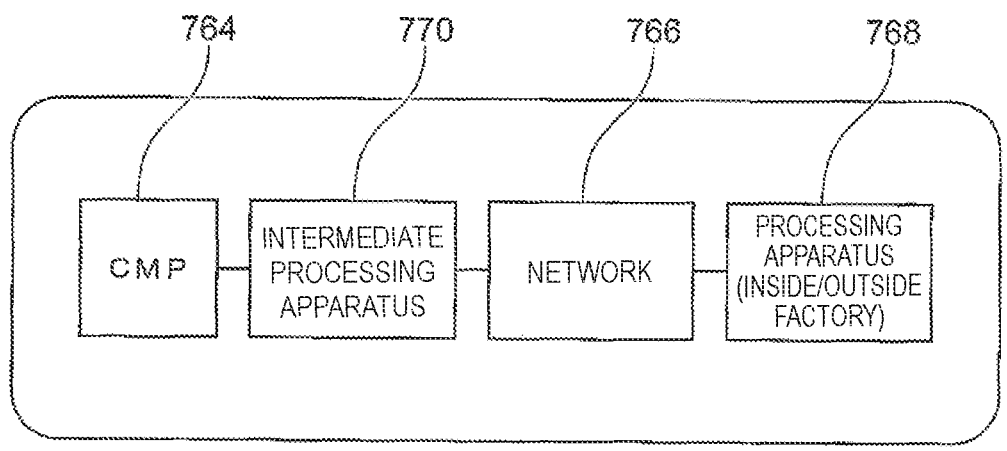
FIG. 45 is a diagram illustrating a modification of the embodiment in FIG. 44.

Next, another embodiment will be described using FIG. 45. FIG. 45 is a diagram illustrating a modification of the embodiment in FIG. 44. The present embodiment has a configuration with the substrate processing apparatus, the intermediate processing apparatus, the network 766, and the data processing apparatus connected in that order. The intermediate processing apparatus is constructed of, for example, an FPGA or ASIC, and has a filtering function, a calculation function, a data processing function and a data set creation function.

Usage of the Internet and high-speed optical communication can be classified into the following three cases: (1) case where the substrate processing apparatus and the intermediate processing apparatus are connected via the Internet and the network 766 is the Internet; (2) case where the substrate processing apparatus and the intermediate processing apparatus are connected via high-speed optical communication and the network 766 is high-speed optical communication; (3) case where the substrate processing apparatus and the intermediate processing apparatus are connected via high-speed optical communication and the intermediate processing apparatus and outside thereof is the Internet.

Case (1): This is a case where the data communication speed and the data processing speed in the entire system can be a communication speed of the Internet. The data sampling speed is on the order of 1 to 1000 mS and it is possible to carry out data communication of a plurality of polishing condition parameters. In this case, the intermediate processing apparatus 770 creates a data set to be sent to the data processing apparatus 768. Details of the data set will be described later. The data processing apparatus 768 that receives the data set performs data processing, calculates changed values of polishing condition parameters up to the position of an end point, creates a polishing process plan and returns them to the intermediate processing apparatus 770 via the network 766. The intermediate processing apparatus 770 sends the changed values of the polishing condition parameters and necessary control signals to the substrate processing apparatus 764.

Case (2): Communication of sensor signals between the substrate processing apparatus and the intermediate processing apparatus and between the intermediate processing apparatus and the data processing apparatus, and communication between the state management devices correspond to high-speed communication. High-speed communication allows communication at a communication speed of 1 to 1000 Gbps. Data, data sets, commands and control signals or the like can be communicated in high-speed communication. In this case, the intermediate processing apparatus 770 creates a data set and transmits the data set to the data processing apparatus 768. The intermediate processing apparatus 770 extracts data necessary for processing in the data processing apparatus 768, processes the data and creates a data set. For example, a plurality of sensor signals for end point detection are extracted to create a data set.

The intermediate processing apparatus 770 sends the data set created to the data processing apparatus 768 through high-speed communication. The data processing apparatus 768 calculates parameter changed values up to the polishing end point and creates a process plan based on the data set. The data processing apparatus 768 receives data sets from a plurality of substrate processing apparatuses 764, calculates parameter updated values and creates a process plan in the next step for the respective apparatuses and transmits the updated data sets to the intermediate processing apparatus 770. The intermediate processing apparatus 770 converts the updated data sets to control signals based on the updated data sets and transmits the control signals to the control section 65 of the substrate processing apparatus 764 through high-speed communication. The substrate processing apparatus 764 applies polishing according to the updated control signals and performs accurate end point detection.

Case (3): The intermediate processing apparatus 770 receives a plurality of sensor signals of the substrate processing apparatus 764 through high-speed communication. In high-speed optical communication, communication at a communication speed of 1 to 1000 Gbps is possible. In this case, on-line polishing condition control is possible through high-speed communication between the substrate processing apparatus 764, the sensor, the control section 65 and the intermediate processing apparatus 770. Data is processed in order of, for example, reception of a sensor signal (from the substrate processing apparatus 764 to the intermediate processing apparatus 766), creation of a data set, data processing, calculation of a parameter updated value, transmission of updated parameter signals, polishing control by the control section 65 and detection of the updated end point.

In this case, the intermediate processing apparatus 770 performs high-speed end point detection control through high-speed communication. The intermediate processing apparatus 770 periodically transmits a status signal to the data processing apparatus 768, and the data processing apparatus 768 monitors a control state. The data processing apparatus 768 receives status signals from a plurality of substrate processing apparatuses 764 and creates a plan in the next process step for the respective substrate processing apparatuses 764. The data processing apparatus 768 sends a plan signal of the process step based on the plan to the respective substrate processing apparatuses 764 and the respective substrate processing apparatuses 764 prepare for the polishing process and execute the polishing process independently of each other. In this way, the intermediate processing apparatus 770 performs high-speed end point detection control through high-speed communication and the data processing apparatus 768 manages states of the plurality of substrate processing apparatuses 764.

Next, examples of data sets will be described. A sensor signal and necessary control parameters can be formed into a data set. The data set can include a pressure of the top ring 31A on the semiconductor wafer 16, a current of the swing shaft motor 14, a motor current of the polishing table 30A, a measured signal of an optical sensor, a measured signal of an eddy current sensor, the position of the top ring 31A on the polishing pad 10, flow rates/types of slurry and a chemical liquid, correlation calculation data thereof or the like.

The above-described types of data sets can be transmitted using a transmission system whereby one-dimensional data is transmitted in parallel or a transmission system whereby one-dimensional data is transmitted sequentially. As for the data set, the above-described one-dimensional data can be processed into two-dimensional data to form a data set. For example, when it is assumed that the X-axis shows time and the Y-axis shows many data strings, a plurality of pieces of parameter data at the same time are processed into one data set. The two-dimensional data can be handled as something like two-dimensional image data. The merit is that a two-dimensional data transfer allows data associated with time to be exchanged and handled with a smaller amount of wiring than a one-dimensional data transfer. More specifically, when one-dimensional data is formed into one signal, one line as is, many wires are necessary, whereas in the case of a two-dimensional data transfer, a plurality of signals can be transmitted with one line. Furthermore, when a plurality of lines are used, the interface with the data processing apparatus 768 that receives transmitted data becomes complicated and data reassembly in the data processing apparatus 768 becomes complicated.

When such a time-associated two-dimensional data set exists, comparisons with a data set during polishing under a standard polishing condition performed previously and a data set under a standard polishing condition currently being performed become easier. Furthermore, mutual differences between two-dimensional pieces of data can be easily known through difference processing or the like. It is also easy to extract differences and detect a sensor or a parameter signal in which an abnormality occurs. Furthermore, a data set corresponding to a previous standard polishing condition is compared with a data set currently being polished, and it is easier to detect an abnormality by extracting parameter signals in a region where a difference from surroundings differs.

Figure 46:
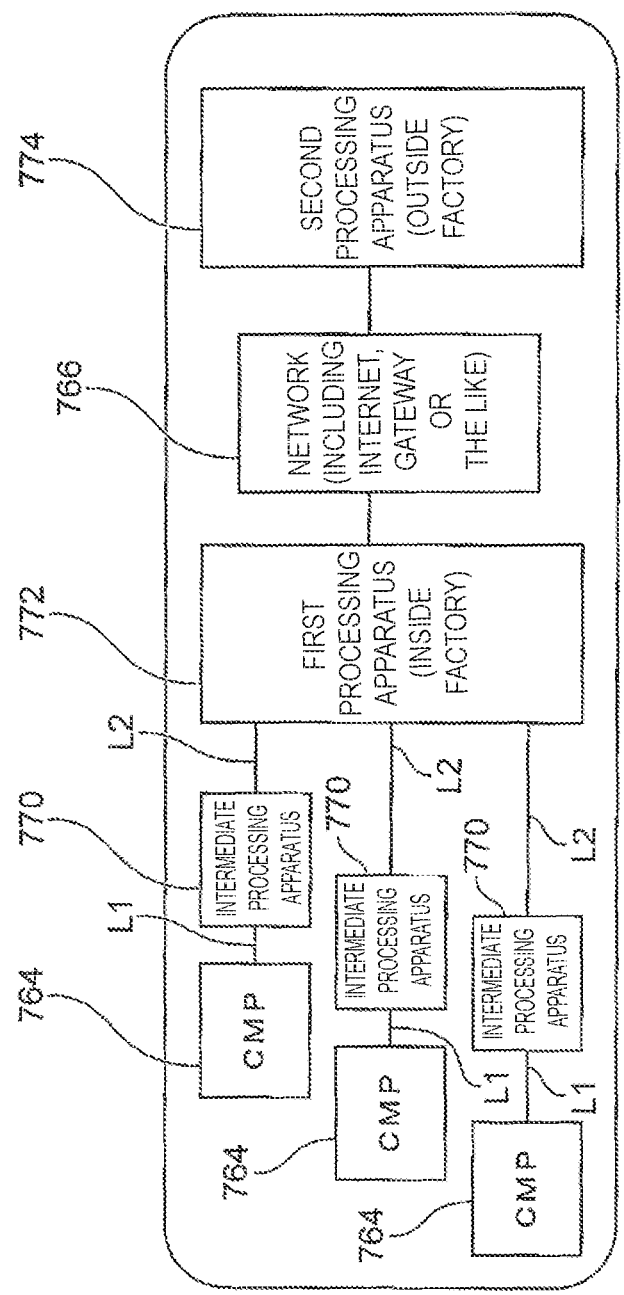
FIG. 46 is a diagram illustrating a modification of the embodiment in FIG. 44.

Next, another embodiment will be described using FIG. 46. FIG. 46 is a diagram illustrating a modification of the embodiment in FIG. 44. The present embodiment is an example of a semiconductor factory. A plurality of substrate processing apparatuses 764 are installed in a factory. Regarding the substrate processing apparatus 764 that performs polishing and end point detection, the apparatus can include the same devices and functions as those shown in FIGS. 43 to 45. For example, in end point detection using many sensors (10 or more sensors and the number of types≥3), the amount of data of sensor signals becomes enormous. In this case, if communication is carried out using the Internet to create a data set, analyze data and update polishing condition parameters, communication takes much time. Therefore, communication through a communication channel L1 that connects the substrate processing apparatus 764 and the intermediate processing apparatus 770 is carried out using a high-speed communication device that carries out high-speed optical communication or high-speed radio communication or the like. The intermediate processing apparatus 770 is located near the sensor or the substrate processing apparatus 764 and processes signals from the sensor or the controller of the sensor at high speed. The intermediate processing apparatus 770 transmits signals to update feedback or feedforward parameters reflecting the processing result to the substrate processing apparatus 764 at high speed. The substrate processing apparatus 764 receives parameter update signals, performs polishing processing and detects an end point.

When a plurality of substrate processing apparatuses 764 exist as shown in FIG. 46, there may be a first processing apparatus 772 in the factory, which receives a signal from each substrate processing apparatus 764 and performs processing. The first processing apparatus 772 includes a medium-sized memory and a calculation function, and can perform high-speed calculation. The first processing apparatus 772 includes an automatic learning function, performs automatic learning while storing data, and updates parameters for improving uniformity in the amount of processing and improving end point detection accuracy. It is possible to continue to update parameters to approximate parameters to optimum values through automatic learning. In this case, high-speed communication is necessary when on-line processing is performed through Insitu and the communication channel L1/communication channel L2 is, for example, a communication channel for high-speed optical communication. In this case, the intermediate processing apparatus 770 can create a data set and the first processing apparatus 772 can analyze data or update parameters. The first processing apparatus 772 sends signals for reflecting updated parameter values in the respective substrate processing apparatuses 764 to the substrate processing apparatuses 764 through the communication channel L1/communication channel L2.

In the case where not so high speed is required as in the case of a inline monitoring whereby uniformity measurement or the like is performed while a polishing target moves between the polishing sections, the communication channel L2 may be just a relatively low-speed communication channel such as a communication channel for Internet communication. The intermediate processing apparatus 770 processes initial polishing data and sends the data set generated to the first processing apparatus 772 via the Internet. The first processing apparatus 772 obtains analysis values and parameter updated values and creates an updated data set. The first processing apparatus 772 sends the data set to the intermediate processing apparatus 770. When the next polishing section performs principal polishing, the updated parameter values reflected from the updated data set in the intermediate processing apparatus 770 are sent to the substrate processing apparatus 764 and polishing is performed based on the updated parameter values.

When information is exchanged with the outside of the factory, the first processing apparatus 772 exchanges data relating to the information with the second processing apparatus 774 outside the factory or a management device such as a personal computer using the network 766. In this case, when carrying out communication with a second processing apparatus 774 outside the factory, data relating to the information may be encrypted to secure security. An example of the data relating to the information is data indicating information relating to a status of the substrate processing apparatus 764. By exchanging information relating to states of consumable items of the substrate processing apparatus 764, an outside second processing apparatus 774 calculates timing of replacement thereof and can thereby inform customers of the replacement timing or display the replacement timing on the substrate processing apparatus 764.

Figure 47:
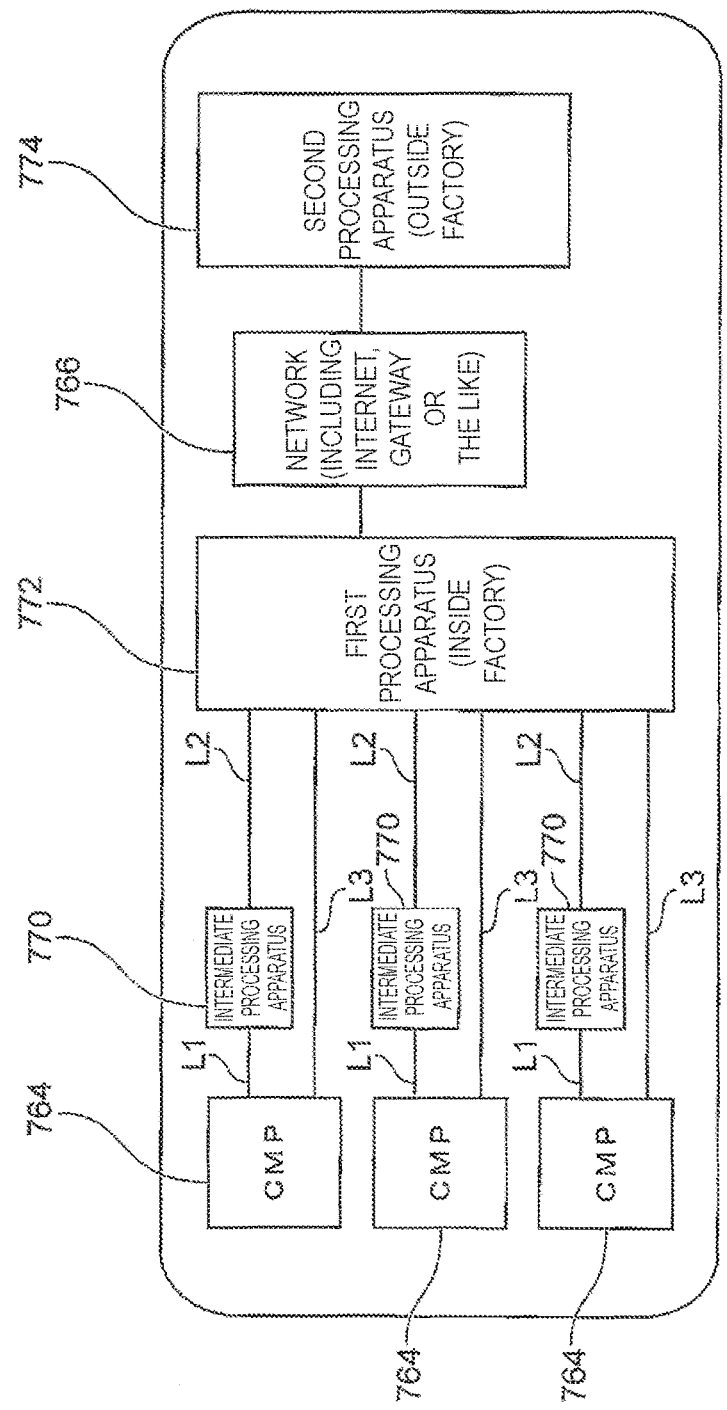
FIG. 47 is a diagram illustrating a modification of the embodiment in FIG. 44.

Next, another embodiment will be described using FIG. 47. FIG. 47 is a diagram illustrating a modification of the embodiment in FIG. 44. The present embodiment is an example of a semiconductor factory. A plurality of substrate processing apparatuses 764 are located in the factory.

Regarding the substrate processing apparatus 764 that performs polishing and end point detection, the apparatus can include the same devices and functions as those shown in FIGS. 43 to 45. The present embodiment is different from the embodiment in FIG. 46 in that a communication channel L3 is provided, which is connected from the substrate processing apparatus 764 to the first processing apparatus 772 without going through the intermediate processing apparatus 770. A feature of the present embodiment is to utilize communication using the high-speed communication channel L1 and communication channel L2 for communication of data that forms a data set created from the data from a group of many sensors, the data set, creation of which requires high-speed communication. Other communication of control parameters not requiring high-speed communication is carried out with the substrate processing apparatus 764 connected to the first processing apparatus 772 via the communication channel L3. For example, the transfer system, the cleaning system and the drying system can use a parameter group not requiring high-speed control, and so communication with these systems is carried out with the substrate processing apparatus 764 connected to the first processing apparatus 772 via the communication channel L3. It may be possible to variably select a parameter signal or a sensor signal necessary for high-speed communication, high-speed analysis or a high-speed communication data set and transmit/receive the signal or the like using the communication channel L1 and the communication channel L2 according to the operation situation of the substrate processing apparatus 764.

The present embodiment sends data from the substrate processing apparatus 764 to the first processing apparatus 772 located in the factory using the communication channel L2 and the communication channel L3, and performs data analysis, automatic learning, creation of parameter updated values or the like. The first processing apparatus 772 sends control parameters of the apparatus in the next step to the respective substrate processing apparatuses 764. According to the present embodiment, when there are a plurality of substrate processing apparatuses 764 in the factory, the first processing apparatus 772 receives data from the plurality of substrate processing apparatuses 764, processes the data, and can send processing results to the respective substrate processing apparatuses 764 via the intermediate processing apparatus 770.

As another embodiment obtained by modifying the present embodiment, an embodiment without the communication channel L2 is also possible. It is possible to send data relating to a status of a high-speed processing state processed by the intermediate processing apparatus 770 without using the communication channel L2 together with the data relating to the other apparatus state status to the first processing apparatus 772 via the communication channel L3. In this case, the communication channel wiring relating to the communication channel L2 can be reduced. That is, the high-speed communication channel and the high-speed intermediate processing apparatus 770 perform data processing, automatic learning and control parameter updating on only parts requiring high-speed data processing and high-speed control, and sends the processing result to the substrate processing apparatus 764. A status signal relating to high-speed data processing and high-speed control together with other status signals is sent to the first processing apparatus 772 via the communication channel L3, the first processing apparatus 772 performs data processing, automatic learning and control parameter updating and signals including the processing result can be sent to the respective substrate processing apparatuses 764. In the embodiment shown in FIG. 47 and another embodiment obtained by modifying the embodiment, one first processing apparatus 772 can perform such processing for the plurality of substrate processing apparatuses 764. In these embodiments, communication with the outside of the factory is similar to the embodiment in FIG. 46.

Next, a data set, automatic learning and examples of related calculations in the data processing and the control mode shown in aforementioned FIG. 43 to FIG. 47 will be described. An example of the data set will be described first. Regarding the data set, it is necessary to create a data set corresponding to processing in order to update effective control parameters along with the progress of processing such as polishing. For example, to detect an end point, it is preferable to use a data set that selects a sensor signal that effectively picks up features of a semiconductor film. Using a polishing recipe, a recipe (polishing condition) corresponding to the film structure formed on a wafer is selected. At that time, the film can be classified according to the following features regarding the film structure. (1) An oxide film or insulating film is thinned. (2) A metal film or conductive film is thinned. (3) Polishing is performed up to the boundary surface with the lower layer (boundary surface between the conductive layer and the insulating layer or the like). (4) The film formation part is polished up to the pattern boundary (polishing of unnecessary parts after film formation of the wiring material and insulating material or the like). In correspondence with this classification, the data set may be created by fetching data from all types of sensors or by selecting data from among types of sensors suited to the film regarding detection of the polishing state of the film.

Examples of the data set created by fetching data from all types of sensors include the following: the data set is created in a set of data such as torque data in TCM (motor current or the like), torque data of an arm with a top ring (swing motor current or the like), optical sensor (SOPM or the like) data, eddy current sensor data, and data obtained by calculating the data (differential data or the like), correlation data (difference data between high data and low data of absolute values of the differentiated data or the like).

Regarding detection of the polishing state of the film, examples of the data set created by selecting data from types of sensors suited to the film include the following: (1) when an oxide film or insulating film is thinned, the calculated data value is high for an optical sensor signal with high sensitivity to a film thickness change. In this case, by evaluating a plurality of pieces of data, for example, by summing up polishing times, detection of achievement of a target amount of polishing and detection of an end point are performed. For example, if measured values using TCM and arm torque data of the arm with a top ring are stable, the polishing at the same polishing rate is considered to have been achieved. End point detection can be performed accurately through time counting using a time point at which a film thickness reaches a certain thickness as a reference according to a variation in the film thickness based on the optical sensor data.

(2) When a metal film or a conductive film is thinned, calculation data of the eddy current sensor and the optical sensor highly sensitive to a change in film thickness of the conductive film is used as a reference for determining that the film thickness reaches a certain thickness in order to make the conductive film or the metal film thinner. When the measured value using TCM and torque data of the arm with a top ring are stable as in the case of (1), the film thickness approximate to the target value with a higher calculation data value is selected as a master and the other is selected as a slave. An end point is detected according to time counting using a time point at which the film thickness reaches a certain thickness as a reference based on a change in film thickness using data of the sensor selected as the master. The detection accuracy is increased by confirming no deviation (confirming that the target region has been substantially reached) according to the data of the sensor selected as the slave.

It is also possible to perform end point detection by setting the target values by providing a priority ratio coefficient (weighting factor) for target values of both the sensor as the master and the sensor as the slave and defining an influence ratio between the sensor as the master and the sensor as the slave as the method of use of the data of the sensor selected as the slave. In this case, by using data as learning data every time the process is repeated and updating the determination function by learning in the determination function (change of the priority ratio coefficient or the like), it is possible to improve the method so as to provide more accurate end point detection.

(3) When polishing is performed up to the boundary surface with the lower layer (excessive polishing), changes occur in all of torque data in TCM, torque data of the arm with a top ring, data of the optical sensor and data of the eddy current type sensor. In this case, when the torque data in TCM and torque data of the arm with a top ring are observed with calculation data, a drastic change (pulse-like change) occurs in the vicinity of the boundary surface. Therefore, whether or not the polishing region in the vicinity of the boundary surface is approached is determined based on the data of the optical sensor and/or the data of the eddy current type sensor. Next, it is possible to reset a lapse of a predetermined time as an end point detection time using a time point at which a change in the torque data in TCM and/or the torque data of the arm with a top ring is confirmed. The reason that excessive polishing is performed in this way is as follows. When polishing is performed up to the boundary surface, if there is any unpolished part, for example, if an oxide film remains in a longitudinal wiring in which metal is embedded, for example, at the bottom of a via or plug, the resistance value of the longitudinal wiring increases, causing a circuit operation defect. Therefore, excessive polishing is performed so as to eliminate any unpolished part. Before polishing, the oxide film on the boundary surface normally includes small projections and depressions, and is undulated. Therefore, it is necessary to perform excessive polishing and remove the oxide film from the boundary surface by taking into account that there are small projections and depressions. Another reason for performing excessive polishing is that it is not possible to suddenly stop the polishing apparatus when it reaches the boundary surface. Thus, excessive polishing is performed and the polishing apparatus is stopped assuming a time point at which the aforementioned predetermined time elapses as an end point detection time.

The resetting refers to, for example, the following processing method. It is possible to perform polishing by setting a threshold of an amount of the signal waveform change of torque data of the arm with a top ring as a temporary reference at the beginning of polishing, setting as a count of the remaining polishing time, a predetermined time from a time point at which waveform detection is actually performed as a reference, setting the count as an updated value of the end point detection time. In this case, processing can be performed in the same way as in (2), assuming the torque data in TCM and/or the torque data of the arm with a top ring with higher sensitivity as a master, and that with lower sensitivity as a slave. In order to increase the resetting accuracy, it is possible to set polishing parameters taking advantage of learning or update the set polishing parameters. Furthermore, a plurality of sensors can be used to increase the resetting accuracy. As for learning, automatic learning is possible, but composite type learning including partially manual learning is also possible.

(4) When the film formation part is polished up to the pattern boundary (polishing of the unnecessary part after film formation of the wiring material or insulating material or the like), the process is similar to that in (3). However, since the metal film and the insulating film are present in a mixed state in the film formation part, a fluctuation in waveform on the boundary and thereafter is greater than others under the influences of the pattern and material of the boundary. It is difficult to detect an end point using only the eddy current sensor or optical sensor. In such a case, a data set created from data of a plurality of sensors, improved accuracy by a learning function using the data set and updating of an end point detection count according to a priority ratio coefficient become effective. When only one or two sensor signals are used, monitoring with high accuracy in the vicinity of the end point is difficult, and so end point detection using a plurality of types (three or more) of sensor data and a data set created from the data becomes very effective. When such a large amount of data is used, learning improves the efficiency of the accuracy improving operation.

In the case (4), a data set is created using sensor signals associated with detection of all end points, but it is also possible to select effective sensor data when the data set is created and create the data set. It is particularly effective in the cases of a simple film structure in (1), (2) and (3).

The embodiments of the present invention are as follows:

A first embodiment is a polishing system for polishing between a polishing pad and a polishing object disposed opposed to the polishing pad, the polishing system including:

a polishing apparatus including a polishing table for holding the polishing pad, a holding section for holding the polishing object, a swing arm for holding the holding section, an arm drive section for swinging the swing arm around a rotation center of the swing arm, an arm torque detection section that directly or indirectly detects arm torque applied to the swing arm around the rotation center, and a control section that controls polishing; and an end point detection section that detects a polishing end point indicating the end of polishing based on the arm torque detected by the arm torque detection section.

A second embodiment is the polishing system shown in the first embodiment, in which the holding section, the swing arm, the arm drive section and the torque detection section form a set and the set is provided in plurality.

A third embodiment is the polishing system shown in the first or second embodiment, in which the polishing apparatus includes a table drive section that drives to rotate the polishing table and a table torque detection section that detects table torque applied to the polishing table, and the end point detection section detects a polishing end point indicating the end of polishing based on the arm torque detected by the arm torque detection section and the table torque detected by the table torque detection section.

A fourth embodiment is the polishing system shown in any one of the first to third embodiments, in which a ratio of a weight of the holding section to a weight of the swing arm is 0.3 to 1.5.

A fifth embodiment is the polishing system shown in any one of the first to fourth embodiments, in which at a connection part of the swing arm to the arm drive section, the arm torque detection section detects the arm torque applied to the swing arm.

A sixth embodiment is the polishing system shown in any one of the first to fifth embodiments, in which the arm drive section is a rotation motor that causes the swing arm to rotate, and the arm torque detection section detects the arm torque applied to the swing arm from a current value of the rotation motor.

A seventh embodiment is the polishing system shown in any one of the first to fifth embodiments, in which the arm drive section is a rotation motor that causes the swing arm to rotate, the arm torque detection section detects a current value of the rotation motor, and the end point detection section detects a polishing end point indicating the end of polishing based on a differential value of the current value of the rotation motor.

An eighth embodiment is the polishing system shown in any one of the first to fourth embodiments, in which the swing arm includes a plurality of arms and the arm torque detection section detects the arm torque applied to the swing arm at a joint between the plurality of arms.

A ninth embodiment is the polishing system shown in any one of the first to eighth embodiments, in which the polishing apparatus includes a carousel rotatable around a rotation shaft, and the arm drive section is attached to the carousel.

A tenth embodiment is the polishing system shown in any one of the first to eighth embodiments, in which the polishing apparatus includes:

a support frame;

a track attached to the support frame to define a transfer path of the arm drive section; and a carriage that transfers the arm drive section along the path defined by the track, the carriage being connected to the track and movable along the track.

An eleventh embodiment is the polishing system shown in any one of the first to tenth embodiments, in which the polishing apparatus includes an optical sensor that exposes the polishing object to light and measures intensity of reflected light from the polishing object, and the end point detection section detects a polishing end point indicating the end of polishing based on the arm torque detected by the arm torque detection section and the intensity of the reflected light from the polishing object measured by the optical sensor.

A twelfth embodiment is the polishing system shown in the eleventh embodiment, in which the polishing apparatus includes a window incorporated at a position in the polishing table opposable to the polishing object during polishing, and the optical sensor is disposed below the window.

A thirteenth embodiment is the polishing system shown in the twelfth embodiment, in which the polishing table includes an opening at a position in the polishing table opposable to the polishing object during polishing, the optical sensor is disposed below the window, and the optical sensor includes a fluid supply section that supplies a cleaning fluid into the opening.

A fourteenth embodiment is the polishing system shown in any one of the first to thirteenth embodiments, in which the polishing apparatus includes an eddy current type sensor that generates a magnetic field in the polishing object and detects intensity of the generated magnetic field, and the end point detection section detects a polishing end point indicating the end of polishing based on the arm torque detected by the arm torque detection section and the intensity of the magnetic field measured by the eddy current type sensor.

A fifteenth embodiment is the polishing system shown in any one of the first to fourteenth embodiments, in which the polishing apparatus includes:

a polishing section that polishes the polishing object;

a cleaning section that cleans and dries the polishing object;

a barrier that separates the polishing section from the cleaning section;

a transfer mechanism that transfers the polishing object after polishing from the polishing section to the cleaning section via the opening of the barrier; and a housing that includes a side wall and houses the polishing section, the cleaning section and the transfer mechanism therein, the cleaning section includes cleaning means for cleaning the polishing object after polishing with a cleaning liquid, drying means for drying the polishing object after cleaning and transfer means capable of transferring the polishing object between the cleaning means and the drying means horizontally and in a freely ascendable/descendable manner, and the polishing section includes the polishing table, the holding section, the swing arm and the arm drive section.

A sixteenth embodiment is a polishing method for polishing between a polishing pad and a polishing object disposed opposed to the polishing pad, the method including:

holding the polishing pad to a polishing table;

holding by a swing arm, a holding section that holds the polishing object;

swinging by an arm drive section, the swing arm around the rotation center of the swing arm;

directly or indirectly detecting arm torque applied to the swing arm around the rotation center; and detecting a polishing end point indicating the end of polishing based on the detected arm torque.

A seventeenth embodiment is the polishing method shown in the sixteenth embodiment, in which the swing arm includes a plurality of arms and the arm torque applied to the swing arm at a joint between the plurality of arms is detected.

An eighteenth embodiment is the polishing system shown in any one of the first to fifteenth embodiments, further including:

a unit controller that controls the polishing section;

first communication means for connecting the polishing section and the unit controller; and second communication means for connecting the unit controller and the control section.

A nineteenth embodiment is the polishing system shown in any one of the first to fifteenth embodiments, in which the polishing apparatus acquires a signal relating to polishing, the polishing system includes a data processing apparatus connected to the polishing apparatus via communication means, and the data processing apparatus updates parameters relating to polishing processing based on the signal acquired by the polishing apparatus.

A twentieth embodiment is the polishing system shown in the nineteenth embodiment, in which the signal is acquired by one type of sensor or a plurality of different types of sensors.

A twenty-first embodiment is the polishing system shown in any one of the first to fifteenth embodiments, in which the polishing apparatus acquires a signal relating to polishing, the polishing system includes an intermediate processing apparatus and a data processing apparatus, the polishing apparatus and the intermediate processing apparatus are connected via first communication means and the intermediate processing apparatus and the data processing apparatus are connected via second communication means, the intermediate processing apparatus creates a data set relating to polishing processing based on the signal acquired by the polishing apparatus, the data processing apparatus monitors a state of polishing processing of the polishing apparatus based on the data set, the intermediate processing apparatus or the data processing apparatus includes the end point detection section and detects a polishing end point indicating the end of polishing based on the data set.

A twenty-second embodiment is the polishing system shown in any one of the first to fifteenth embodiments, in which the polishing apparatus acquires a signal relating to polishing, the polishing system includes an intermediate processing apparatus, a first data processing apparatus and a second data processing apparatus, the polishing apparatus and the intermediate processing apparatus are connected via first communication means, the intermediate processing apparatus and the first data processing apparatus are connected via second communication means, the first data processing apparatus and the second data processing apparatus are connected via third communication means, the first communication means can carry out communication faster than the second and third communication means, the intermediate processing apparatus creates a data set relating to polishing processing based on the signal acquired by the polishing apparatus, the first or second data processing apparatus monitors a state of polishing processing by the polishing apparatus based on the data set, and the intermediate processing apparatus includes the end point detection section and detects a polishing end point indicating the end of polishing based on the data set.

A twenty-third embodiment is the polishing system shown in the twenty-first or twenty-second embodiment, in which the second communication means for transmitting the data set transmits one-dimensional data in parallel or transmits one-dimensional data sequentially.

A twenty-fourth embodiment is the polishing system shown in the twenty-second embodiment, in which the third communication means for transmitting the data set transmits one-dimensional data in parallel or transmits one-dimensional data sequentially.

A twenty-fifth embodiment is the polishing system shown in the twenty-first or twenty-second embodiment, in which one-dimensional data is processed into two-dimensional data to form the data set.

A twenty-sixth embodiment is the polishing system shown in any one of the twenty-first to twenty-fifth embodiments, in which the signal is acquired by one type of sensor or a plurality of different types of sensors.

A twenty-seventh embodiment is the polishing system shown in the twenty-sixth embodiment, in which the different types of sensors are (1) a sensor for acquiring a measured signal relating to a torque fluctuation of a swing arm for holding a holding section for holding a polishing object, and/or (2) an SOPM (optical sensor) for measuring a film thickness of the polishing object, and/or (3) an eddy current sensor for measuring a film thickness of the polishing object, and/or (4) a sensor for acquiring a measured signal relating to a motor current fluctuation of a polishing table rotation motor.

A twenty-eighth embodiment is the polishing system shown in any one of the twenty-first to twenty-sixth embodiments, in which the data set is a data set formed of the sensor signal outputted from the sensor and a necessary control parameter, and the data set is a pressure of the top ring on a semiconductor wafer or a current of the swing shaft motor or a motor current of the polishing table or a measured signal of the optical sensor or a measured signal of an eddy current sensor or a position of the top ring on the polishing pad or a flow rate/type of slurry and a chemical liquid or correlation calculation data thereof.

A twenty-ninth embodiment is the polishing system shown in any one of the twenty-first to twenty-eighth embodiments, in which the signal having a large fluctuation in the signal value is extracted to update polishing parameters.

A thirtieth embodiment is the polishing system shown in the twenty-ninth embodiment, in which priority ratio coefficients are provided for both target values of a sensor as a master and a sensor as a slave to thereby define an influence ratio between the sensor as the master and the sensor as the slave, the signal having the large fluctuation in the signal value is extracted, and the priority ratio coefficients are changed to update the polishing parameters.

A thirty-first embodiment is the polishing system shown in any one of the first to fifteenth embodiments, in which the polishing apparatus acquires a signal relating to polishing, the polishing system includes an intermediate processing apparatus and a data processing apparatus, the polishing apparatus and the intermediate processing apparatus are connected via first communication means, and the polishing apparatus and the data processing apparatus are connected via second communication means, the first communication means can carry out communication faster than the second communication means, the intermediate processing apparatus creates a data set relating to polishing processing based on the signal acquired by the polishing apparatus, the data processing apparatus monitors a state of the polishing apparatus, and the intermediate processing apparatus includes the end point detection section and detects a polishing end point indicating the end of polishing based on the data set.

A thirty-second embodiment is the polishing system shown in the thirty-first embodiment, in which the data processing apparatus monitors the detection of the polishing end point by the intermediate processing apparatus.

A thirty-third embodiment is the polishing system shown in the thirty-first or thirty-second embodiment, further including a plurality of types of end point detection sensors for detecting a polishing end point indicating the end of polishing, in which the intermediate processing apparatus updates polishing parameters by extracting signal values whose fluctuations are greater than other signal values among the plurality of signal values outputted from the plurality of types of end point detection sensors.

A thirty-fourth embodiment is the polishing system shown in any one of the first to fifteenth embodiments, in which the polishing apparatus includes the end point detection section.

The embodiments of the present invention have been described so far. The above-described embodiments of the invention are intended to facilitate an understanding of the present invention and not to limit the present invention. The present invention can be modified or improved without departing from the spirit and scope of the present invention and the present invention naturally comprises equivalents thereof. Furthermore, any combination or omission of the components described in the scope of claims and the specification is possible within the scope wherein at least some of the above-described problems can be solved or the scope wherein at least some of the effects can be provided.

This application claims priority under the Paris Convention to Japanese Patent Application No. 2016-193641 filed on Sep. 30, 2016, Japanese Patent Application No. 2017-74157 filed on Apr. 4, 2017 and Japanese Patent Application No. 2017-91152 filed on May 1, 2017. The entire disclosure of Japanese Patent Application Laid-Open Nos. 2004-249458 and 2001-252866, U.S. Pat. No. 6,293,845 and U.S. Patent Application Publication No. 2014/0020830, including specification, claims, drawings and summary is incorporated herein by reference in its entirety.

REFERENCE SIGNS LIST

3 . . . Polishing unit
10 . . . Polishing pad
14 . . . Swing shaft motor
16 . . . Semiconductor wafer
24 . . . Top ring body
26 . . . Arm torque detection section
28 . . . End point detection section
30A . . . Polishing table
31A . . . Top ring
63 . . . Polishing section
64 . . . Cleaning section
65 . . . Control section
101 . . . Polishing surface
108 . . . Turning shaft
110 . . . Swing arm
111 . . . Top ring shaft
112 . . . Rotary cylinder
117 . . . Swing arm shaft

What is claimed is:

1. A polishing system for polishing between a polishing pad and a polishing object disposed opposed to the polishing pad, the polishing system comprising:
a polishing apparatus comprising a polishing table for holding the polishing pad, a holding section for holding the polishing object, a swing arm for holding the holding section, an arm drive section for swinging the swing arm around a rotation center of the swing arm, an arm torque detection section that detects arm torque applied to the swing arm around the rotation center, and a control section that controls polishing; and
an end point detection section that detects a polishing end point indicating the end of polishing based on the arm torque detected by the arm torque detection section.

2. The polishing system according to claim 1, wherein the holding section, the swing arm, the arm drive section and the torque detection section form a set and the set is provided in plurality.

3. The polishing system according to claim 1, wherein the polishing apparatus comprises a table drive section that drives to rotate the polishing table and
a table torque detection section that detects table torque applied to the polishing table, and
the end point detection section detects a polishing end point indicating the end of polishing based on the arm torque detected by the arm torque detection section and the table torque detected by the table torque detection section.

4. The polishing system according to claim 1, wherein a ratio of a weight of the holding section to a weight of the swing arm is 0.3 to 1.5.

5. The polishing system according to claim 1, wherein at a connection part of the swing arm to the arm drive section, the arm torque detection section detects the arm torque applied to the swing arm.

6. The polishing system according to claim 1, wherein the arm drive section is a rotation motor that causes the swing arm to rotate, and
the arm torque detection section detects the arm torque applied to the swing arm from a current value of the rotation motor.

7. The polishing system according to claim 1, wherein the arm drive section is a rotation motor that causes the swing arm to rotate,
the arm torque detection section detects a current value of the rotation motor, and
the end point detection section detects a polishing end point indicating the end of polishing based on the current value of the rotation motor.

8. The polishing system according to claim 1, wherein the swing arm comprises a plurality of arms and the arm torque detection section detects the arm torque applied to the swing arm at a joint between the plurality of arms.

9. The polishing system according to claim 1, wherein the polishing apparatus comprises a carousel rotatable around a rotation shaft, and the arm drive section is attached to the carousel.

10. The polishing system according to claim 1, wherein the polishing apparatus comprises:
a support frame;
a track attached to the support frame to define a transfer path of the arm drive section; and
a carriage that transfers the arm drive section along the path defined by the track, the carriage being connected to the track and movable along the track.

11. The polishing system according to claim 1, wherein the polishing apparatus comprises an optical sensor that exposes the polishing object to light and measures intensity of reflected light from the polishing object, and
the end point detection section detects a polishing end point indicating the end of polishing based on the arm torque detected by the arm torque detection section and the intensity of the reflected light from the polishing object measured by the optical sensor.

12. The polishing system according to claim 11, wherein the polishing apparatus comprises
a window incorporated at a position in the polishing table opposable to the polishing object during polishing, and
the optical sensor is disposed below the window.

13. The polishing system according to claim 12, wherein the polishing table comprises an opening at a position in the polishing table opposable to the polishing object during polishing,
the optical sensor is disposed below the window, and
the optical sensor comprises a fluid supply section that supplies a cleaning fluid into the opening.

14. The polishing system according to claim 1, wherein the polishing apparatus comprises an eddy current type sensor that generates a magnetic field in the polishing object and detects intensity of the generated magnetic field, and the end point detection section detects a polishing end point indicating the end of polishing based on the arm torque detected by the arm torque detection section and the intensity of the magnetic field measured by the eddy current type sensor.

15. The polishing system according to claim 1, wherein the polishing apparatus comprises:
a polishing section that polishes the polishing object;
a cleaning section that cleans and dries the polishing object;
a barrier that separates the polishing section from the cleaning section and has an opening;
a transfer mechanism that transfers the polishing object after polishing from the polishing section to the cleaning section via the opening of the barrier; and
a housing that comprises a side wall and houses the polishing section, the cleaning section and the transfer mechanism therein,
the cleaning section comprises cleaning means for cleaning the polishing object after polishing with a cleaning liquid, drying means for drying the polishing object after cleaning and transfer means capable of transferring the polishing object between the cleaning means and the drying means horizontally and in a freely ascendable/descendable manner, and
the polishing section comprises the polishing table, the holding section, the swing arm and the arm drive section.

16. The polishing system according to claim 15, further comprising:
a unit controller that controls the polishing section;
first communication means for connecting the polishing section and the unit controller; and
second communication means for connecting the unit controller and the control section.

17. The polishing system according to claim 1, wherein the polishing apparatus acquires a signal relating to polishing,
the polishing system comprises a data processing apparatus connected to the polishing apparatus via communication means, and the data processing apparatus updates parameters relating to polishing processing based on the signal acquired by the polishing apparatus.

18. The polishing system according to claim 17, wherein the signal is acquired by one type of sensor or a plurality of different types of sensors.

19. The polishing system according to claim 1, wherein the polishing apparatus acquires a signal relating to polishing,
the polishing system comprises an intermediate processing apparatus and a data processing apparatus,
the polishing apparatus and the intermediate processing apparatus are connected via first communication means and the intermediate processing apparatus and the data processing apparatus are connected via second communication means,
the intermediate processing apparatus creates a data set relating to polishing processing based on the signal acquired by the polishing apparatus, the data processing apparatus monitors a state of polishing processing of the polishing apparatus based on the data set, the intermediate processing apparatus or the data processing apparatus comprises the end point detection section and detects a polishing end point indicating the end of polishing based on the data set.

20. The polishing system according to claim 1, wherein the polishing apparatus acquires a signal relating to polishing,
the polishing system comprises an intermediate processing apparatus, a first data processing apparatus and a second data processing apparatus,
the polishing apparatus and the intermediate processing apparatus are connected via first communication means, the intermediate processing apparatus and the first data processing apparatus are connected via second communication means, and the first data processing apparatus and the second data processing apparatus are connected via third communication means,
the first communication means can carry out communication faster than the second and third communication means, the intermediate processing apparatus creates a data set relating to polishing processing based on the signal acquired by the polishing apparatus, the first or second data processing apparatus monitors a state of polishing processing by the polishing apparatus based on the data set, and the intermediate processing apparatus comprises the end point detection section and detects a polishing end point indicating the end of polishing based on the data set.

21. The polishing system according to claim 19, wherein the second communication means for transmitting the data set transmits one-dimensional data in parallel or transmits one-dimensional data sequentially.

22. The polishing system according to claim 20, wherein the third communication means for transmitting the data set transmits one-dimensional data in parallel or transmits one-dimensional data sequentially.

23. The polishing system according to claim 19, wherein one-dimensional data is processed into two-dimensional data to form the data set.

24. The polishing system according to claim 19, wherein the signal is acquired by one type of sensor or a plurality of different types of sensors.

25. The polishing system according to claim 24, wherein the different types of sensors are (1) a sensor for acquiring a measured signal relating to a torque fluctuation of a swing arm for holding a holding section for holding a polishing object, and/or (2) an SOPM (optical sensor) for measuring a film thickness of the polishing object, and/or (3) an eddy current sensor for measuring a film thickness of the polishing object, and/or (4) a sensor for acquiring a measured signal relating to a motor current fluctuation of a polishing table rotation motor.

26. The polishing system according to claim 25, wherein the data set is a data set formed of a sensor signal outputted from the sensor and a necessary control parameter, and the data set is a pressure of the holding section on a semiconductor wafer or a motor current of the arm drive section or a motor current of the polishing table or a measured signal of the optical sensor or a measured signal of an eddy current sensor or a position of the holding section on the polishing pad or a flow rate/type of slurry and a chemical liquid or correlation calculation data thereof.

27. The polishing system according to claim 19, wherein the signal having a large fluctuation in a signal value of the signal is extracted to update polishing parameters.

28. The polishing system according to claim 27, wherein a sensor as a master and a sensor as a slave are selected from the different types of the sensors, priority ratio coefficients are provided for both target values of the sensor as the master and the sensor as the slave to thereby define an influence ratio between the sensor as the master and the sensor as the slave, the signal having the large fluctuation in the signal value is extracted, and the priority ratio coefficients are changed to update the polishing parameters.

29. The polishing system according to claim 1, wherein the polishing apparatus acquires a signal relating to polishing,
the polishing system comprises an intermediate processing apparatus and a data processing apparatus,
the polishing apparatus and the intermediate processing apparatus are connected via first communication means, and the polishing apparatus and the data processing apparatus are connected via second communication means,
the first communication means can carry out communication faster than the second communication means, the intermediate processing apparatus creates a data set relating to polishing processing based on the signal acquired by the polishing apparatus, the data processing apparatus monitors a state of the polishing apparatus, and the intermediate processing apparatus comprises the end point detection section and detects a polishing end point indicating the end of polishing based on the data set.

30. The polishing system according to claim 29, wherein the data processing apparatus monitors the detection of the polishing end point by the intermediate processing apparatus.

31. The polishing system according to claim 29, further comprising a plurality of types of end point detection sensors for detecting a polishing end point indicating the end of polishing, wherein the plurality of types of the end point detection sensors output a plurality of signal values, the intermediate processing apparatus updates polishing parameters by extracting a signal value whose fluctuation is greater than other signal values among the plurality of signal values.

32. The polishing system according to claim 1, wherein the polishing apparatus comprises the end point detection section.

33. A polishing method for polishing between a polishing pad and a polishing object disposed opposed to the polishing pad by a polishing system, the polishing system comprising a polishing apparatus comprising a polishing table for holding the polishing pad, a holding section for holding the polishing object, a swing arm for holding the holding section, an arm drive section for swinging the swing arm around a rotation center of the swing arm, an arm torque detection section that detects arm torque applied to the swing arm around the rotation center, and a control section that controls polishing; and an end point detection section that detects a polishing end point indicating the end of polishing based on the arm torque detected by the arm torque detection section, the method comprising:
holding the polishing pad to the polishing table;
holding, by the swing arm, a holding section that holds the polishing object;
swinging, by the arm drive section, the swing arm around the rotation center of the swing arm;
detecting the arm torque applied to the swing arm around the rotation center; and
detecting the polishing end point indicating the end of polishing based on the detected arm torque.

34. The polishing method according to claim 33, wherein the swing arm comprises a plurality of arms and the arm torque applied to the swing arm at a joint between the plurality of arms is detected.

* * * * *